US012277830B2

(12) United States Patent
Wasinger

(10) Patent No.: US 12,277,830 B2
(45) Date of Patent: Apr. 15, 2025

(54) GAMING MACHINES HAVING PRIMARY FRONT AND ANCILLARY SIDE DISPLAYS

(71) Applicant: AGS LLC, Las Vegas, NV (US)

(72) Inventor: Gerald Francis Wasinger, Berkeley Lake, GA (US)

(73) Assignee: AGS LLC, Las Vegas, NV (US)

( * ) Notice: Subject to any disclaimer, the term of this patent is extended or adjusted under 35 U.S.C. 154(b) by 0 days.

(21) Appl. No.: 18/403,943

(22) Filed: Jan. 4, 2024

(65) Prior Publication Data

US 2024/0177559 A1 May 30, 2024

Related U.S. Application Data

(60) Continuation of application No. 17/377,624, filed on Jul. 16, 2021, now Pat. No. 11,869,300, which is a division of application No. 16/153,346, filed on Oct. 5, 2018, now Pat. No. 11,074,777.

(51) Int. Cl.
*G07F 17/32* (2006.01)
*G06Q 50/34* (2012.01)

(52) U.S. Cl.
CPC ......... *G07F 17/3223* (2013.01); *G06Q 50/34* (2013.01); *G07F 17/3211* (2013.01); *G07F 17/3241* (2013.01); *G07F 17/3258* (2013.01); *G07F 17/3267* (2013.01)

(58) Field of Classification Search
CPC ............. G07F 17/3223; G07F 17/3211; G07F 17/3241; G07F 17/3258; G07F 17/3267; G06Q 50/34
See application file for complete search history.

(56) References Cited

U.S. PATENT DOCUMENTS

| | | | | |
|---|---|---|---|---|
| 11,074,777 | B2 | 7/2021 | Wasinger | |
| 11,869,300 | B2 | 1/2024 | Wasinger | |
| 2007/0287538 | A1 | 12/2007 | Ishikawa et al. | |
| 2010/0048288 | A1 | 2/2010 | Canterbury | |
| 2010/0087289 | A1 | 4/2010 | Le Neindre | |
| 2014/0313722 | A1 | 10/2014 | Eloff et al. | |
| 2015/0269808 | A1* | 9/2015 | Cornell | G07F 17/3216 463/31 |
| 2016/0256785 | A1* | 9/2016 | Sum | G07F 17/3202 |
| 2016/0286318 | A1 | 9/2016 | Yuasa et al. | |
| 2018/0286181 | A1 | 10/2018 | Craig | |
| 2019/0149810 | A1 | 5/2019 | Kim | |
| 2019/0378373 | A1 | 12/2019 | Berman | |
| 2021/0319652 | A1* | 10/2021 | Clear | G07F 17/3216 |

* cited by examiner

*Primary Examiner* — Ronald Laneau
(74) *Attorney, Agent, or Firm* — Snell & Wilmer LLP

(57) ABSTRACT

An ancillary display for a gaming environment having one or more gaming machines each having a respective primary display that displays respective gaming action and/or gaming enticements includes a subarea image capturing circuit configured to capture video subarea signals corresponding to a predetermined subportion of imagery presented by at least one of the primary displays of at least one of the gaming machines, and one or more image output driver circuits configured to output ancillary imagery that is responsive to at least one of the captured video subarea signals.

20 Claims, 27 Drawing Sheets

Thermal Transfer Diagram

GAMING MACHINES HAVING PRIMARY FRONT AND ANCILLARY SIDE DISPLAYS

RELATED APPLICATION DATA

This application is a continuation of U.S. application Ser. No. 17/377,624, filed Jul. 16, 2021, which is a divisional of U.S. application Ser. No. 16/153,346, filed Oct. 5, 2018, now U.S. Pat. No. 11,074,777, which prior applications are incorporated herein by reference in their entirety.

CROSS REFERENCES

U.S. Ser. No. 15/661,581 entitled "Cabinet Air Filtration System", filed Jul. 27, 2017 on behalf of Gerald Francis Wasinger is incorporated herein by reference in its entirety.

U.S. Ser. No. 16/022,446 entitled "Closed Loop Cabinet Cooling", filed Jun. 28, 2018 on behalf of Gerald Francis Wasinger is also incorporated herein by reference in its entirety.

TECHNICAL FIELD

The present disclosure of invention relates to operations of gaming machines within a gaming environment.

BACKGROUND

Slot-type electronic and/or mechanical gaming machines, often also referred to as slot machines, are popular fixtures in casino or other gaming environments. Such slot machines are generally operated by use of various electronic and/or electromechanical and/or electro-optical components as well as installed software programs that enable rapid and reliable gaming action. Aside from slot machines, various other kinds of gaming devices may populate the casino floor, including electronically-assisted gaming tables which are also generally operated by use of various electronic and/or electromechanical and/or electro-optical components as well as installed software programs. A typical gaming environment (e.g., a casino) often has large arrays of side-by-side gaming devices (e.g., slot machines, gaming tables, chip and/or cash dispensing stations and other ancillary devices) that are laid out in accordance with a predetermined floor plan and made available for play and/or observation by large numbers of people. A typical floor plan includes close groupings of gaming machines that implement a same game or game type so that side-by-side players can share substantially the same experiences while at their respective machines. The typical floor plan also includes narrow footpaths between machines of the same grouping as well as wider footpaths for supporting larger customer foot traffic to and from the close packed machines. Additionally, the typical floor plan will place various service resources such as restrooms, snack stations, cashier booths, information desks at ends or intersections of the wider footpaths so that customers may conveniently get to them.

For sake of security, gaming devices and ancillary equipment are generally housed in securely closed cabinets that themselves may include further and internally locked security boxes. The typical gaming environment often also provides wide varieties of activities for its many guests besides direct engagement in the gaming actions themselves, including for example: allowing people to simply walk through along the footpaths and browse, allowing bystanders to watch the gaming actions from nearby the machines they are being played on, allowing opportunistic gamblers to look for areas of the casino that appear to them to have the currently 'luckiest' machines, providing for music and dancing, for serving of drinks, serving of snacks and/or allowing for on premise smoking. Part of the numerous activities in the typical gaming environment (e.g., a casino) includes controlling the overall lighting, overall background sounds and ways in which crowds can move around so as to create an optical/audio/socio-psychological environment that enhances the experiences of players, bystanders and walkers-through.

It is known to adorn the exteriors of gaming machine cabinets with light bulbs or other bystander recognizable light sources. For example, publication US 2014/0313722 (Eloff et al. Oct. 23, 2014) discloses a flexible lighting strip (including a T-molding structure) for covering a cabinet board edge of a video or arcade game cabinet. More specifically, cost-effective construction of arcade games may employ abutting wood boards where a space between the boards may be adorned by protrusion over it of the flexible lighting strip of Eloff et al. The presence of such light strips or strings of light bulbs or other bystander recognizable light sources is relatively apparent to bystanders and thus there is little surprise when they are caused to light up. Additionally, such protrusions take away from a smooth surface appearance desired for some cabinet surfaces.

As hinted above, participants in the gaming environment typically include a variety of different kinds of people including the primary players who are directly engaging with frontal, game presenting parts of their respective slot or other components-filled gaming apparatuses. On floor participants may further include groups of locally adjacent players who can share similarity of experience due to direct use of locally adjacent and frontal parts of substantially same slot or other gaming apparatuses (e.g., as in the case of a "bank" of side-by-side slot machines all participating in a bank-wide progressive pool). The slot machines may be organized as side-by-side rows with exposed rear faces or as back-to-back kiosk pairs that hide each other's rear faces or as otherwise organized kiosks where the backs of adjacent machines may abut against a wall or form a closed protective encirclements (or more correctly, substantially closed polygons) and the fronts project outwardly from that encirclements/closed polygons to form a wider diameter area to be occupied by players and bystanders. As mentioned, close groupings of such side-by-side machines or back-to-back pairs or other kiosk organizations may define narrow and wider pathways through which walker-by non-players can pass as crowds or in one-by-one formation while they move about the casino floor. In other words, aside from immediate players and their respectively adjacent bystanders, participants in the casino environment may include background passers-by who happen to be passing by in an area where they can view part of the gaming action(s) of one or more of the gaming actions displayed directly on the frontal displays of the gaming machines or can keep track of gaming actions indirectly by way of other components-enclosing gaming support devices such as for example large wall displays (e.g., video monitors presenting signage updates). In some arrangements, walking through guests may see only the rear faces of gaming machines. If actions are viewable or trackable, the observed/tracked gaming actions may include those of progressively growing local or other larger area jackpot pools and the occasional (rare or more frequent) awarding of such jackpots. Many of the various attendees in the gaming environment may be pacing, snacking, drinking, smoking, dancing (e.g., in sync with the background sounds and/or lights), walking by or just generally moving about.

Typically, casino operators want to entice stationary bystanders or walkers-through to move in closer to areas where the gaming actions are closely viewable so as to heighten the sense of group participation and better yet to have more bystanders/passer-byers switch over to becoming engaged primary players. One way to do so is to create optical and/or audio and/or otherwise sensory environments (e.g., vibrations, smells, tactile feelings) that draw bystanders closer into areas where excitement is building up. A side effect of drawing crowds into a concentrated area is that crowd activities can lead to increased emission of particles and/or vapors (e.g., dust, smoke, moisture) that, if not filtered out, can coat or otherwise impact the enclosed electronic and/or electromechanical and/or electro-optical components of the on premise gaming devices/ancillary support devices and then interfere with proper operation of these devices and/or reduce mean time between failure (MTBF) and/or mean time between normally-scheduled maintenance stoppages (MTBS). It is desirable to draw crowds closer in while still increasing MTBF and MTBS despite the presence of the particles and/or vapors that are routinely emitted into the ambient air of the gaming environment, sometimes in relatively high concentrations (e.g., due to gathering of crowds about some machines that appear to them to be extra lucky for example because the machines project announcements of local jackpot hits).

It is to be understood that some concepts, ideas and problem recognitions provided in this description of the Background may be novel rather than part of the prior art.

SUMMARY

Various embodiments in accordance with the present disclosure of invention generally relate to enhancement of the optical and/or other experiences of patrons of a gaming establishment. One aspect relates to improved enticement of right-sized crowds to gather closer in to certain gaming machines in a casino environment and in particular to those machines that are currently encountering less traffic than planned for by casino operators (sub-optimal crowding) while avoiding over-crowding in various areas of the casino floor plan.

A gaming machine is provided in accordance with the present disclosure having a cabinet with a frontal mechanism (preferably a high definition video display) for presenting gaming action of that machine. Additionally, at least one of left, right, subfrontal and rear cabinet sidewall displays (ancillary displays) is/are provided for presenting ancillary imagery that can enhance the optical experience of patrons in the vicinity of the gaming machine. In one embodiment, the subfrontal ancillary display is a so-called StarWall display hidden behind a darkened non-reflective panel as shall be detailed below. The light sources of the StarWall are hidden until lit up, thus adding a sense of surprise due to emergence of lights from what seemed to be a darkened non-reflective panel wall. In accordance with more general aspect of the disclosure, each of the cabinet sidewall displays may be configured to be substantially non-reflective (essentially glare free) such that when the sidewall display is not outputting imagery, it appears as a blackened or otherwise darkened and substantially non-reflective surface so as to not interfere with something else occurring within the vicinity of the respective cabinet sidewall display. Bystander surprise and entertainment is enhanced when bright imagery erupts from what appeared to be a darkened non-reflective panel wall.

Various embodiments in accordance with the present disclosure of invention generally relate to providing cabinet sidewall displays (CSD's) that are structured to be non-reflective such that one or more respective persons disposed within viewing distance of respective ones of the CSD's respectively perceive a light-absorbing surface for each of the CSD's when the respective CSD's are not outputting imagery and such that the one or more respective persons within viewing distance of the respective CSD's respectively perceive imagery presented on an otherwise light-absorbing surface for each of the CSD's when the respective CSD's are outputting imagery. One set of embodiments provides asymmetrically favored perception of once transmitted through light originating from CSD's as opposed to reflected light from those displays so that light which could otherwise be reflected from a CSD surface is perceived as having been substantially absorbed by that surface (e.g., by an apparently black and non-reflective surface) and light emanating from the display surface is perceived as having come through (e.g., the otherwise apparently black surface). Such embodiments can be used in a casino environment on viewable surfaces whose areas have conventionally not been used for projecting images, more specifically, on left, right, subfrontal and/or rear sidewalls of cabinets that house or support gaming machines.

In accordance with one aspect of the present disclosure, a machine-implemented method is provided for assisting or entertaining one or more persons in a gaming environment having a floor where the gaming environment has a plurality of gaming machines disposed on its floor in accordance with a predetermined floor plan, where at least a subset of the gaming machines each has a respective foot print in the floor plan, the respective footprint including a front side out of which gaming action for the respective gaming machine is to be presented, a back side opposed to the front side and two or more additional sides interposed between the front side and the back side, where each of the subset of gaming machines has a respective cabinet disposed over the respective footprint, the cabinet including a frontal gaming action presentation mechanism configured to present gaming action for the respective gaming machine; where the respective cabinet of each of the subset of gaming machines further includes one or more cabinet sidewall displays operable to output content to one or more respective persons within viewing distance of the respective one or more cabinet sidewall displays, the one or more cabinet sidewall displays being structured to be non-reflective such that the one or more respective persons within viewing distance of the respective one or more cabinet sidewall displays respectively perceive a light-absorbing surface for each of the cabinet sidewall displays when the respective cabinet sidewall displays are not outputting imagery and such that the one or more respective persons within viewing distance of the respective one or more cabinet sidewall displays respectively perceive imagery presented on an otherwise light-absorbing surface for each of the cabinet sidewall displays when the respective cabinet sidewall displays are outputting imagery, and where the method comprises: (a) using the floor plan, automatically determining whether one or more of the cabinet sidewall displays is disposed such that it can provide at least one of assisting imagery and entertainment imagery to a respective one or more persons that could be positioned within viewing distance of the respective one or more cabinet sidewall displays; (b) in response to determining that the one or more of the cabinet sidewall displays is operatively disposed such that it can provide at least one of assisting imagery and entertainment imagery, automatically determining based on priority or urgency, what form of at least one of assisting imagery and entertainment imagery, if any, to present on respective ones of the operatively disposed cabinet sidewall displays; and (c) in response to further determining that the one or more operatively disposed cabinet sidewall displays will not interfere with something else occurring within their vicinity or that an urgent event calls for assistance of the operatively disposed cabinet sidewall displays, using the cabinet sidewall displays to provide at least one of assisting and entertaining imagery.

In accordance with yet another aspect of the present disclosure, one or more of the ancillary displays has its imagery driven by what appears (or is programmed to appear) in a programmably selected subarea of a high definition frontal display (e.g., a 4K video monitor) that presents details of gaming action provided by a corresponding gaming machine. The imagery provided on the ancillary display may be of a lower resolution than that of the high definition frontal display while operating substantially in synchronism with the imagery presented in the programmably selected subarea and while peripherally adding to the optical effects presented in the programmably selected subarea.

Further aspects of the present disclosure of invention may be found in the following detailed descriptions.

BRIEF DESCRIPTION OF DRAWINGS

The present disclosure may be better understood by reference to the following detailed description taken in conjunction with the accompanying drawings, which illustrate particular embodiments in accordance with the present disclosure of invention.

DETAILED DESCRIPTION

Figure 1A:
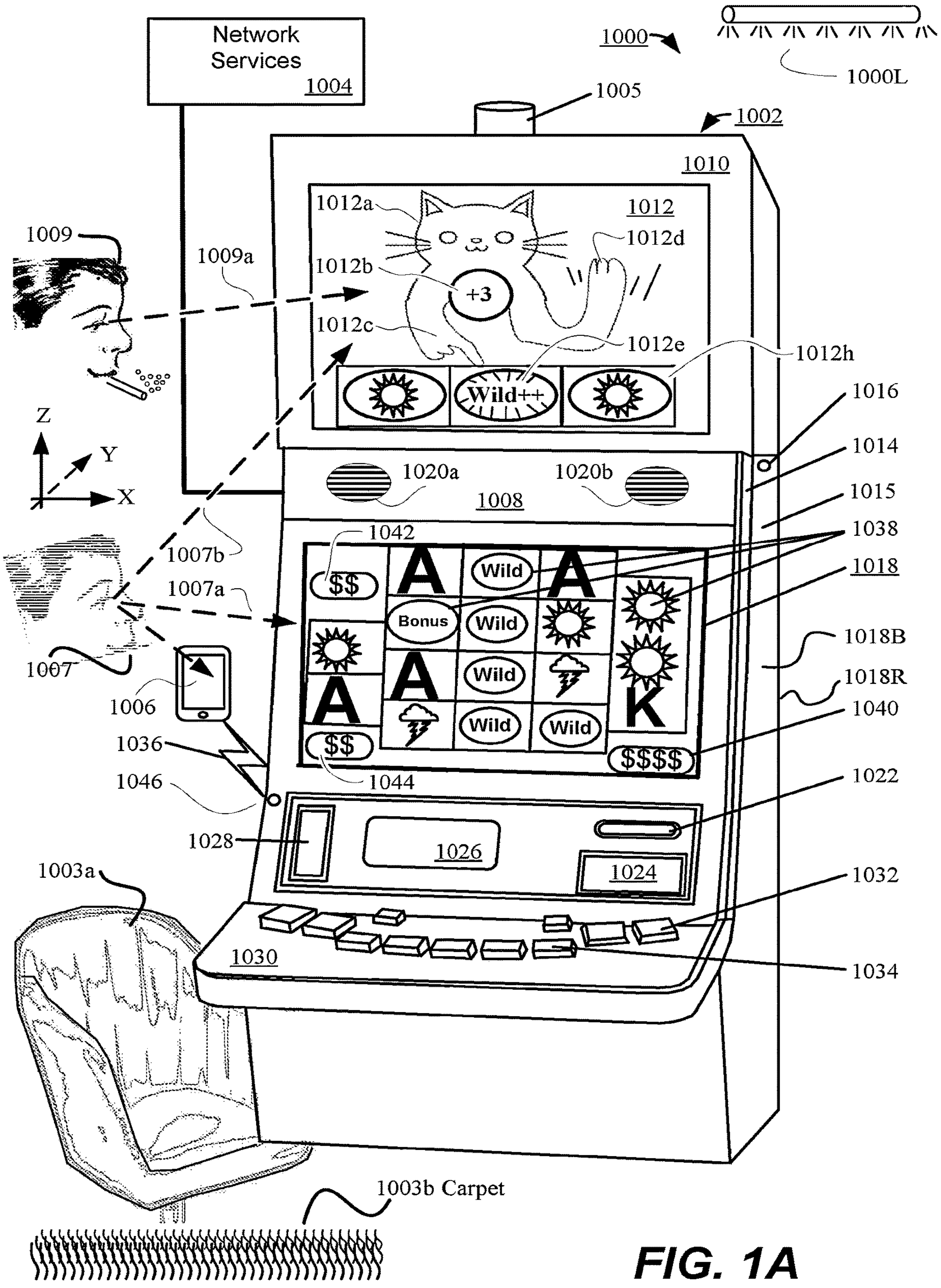
FIG. 1A illustrates a gaming system and environment including a wager-based gaming machine in accordance with the present disclosure.

Reference will now be made in detail to some specific embodiments in accordance with the present disclosure of invention. While the present disclosure is described in conjunction with these specific embodiments, it will be understood that it is not intended to limit the teachings of the present disclosure to the described embodiments. On the contrary, it is intended to cover alternatives, modifications, and equivalents as may be included within the spirit and scope of the teachings of the present disclosure.

In the following description, numerous specific details are set forth in order to provide a thorough understanding of the present disclosure. Particular embodiments may be implemented without some or all of these specific details. In other instances, well known process operations have not been described in detail in order not to unnecessarily obscure the present disclosure of invention. Although not explicitly shown in many of the diagrams, it is to be understood that the various automated mechanisms discussed herein typically include at least one digital data processing unit such as a central processing unit (CPU) where multicore and other parallel processing architectures may additionally or alternatively be used. The components are not limited to digital electronic ones and may include analog and/or mechanical and optical ones, including more particularly; high intensity light sources. Some of these components may generate concentrated amounts of local heat when operating and may have finned heat sinks and/or miniature cooling fans attached to them for maintaining predetermined acceptable operating temperatures. Some of these components may be securely enclosed within a series of the security enclosures for example, a locked box within a locked cabinet. It is to be further understood that the various automated mechanisms mentioned herein typically include or are operatively coupled to different kinds of non-transient data storage mechanisms including high speed caches (which could be on-chip, package secured caches), high speed DRAM and/or SRAM, nonvolatile Flash or other such nonvolatile random access and/or sequential access storage devices, magnetic, optical and/or magneto-optical storage devices (e.g., with motor-driven rotating media) and so on. The various data processing mechanisms and data storage mechanisms may be operatively intercoupled by way of local buses and/or other communication fabrics where the latter may include wireless as well as wired communication fabrics. Data storage mechanisms, light producing mechanisms and other mechanisms may generate heat.

In general, gaming systems which provide wager-based games are described. In particular, with respect to FIGS. 1A and 2, a gaming machine environment may be comprised of a plurality of automated wager-based gaming machines disposed in a lighting/sounds controlled area such that lights and sounds from the gaming machines are perceived by casino guests as immersing them in a pleasing and inviting environment. The gaming machine environment includes one or more automated systems that can support wager-based games including those where one or more progressively growing prizes or awards (e.g., mega-jackpot, medium-jackpot, mini-jackpot) are made possible and/or where the unleashing of a whole series of bonuses (e.g., free spins) or other awards is made possible. One of the goals of providing progressive jackpot prizes and/or bonus games (e.g., wild card activated bonus games) is to increase level of excitement and draw large crowds of people into the gaming machine environment, closer to the gaming machines, especially to those that are currently being under-utilized. However, large crowds tend to increase emission into the local ambient atmosphere of particles and vapors (e.g., dust, smoke, sweat, etc.). It is desirable to control crowd sizes and crowd traffic so as to enhance the gaming experience while not encouraging excessive crowding. It is desirable to provide casino guests with pleasing optical and/or audio environments that encourage them to participate directly or indirectly in the gaming experience.

When excessive crowding occurs, a planned-for optical and psychological environment may be interfered with due to crowd noise and crowd blocking of views from different angles. Also, crowd generated particles and vapors can foul interiors of cabinets of the crowded-about gaming machines. One prior art method of reducing the amount of emitted moieties (e.g., particles, vapors) that enter the interior of air cooled cabinets is disclosed in the here incorporated by reference U.S. Ser. No. 15/661,581 entitled “Cabinet Air Filtration System”, filed Jul. 27, 2017 on behalf of Gerald Francis Wasinger. Basically, a series of filters are used to remove large-sized and smaller sized particles as cooling air is forced through the filters and into the cabinet. But these interposed filters (especially the finer pored ones) act as blockages of air flow into the cabinets, thus often calling for larger, noisier fans, greater consumption of electrical energy to drive the air blowing fans and shorter time between normal maintenance stoppages for replacing clogged filters through which the ambient air was constantly forced and thus additively caused more and more particles to lodge in the filters. thereby calling for even more fan power. An improved method for cooling gaming cabinet components is disclosed in U.S. Ser. No. 16/022,446 entitled “Closed Loop Cabinet Cooling”, filed Jun. 28, 2018 on behalf of Gerald Francis Wasinger which is incorporated herein by reference in its entirety. The present disclosure of invention is directed to use of lighting systems on side surfaces of gaming machine cabinets as well as on frontal surfaces of such machines. In some embodiments, the methods of said U.S. Ser. No. 16/022,446 are used to cool high intensity lighting sources that generate lights for such cabinet sidewall displays.

Of note, a prior art method not directly involved with gaming environments is disclosed in U.S. Pat. No. 8,358,397 issued Jan. 22, 2013 to Dunn and entitled “System for cooling an electronic display”. In Dunn ’397 an isolated transparent gas loops about a fixedly closed plenum so as to flow horizontally between a glass cover of and a front surface of a display so as to thereby cool the front surface of the display.

While various slot machines and/or other gaming devices may use mechanical reels or wheels and/or video reels or wheels to present to the respective players both of action occurring during development of a game outcome and a finalized outcome of a gaming action, typically the actual gaming action takes place rapidly and invisibly in a secured (e.g., cabinet enclosed, locked box further enclosed) electronic part of the system. The outcome is determined there (based on use of a truly random and/or pseudo-random outcome determining mechanism) and then later the development of the outcome and the final outcome are revealed to a corresponding one or more players by updating of various display and cabinet-enclosed signage means such as video screens. The video screens (and/or other signage means) may also display pending award amounts, including those of the growing jackpot amounts. Typically, before each gaming action by the machine system (e.g., including display of spinning of the reels or wheels), the player is required to ante up by placing at least one wager on the outcome of the gaming action. In some games, a player can elect to have at least part of one or more of his/her wagers (e.g., side wagers) correspondingly contributed to one or more progressive jackpot pools.

Chances for winning any one or more of games and/or progressive jackpot pools can come in various software mediated and/or analog-circuit and/or analog mechanical mediated ways. For example, a player at a slot machine may select or define a straight or other line or other pattern that will operate as an actively-wagered upon pay line/pattern over which, game-generated randomly distributed symbols are evaluated to determine if a winning combination is present (e.g., a sequence defining combination such Jack, Queen, King, Ace, etc. cards, hereafter also J, Q, K, A). If the actively-wagered upon pay line/pattern provides a winning combination, the player is rewarded (e.g., monetarily and/or otherwise). Because award amounts of relatively large size are often involved, a variety of both mechanical and electronic security measures are undertaken, including locking heat generating electronic components in a series of locked security enclosures. Various outcome enhancing symbols such as wild symbols can appear on the reels, wheels or other symbol presenting mechanisms of the game. Wild symbols typically serve as outcome enhancing substitutes for symbols needed to form a winning combination. In various prior art games, wild symbols: (1) can come into existence by other symbols individually morphing into wild symbols; (2) they can be individually copied from one reel or wheel to another; (3) they can be dropped from an animated character (e.g., cartoon) onto the reels or wheels to individually change certain existing symbols on a scatter distributed basis; and (4) they can populate a reel or wheel more frequently during so-called, free spins. On occasions, a player may be awarded with a wheel spin or other by-chance prize amount selecting mechanism that gives the player a crack at one or more of the progressive jackpot pools (e.g., the mega, medium and/or mini pool). In one example of a by-chance prize amount selecting mechanism, a player who won the primary gaming action (e.g., slot machine poker, table poker) is presented with a lottery-like scratch-to-reveal ticket (a virtual version of one) where the player's task is to scratch off a subset of the possibilities so as to match a set of symbols then presented elsewhere to the player. If he/she succeeds in matching the pattern, he/she is awarded the pending jackpot prize (e.g., $100 if it is a mini-jackpot). Due to such occasional sprinklings of chances at winning one of the progressive jackpot pools, the primary players and adjacent other persons may experience various emotional responses and derive entertainment value from not only the unique ways in which various games are played and game outcomes are developed but also from the chances of winning one of the progressive jackpot pools. The excitement may be accompanied with physical agitation (e.g., dancing, jumping, squirming, drink tossing, etc.) which may result in increased local release of particles and/or vapors into the ambient atmosphere.

A problem emerges when released particles and/or vapors (e.g., dust and moisture) enter the ambient atmosphere near the gaming machines due to large crowds passing by and/or gathering around certain machines. The same ambient atmosphere is often used to remove excess heat from the various enclosed components (e.g., electronic and/or electromechanical and/or electro-optical components) of the on premise gaming devices. The emitted moities (e.g., particles, vapors) may over time build up as thick coatings on the cabinet-enclosed components and/or over time result in corrosion and/or in creation of electrical insulation/resistance between contacts and then interfere with proper operation of the devices (e.g., including proper cooling of components) and thus reduce mean time between failure (MTBF) and/or mean time between normally-scheduled maintenance stoppages (MTBS).

Referring to FIG. 1A of the present disclosure of, shown is part of an automated gaming system 1000 in accordance with the disclosure that includes a wager-based gaming machine 1002 (e.g., a slot machine). The surrounding lighting environment is schematically represented by light source 1000L. At least in one class of embodiments, each gaming machine is allocated to a rectangular or trapezoidal floor area (not explicitly shown) where a first of the two wider sides of the rectangle/trapezoide is designated as a frontal or gaming action presenting side while the opposed one is designated as a rear side and the two narrower sides of the rectangle/trapezoid are respectively designated as left and right sides. Conventionally, no gaming action is displayed on any of the machine walls that face out to the left and right sides or the rear side of the cabinet footprint.

As described herein, the automated gaming system 1000 is to be understood as including the gaming environment which is in part determined by overhead and/or other surrounding light sources 1000L, and by sound producing devices. The environment may include sensor embedded flooring 1003*b* (e.g., carpeting with sensors embedded therein for detecting presence and/or movement of occupants) and a ceiling area populated by security cameras. The wager-based gaming machine 1002 can include wireless or wired communication interfaces which allow communications with remote and also securely-housed servers and/or other devices including a remote services providing network 1004 (e.g., having service providing servers and/or other data storing, communicating and data processing units—not explicitly shown). The services providing network 1004 (typically housed in one or more secured cabinets with internal locked boxes further housing components of the network) can provide privacy-assuring/integrity-secured services such as but not limited to tracking of players, tracking of non-players and management of progressive and other forms of gaming. (Some specific network services are described in more detail in conjunction with FIG. 2). The player tracking service and the progressive gaming management service can be parts of a player and prizes accounting system that for example keeps track of each player's winnings and expenditures (including, in some embodiments, player contributions to one or more progressive jackpot pools). The non-player tracking service can be used for crowd control and guiding foot traffic movement along desired pathways of the casino floor plan. In addition, the gaming machine 1002 can include wireless communication interfaces, such as a wireless interface 1046 (internal, not specifically shown) which allow communication with one or more mobile devices, such as a mobile phone 1006 (only one shown), a tablet computer, a laptop computer and so on via respective wireless connections such as 1036. The wireless interface 1046 can employ various electronic, optical or other electromagnetic wireless and secured or non-secured communication protocols, including for example TCP/IP, UDP/IP, Bluetooth™ or Wi-Fi.

The respective mobile phones (e.g., 1006) and/or tablet computers and/or other mobile devices can be owned and/or utilized by various players, potential customers, authorized casino operators/agents or authorized gaming inspectors. A mobile device carried by a primary player (e.g., 1007) can be configured to perform gaming related functions, such as functions associated with transferring funds to or from the specific gaming machine 1002 and the primary player's account(s) or functions related to player tracking. In one embodiment, the mobile device carried by the primary player (e.g., 1007) can be configured to call for operator assistance and to provide the location of the mobile device so that a casino operator/agent can find the player requesting assistance. A mobile device carried by a casino operator/agent can be configured to perform operator related functions, such as responding to calls for operator assistance, performing hand pays, responding to tilt conditions or collecting metering related information. A mobile device carried by an authorized gaming inspector can be configured to perform inspection related functions, such as actuating software verification procedures and checking on the thermal, mechanical and/or electronic status of enclosed components.

Use of mobile devices is not limited to secured transactions. In one embodiment, mobile devices may be used for social networking and/or crowd control. For example, a primary player 1007 may authorize his/her mobile device (e.g., 1006) to automatically interact with a currently used gaming machine 1002 for the purpose of automatically posting to a user-chosen social network various announcements such as, but not limited to, that the primary player 1007 has been having fun playing the Lucky Kitty game (a fictitious name for purposes herein) for X hours at the given gaming establishment or that the Lucky Kitty game has just awarded the primary player 1007 a symbols upgrade (e.g., Wild cards) that now gives that player an opportunity to spin for a mega- and/or mini-jackpot and/or other awards. The primary player 1007 may alternatively or additionally authorize his/her mobile device (e.g., 1006) to automatically announce (wirelessly) to a selected group of friends or associates that player 1007 has just been awarded an opportunity to spin for a jackpot and/or other awards and inviting them to stop by and watch the fun (e.g., as nearby other person 1009 is doing over the shoulder of the primary player 1007, where the latter in one embodiment, is seated in chair 1003*s* situated in front of gaming machine 1002 and typically mounted on a carpeted casino floor 1003*b*.) In some embodiment, the mobile devices of non-players may be activated to wirelessly report on the locations of those non-players on the casino floor. (In one embodiment, as detailed below, the reported locations may be used to send semiprivate messages to such persons using programmable sidewall displays of pathway adjacent gaming machines.)

According to the same or an alternate embodiment, the primary player 1007 may use his/her mobile device (e.g., 1006) to temporarily reserve the particular gaming machine 1002 for a predetermined amount of time (e.g., no more than say 10 to 30 minutes) so that the primary player may temporarily step away to attend to various needs (e.g., the callings of nature). In one embodiment, programmable sidewall displays of pathway adjacent gaming machines may be used to guide players to desired floor locations and/or back to the machine on which they were playing. While the primary player 1007 is temporarily away, the gaming machine 1002 may display a reservation notice saying for example, "This machine is reserved for the next MM minutes by a winning player who was recently awarded a mini-jackpot and a lucky opportunity to spin for the mega-jackpot and/or other awards. Stand by and watch for more such lucky opportunities!" (where here MM is a progressively decreasing time counter). The reservation notice may be prominently posted on an upper display 1012 of the gaming machine 1002 as shall next be described.

The gaming machine 1002 can include a locked base cabinet 1008 (with an internal and additionally locked security box, not shown) occupying a substantially rectangular footprint on the floor and an upper or top box 1010 fixedly mounted above the base cabinet. (In an alternate embodiment, the displays of the upper and lower boxes are merged into a unitary large display as shown for example in FIG. 1B.) The top box 1010 includes an upper and relatively large display 1012. The upper display 1012 can be used to display video content, such as game art associated with the game being currently played on the gaming machine 1002. For example, the game art can include one or more animated wheels or reels (or other chance/opportunity indicating mechanisms) and/or one or more animated creatures (e.g., the hand waving Lucky Kitty illustrated at 1012*a*). The animated wheels or reels can be configured to spin and to stop to reveal an occasional opportunity to spin for a jackpot and/or other awards and/or the awarding of a grand prize such as a progressive jackpot. In one embodiment, the predetermined stoppage position or area or awarding of a special prize (e.g., Wild symbol 1012*e*) may be pointed to by an animated finger 1012*c* of the Lucky Kitty character 1012*a* (or other appropriate animated figure). The Lucky Kitty character 1012*a* (or other appropriate animated figure) may temporarily wave an attention getting item such as a flag or a virtual fireworks sparkler, etc. (not shown) at the appropriate times to try to draw in farther back standby observers like 1009. At other times and/or in other examples, the video content of the relatively large upper display 1012 can include advertisements and promotions, such as for example, "A mega-jackpot amount of more than $100,000 was awarded on this machine two weeks ago. Is this the lucky machine for you too?"

In alternate embodiments, the top box 1010 can include one or more glass-covered mechanical and/or electronic devices in addition to the upper video display 1012. For example, mechanical devices, such as one or more mechanical wheels can be mounted to or within the top box 1010. The mechanical wheel(s) can include markings that indicate various bonus award situations and/or situations where large (mega-) or smaller jackpots might be won. The wheel(s) can be spun and stopped at particular stopping points to reveal a bonus award situation or a multi-symbol transformation situation (e.g., awarding multiple wild cards, where the latter can increase the chance for winning a jackpot). In yet other embodiments, the top box 1010 can include a plurality of upper displays that provide similar functions.

With respect to chance providing mechanisms as described herein, it is to be understood that such can include not only mechanical chance providing mechanisms (e.g., mechanical spinning wheel with relatively unpredictable stop position), but also electronically based chance providing mechanisms that can be implemented in the form of digital and/or analog electronic circuits where in some cases, temperatures inside the cabinet can affect operations of these circuits. Some of the circuits may rely on flip-flops or registers designed with intentional meta-stability and/or on noise intolerant switching circuits that are intentionally exposed to random noise (e.g., thermal noise) so as to provide relatively random and unpredictable outcomes. In one embodiment, an automatically repeatedly actuated code/data verifier is called upon to verify that utilized software and control data use pre-approved hardware, firmware and/or software for properly providing random chances of respective predetermined probabilities at winning and or getting a chance to spin for respective prizes including for respective progressive jackpot pools (e.g., mega-, medium and/or mini-jackpots). Prior art technologies for truly random or pseudo-random picking of outcomes from respective finite outcome sets are too numerous to mention all here. Examples of Random Number Generation (RNG) include Oscillator controlled RNGs, Linear feedback shift register based RNGs; RNGs using Plural parallel outputs bits; Seed value controls for RNGs; Truly random number RNGs; RNGs with Plural parallel outputs, etc. More specific examples of RNGs are provided for example in U.S. Pat. No. 9,830,130 (Random number generator); U.S. Pat. No. 9,792,089 (Random number generator using an incrementing function); U.S. Pat. No. 9,778,913 (Method of generating uniform and independent random numbers); U.S. Pat. No. 9,640,247 (Methods and apparatuses for generating random numbers based on bit cell settling time); USPTO PreGrant 20170262259 (Method for Generating Random Numbers and Associated Random Number Generator); PCT/EP2017/069185 (Quantum Random Number Generator and Method for Producing a Random Number by Means of a Quantum Random Number Generator). A simple example of an RNG is a high speed asynchronous oscillator (e.g., GHz range) driving a wrap-around counter whose counting is stopped or captured by an asynchronous event of substantially slower and unsynchronized timing resolution (e.g. a user pushes a button, background noise is detected, etc.). The output of the stopped/copied counter may then drive an address input of lookup table populated by predetermined outcome values (e.g., playing card symbols) at their respective outcome frequencies. A particular outcome is thereby picked in a substantially random and optionally statistics skewed manner (skewed by the LUT) based on its frequency of appearance within the lookup table. (See also the example of FIG. 7.)

It will be appreciated by those familiar with gaming environments that participants in various gaming environments (also briefly see FIG. 2) include respective primary players like 1007 who are directly using their respective slot machines (e.g., 1002) and are each typically seated on a chair (e.g., cushioned chair 1003) disposed in front of the gaming machine so as to thereby position that primary player's eyes substantially level with a central vertical position (along the vertical Z axis) with a primary (frontal) game outcome display area 1018 of the gaming machine 1002 thus allowing for a comfortable gaze angle indicated by viewing vector 1007*a*. The primary game outcome display area 1018 is typically positioned vertically below and slightly spaced apart from the upper video display area 1012. The vertical elevation of the upper video display area 1012 is chosen so as to be easily viewed by adjacent player(s) who is/are directly using adjacent slot machines (for example at an eye incline angle shown as viewing vector 1007*b*) and also to be easily viewed by adjacent bystanders 1009 (e.g., a player's friends) who are standing nearby the primary player or nearby one of the adjacent players or are nearby passers-by who happen to be passing by in an area where they can view part of the gaming action(s) of one or more of the slot machines; and in particular the actions displayed by the upper video display 1012 at a comfortable viewing vector 1009*a*. In an alternate embodiment (see briefly FIG. 1C), the upper video display area 1012 game outcome display area 1018 are replaced by a vertically elongated high definition (HD) video monitor having a resolution of preferably 1K or better (e.g., a 4K resolution). (As used herein, 1K resolution—also referred to as Full HD—implies an elongated rectangular video monitor having a resolution of about 1000 color pixels or more preferably about 1080 color pixels along its shorter side, 2K resolution implies about 2000 color pixels or more preferably about 2048 color pixels along the longer side, and 4K resolution implies about 3600 color pixels or more preferably about 3840 color pixels along the longer side where optionally that latter number increases to 3996 or 4096 according to alternate definitions for 4K resolution.)

Due to real or simulated movements of the mechanical reels and/or video reels in the primary game outcome display area 1018 and in the upper video display area 1012 (or due to ancillary lighting effects produced elsewhere), the primary players and the adjacent other persons may experience various emotional responses (and react physically as part of the response by jumping, dancing etc.) and derive entertainment value and expectations for further excitement from the unique ways in which the slot game (e.g., the Lucky Kitty game illustrated as an example in areas 1012 and 1018 or other such software driven gaming actions) are progressing. For example, when a low frequency winning hand or winning pattern appears on a wagered-for pay line or pattern presentation area such as 1038 (or a low frequency combination of symbols appears within a predetermined pattern of on-display locations), attention grabbing other symbols (e.g., flashing arrow noted by gaze line 1007*a*) may be automatically presented on the gaming machine. In accordance with one aspect of the present disclosure, before the primary player 1007 spins for the jackpot (e.g., using a virtual wheel or reel that is not explicitly shown), attention grabbing further and larger displays appear on the relatively large upper video display 1012 (e.g., "Big Win Possible Here!"—not shown) so they are in the line of sight 1009*a* of bystanders or other primary players so as to draw them in. This can increase emotional levels of all involved, greater levels of physical agitation (e.g., jumping, shouting, heavy breathing) and heightened enjoyment of the gaming actions. In other words, a mixture of emotions and physical activities may be induced including those related to heightened expectations and foreboding that all the expected rewards may or may not be realized. If the primary player 1007 continues to win low frequency winning hands such as the four Aces (A) shown, the expectations for jackpot or like big payouts can increase, thus providing increased entertainment and excitement to those nearby the gaming machine 1002 (and optionally to those on social media who are following the primary player's progress). If high frequency jackpots (e.g., a mini-jackpot—as opposed to a larger progressive jackpot, e.g. mega-jackpot with substantially higher possible payout but substantially lower odds of winning it) appear to be hit within a relatively short period of time among a specific bank or banks of machines, that may entice the nearby bystanders 1009 to flock to those machines and start participating in the gaming actions because it appears to the bystanders that such specific bank or banks of machines are extra lucky.

For sake of completeness, an illustrated right sidewall of the slot machine is denoted as 1018B and a hidden rear sidewall of the slot machine is denoted as 1018R. A sub-frontal portion (see briefly FIG. 14A) is denoted as 1018S. Conventionally, no display devices are mounted to the right sidewall 1018B or the rear sidewall 1018R (or to the not yet labeled left sidewall 1018A of FIG. 1A, sec instead and briefly FIG. 1B). In some floor plan arrangements, a substantially same or similar slot machine with same orientation will abut or be closely placed adjacent to the right sidewall 1018B of the illustrated machine 1002. Also in some floor plan arrangements, a substantially same or similar slot machine with same orientation will abut or be closely placed adjacent to the left sidewall (1018A) of the illustrated machine 1002. In some floor plan arrangements, a substantially same or similar slot machine with 180 degree rotated orientation will abut or be closely placed to the rear sidewall 1018R of the illustrated machine 1002. Consequently, it is conventionally understood that at least one if not all three of the right sidewall 1018B, rear sidewall 1018R and left sidewall (1018A) of the illustrated machine 1002 will not be viewable by players and by-standers. However, contrary to this conventional understanding and in accordance with the present disclosure, cabinet sidewall displays are provided on at least one if not two or all three of the right sidewall 1018B, rear sidewall 1018R and left sidewall (1018A) of gaming machines such as the illustrated machine 1002 (or other like operating ancillary displays are provided elsewhere on or adjacent to the gaming machine where generally speaking, the provided and like operating ancillary displays have display resolutions less than that of the frontal display (e.g., 1018 or 1018F) on which detailed gaming action is displayed, for example less than 1K).

The flocking or clustering of players to a specific bank or banks of machines can have detrimental effects. Among these are creation of a feeling of excessive overcrowding, interference with the pleasing optical/auditory experience that casino operators had planned for and increased local generation of particles and vapors being emitted into the ambient atmosphere; where, if sucked in by cooling fans into the interior of cabinets like 1008, 1015 can foul the interior of such gaming machines 1002. This can cost the casino revenues in various ways, including causing more frequent failures and shut downs of machines which means that the area cannot handle large volumes of customers when they show up at certain times of heightened traffic (e.g., during conventions, wedding parties, etc.). Customers may stop coming to the casino if they run into unavailability of machines too often. In the long run, it would be beneficial to the casino in terms of customer relations and long term smooth running of operations if a technical and automated solutions could be found which avoid altogether or significantly decrease the entry of emitted particles and/or vapors into interiors of cabinets (and locked boxes therein) while still providing proper cooling for all interior components in an economical and practical way.

One or more solutions of this type are disclosed in the here incorporated-by-reference U.S. Ser. No. 16/022,446 entitled "Closed Loop Cabinet Cooling". However, before delving into aspects of the present disclosure that are directed to crowd and people traffic management; yet further details for one embodiment are first provided. The base cabinet 1008 of one embodiment includes an exterior access entry mechanism instantiated for example as door 1014. The door 1014 swings outward and is coupled to a back portion 1015. The door 1014 includes a locking mechanism 1016. (While the illustrated example shows locking mechanism 1016 at a top portion of the out-swinging door 1014, further such locking mechanisms may alternatively be placed near the bottom or hidden from view and activated by wireless means.) During normal operation, the door 1014 is locked and preferably blocks flow of ambient air therethrough and into the interior as shall be detailed below. Typically, unlocking the door 1014 causes the gaming machine 1002 to enter a tilt mode where gaming functions, such as the play of a wager-based game, are not available. This tilt mode can be referred to as a hard tilt. In one embodiment, after the door 1014 is re-closed an interior atmosphere flushing mechanism flushes out (e.g., purges through a one way pressure relief valve) ambient air that may have entered and replaces the flushed out air with a clean interior gas (which could also be air, but pre-cleared of potentially damaging particles and/or vapors). In one embodiment, the door 1014 includes a magnetically sealing flexible gasket all around for assuredly blocking contaminant containing fluids (gases and liquids) from entering all or a predetermined portion of the interior of the cabinet 1008.

The cabinet 1008 can include one or more additional and lockable security boxes that are accessible by way of respective hermetically scalable apertures that allow access to portions of a number of components which are disposed at least partially within the cabinet and also within the more secured, lockable security boxes. These wholly-in-cabinet/wholly-in-lock box or protruding-from-cabinet/protruding-from-lock-box components can include, but are not limited to displays such as 1018 and 1026, speakers such as 1020*a* and 1020*b*, a printer 1022, a bill acceptor 1024, a magnetic and/or chipped card reader 1028 and a resting shelf and/or button panel 1030 including buttons 1032 and 1034. As described in more detail below, these cabinet secured/lock-box-secured components can be used to generate or assist in wager-based game play on the gaming machine 1002. Unfortunately, these cabinet secured/lock-box-secured components can generate significant amounts of heat. Also, in accordance with the present disclosure, and as briefly mentioned above, the cabinet sports one or more sidewall displays on its non-frontal surfaces such as 1018B, 1018R and/or on its subfrontal surface (see briefly 1018S of FIG. 14A). In some embodiments these cabinet sidewall displays (or alike operating other ancillary displays) will appear as black or darkened or otherwise non-reflective surfaces when not activated but will erupt to show brilliant color images through their normally dark surfaces when activated. More details are provided for example in conjunction with FIGS. 1D and 1E.

In particular embodiments, the bill acceptor 1024 can be used to accept currency or a printed ticket which can be used to deposit credits into an account maintained for the primary player 1007 and/or the gaming machine 1002. The credits can be used for wagers. The bill acceptor 1024 can include electronic and electromagnetic components (e.g., motors) that need to be cooled. The printer 1022 can be used to print tickets to transfer credits from one gaming machine (e.g., 1002) to another or to monetize accumulated credits. The printer 1022 can include electronic and electromagnetic components (e.g., motors) that need to be cooled. Typically, the tickets can be redeemed for cash or additional game play, such as game play on another gaming machine or at a gaming table. While in one embodiment, physical tickets or other such tokens are used for transfer of credits, it is within the contemplation of the present disclosure to alternatively or additionally use electronically secured digital tokens which may be securely transferred from the gaming machine 1002 into a players mobile device 1006 if the latter is properly instrumented with security assuring applications.

Figure 2:
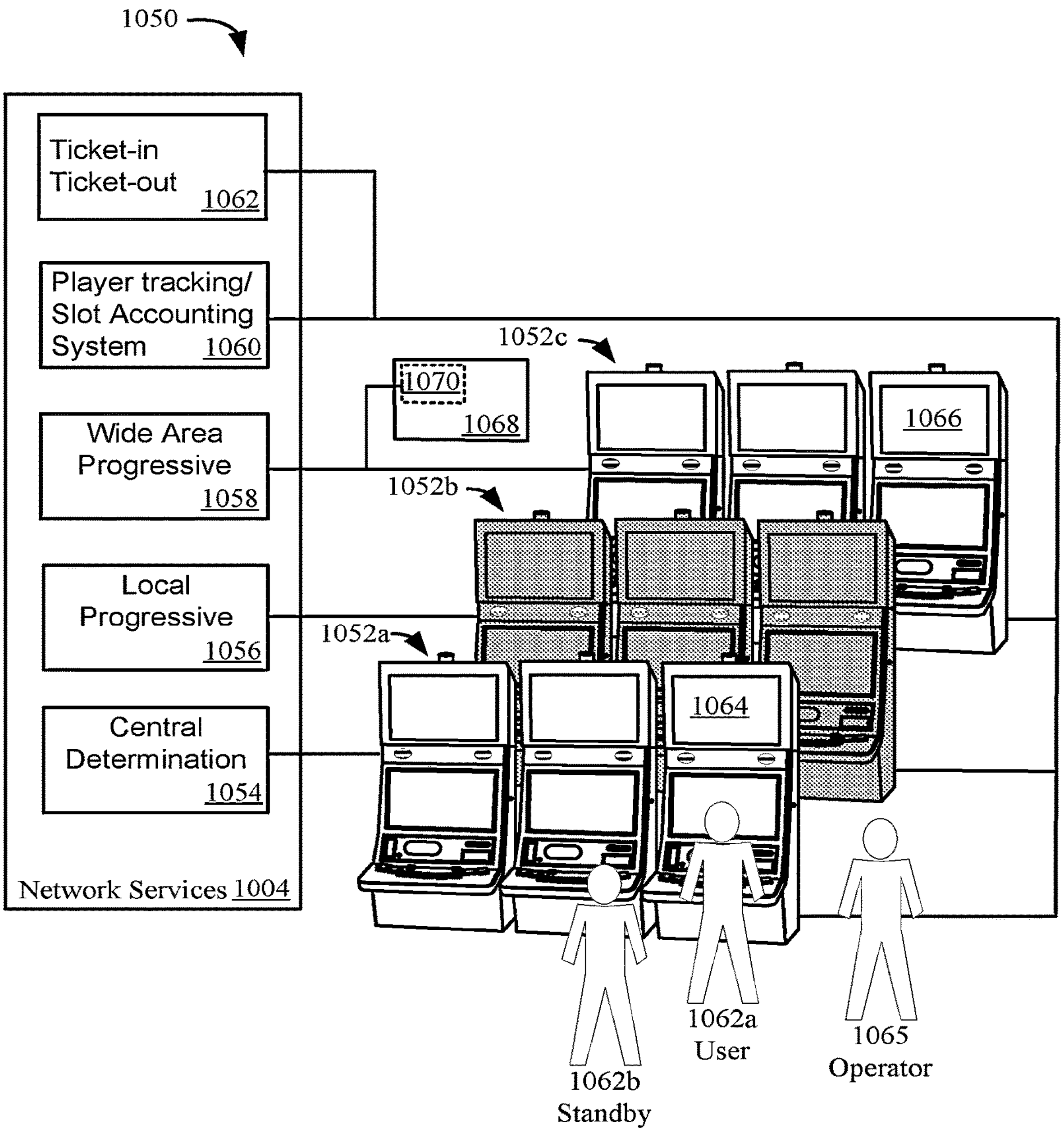
FIG. 2 illustrates a gaming system including three banks of gaming machines that may all participate in one or more progressive jackpot games.

The bill acceptor 1024 and printer 1022 can be part of ticket-in/ticket-out (TITO) system 1062 illustrated in FIG. 2. The TITO system 1062 can be included as one of the secured services provided by the services network 1004. The TITO system allows a ticket printed at a first gaming machine with a credit amount to be inserted into a bill acceptor at a second gaming machine and validated for game play. After validation, the credit amount associated with the ticket can be made available for game play on the second gaming machine. Additional details of the TITO system 1062 are described below in conjunction with FIG. 2. In one embodiment, mechanical mechanisms such as the bill acceptor 1024 and printer 1022 have motor operated security doors that temporarily open to the outside to allow for interface with the outside and then close. In accordance with one aspect of the present disclosure, after the motor operated security doors close, the interiors of these devices are flushed with a flow of clean air or other gas.

The bill acceptor 1024 can include a slot surrounded by a bezel which allows banknotes of various denominations or printed tickets to be inserted into the bill acceptor. The bill acceptor 1024 can include sensors for reading information from the banknotes and determining whether the banknotes inserted through the slot are valid. Banknotes determined to be invalid, such as damaged or counterfeit notes, can be automatically ejected from the bill acceptor 1024. In some instances, the bill acceptor 1024 can include upgradeable firmware and a connection to additional network services. Via the network connection, new firmware, such as new counterfeit detection algorithms can be downloaded for installation into the bill acceptor 1024.

The bill acceptor 1024 includes mechanisms for guiding the banknotes or printed tickets past the internal sensors. Banknotes or printed tickets which are accepted can be guided to a bill stacker (not shown) located within the cabinet 1008 of the gaming machine 1002. The bill stacker can hold a maximum number of bank notes or printed tickets, such as up to two thousand.

The gaming machine 1002 can include a sensor for detecting a fill level of the bill stacker. When the bill stacker is full or close to being full, the gaming machine 1002 can be placed in a tilt mode. Next, the cabinet door 1014 can be opened by authorized casino personnel and the full bill stacker can be replaced with an empty one. Then, the door 1014 can be closed and the gaming machine 1002 can be restored to a normal operational mode in which it is available for game play. In accordance with one aspect of the present disclosure, after the security door is close, the interior of the cabinet 1008 (and/or further locked boxes therein, not shown) are flushed with a flow of clean air or other gas.

One function of the printer 1022 is to print "cash out" tickets. In a "cash out," credits available on the gaming machine can be transferred to an instrument, such as a printed and/or magnetically encoded ticket, or wirelessly transferred by way of a secure link to an appropriate account (e.g., the primary player's account) for later access. Typically, a "cash out" can be initiated in response to pressing one of the physical buttons, such as 1032 or 1034, or touch screen button output on a display, such as primary frontal display 1018 or a secondary frontal display such as the one 1026 illustrated to be smaller than and disposed below the primary game outcome frontal display 1018.

In one embodiment, the printer 1022 can be a thermal printer. The printer can be loaded with a stack of tickets, such as a stack with two hundred, three hundred or four hundred tickets. Mechanisms in the printer can grab tickets from the ticket stack and transport the tickets past the print heads for printing. The ticket stack can be located in an interior of the gaming machine cabinet 1008.

The printer 1022 can include sensors for detecting paper jams and a status of the ticket stack. When a paper jam or low ticket stack is detected, the gaming machine 1002 can enter a tilt mode where game play is suspended. In one embodiment, a tower light 1005 disposed above the upper box 1010 can light to indicate the tilt status of the gaming machine 1002. After the tilt condition is cleared, such as by clearing the paper jam or replenishing the ticket stack, and relocking the security doors of the machine, the gaming machine 1002 can enter a normal operational mode where game play is again available.

Figure 8:
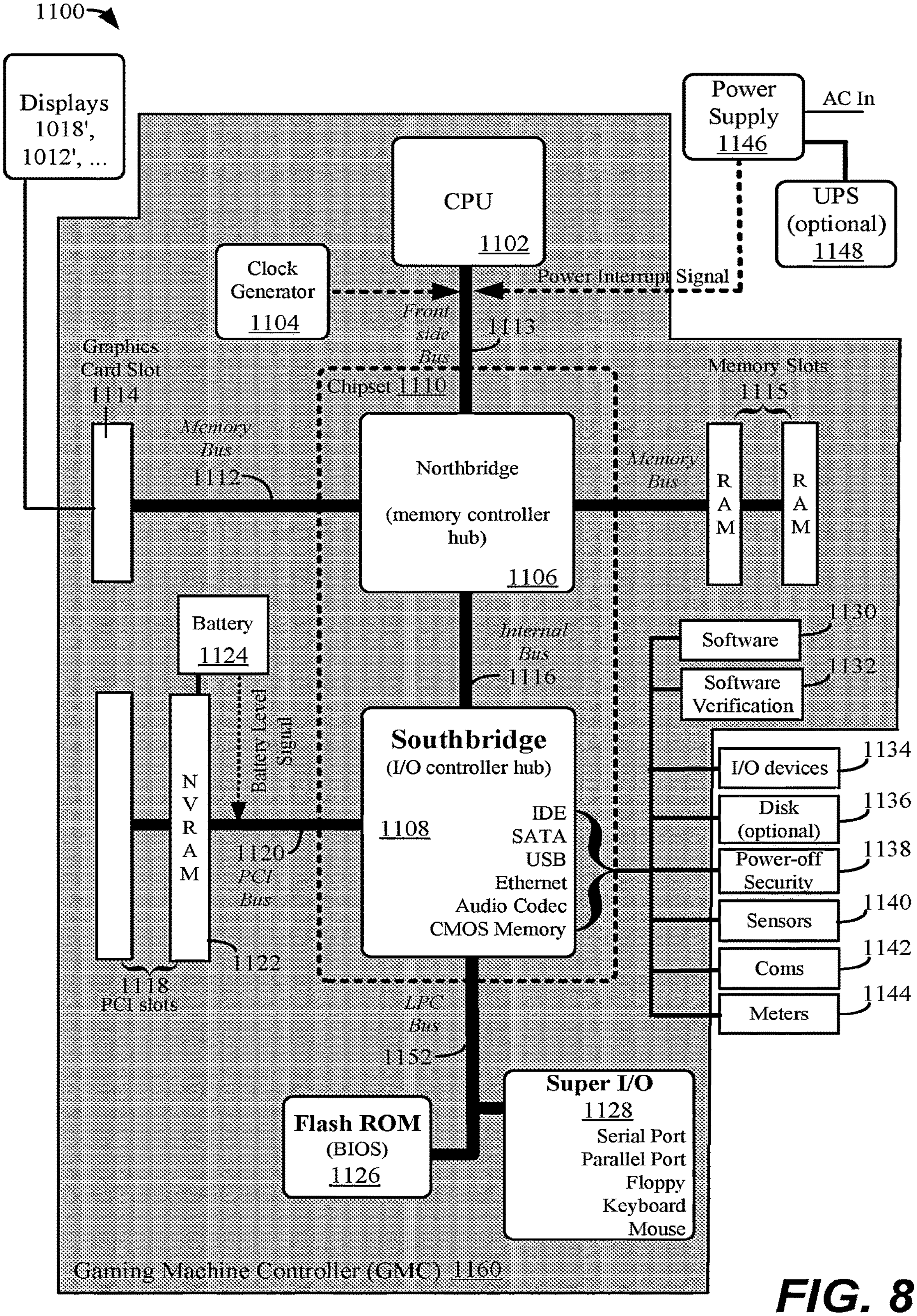
FIG. 8 illustrates a gaming controller in accordance with the present disclosure.

In particular embodiments, the printer 1022 can be coupled to a gaming machine controller (see 1160 in FIG. 8). The gaming machine controller 1160 can be configured to send commands to the printer which cause a "cash out," ticket to be generated. In addition, the printer 1022 can be coupled to other systems, such as a player tracking system (e.g., 1060 in FIG. 2). When coupled to the player tracking system, commands can be sent to the printer 1022 to output printed tickets redeemable for comps (comps refer to complimentary awards, such as but not limited to free credits, a free drink, a free meal or a free room) or printed coupons redeemable for discounts on goods and services. In one embodiment, when a player cashes out and indicates he/she wants to stop playing, adjacent cabinet sidewall displays may be activated to guide that particular player to desired locations which the player can pick from a menu on the slot machine and/or displayed by his/her mobile device app, for example how to best get to the nearest cashier booth, the nearest bar, the nearest or best food dispensary, the hotel desk and so on.

As mentioned, in some embodiments, one or more wireless interfaces 1046 can be provided to operate as secured and/or unsecured wireless communication connections 1036. The wireless connections can be established for example between the gaming machine 1002 and one or more mobile devices, such as smart phone 1006. The wireless connection 1036 can be used to provide functions, such as but not limited to player tracking services, casino services (e.g., ordering drinks, snacks, calling for operator assistance, asking for automated pathway guidance—using sidewall displays such as 1018B and/or 1018R, as described later below) and enhanced gaming features (e.g., displaying game play information on the mobile device). The wireless interface can be provided as a stand-alone unit or can be integrated into one of the devices, such as the bill/ticket acceptor 1022 and the card reader 1028. In addition, the bill/ticket acceptor 1022 and the card reader 1028 can each have separate wireless interfaces for interacting with the mobile device. In one embodiment, these wireless interfaces can be used with a wireless payment system, such as Apple Pay™ or Google Pay™. The wireless payment system can be used to transfer funds to the gaming machine that can be used for wager-based game play.

The door 1014 can allow secured entry access an interior of the cabinet 1008. In one embodiment, the interior of the cabinet 1008 is divided to have a first portion which is cooled by a hermetically scaled and clean or ultra-clean circulating gas and a second portion which is cooled by unsealed flowing air. Additionally, in one embodiment, the interior of the cabinet 1008 which has the unsealed air flowing through it may be further divided such that part of the second portion has unfiltered or coarsely filtered ambient air flowing through it and another part of the second portion has more finely filtered ambient air flowing through it. Thus there can be a number of different air or gas flows moving within the interior of the cabinet 1008, including the hermetically scaled clean circulating gas, the filtered ambient air (e.g., passed through a HEPA filter) and the unfiltered or more coarsely filtered ambient air. In one embodiment, door 1014 has one or more gaskets (e.g., magnetically scaling gaskets) which assuredly seal(s) the respective portions or subdivisions thereof when the door is latched closed so that contaminant containing fluids or gases cannot easily enter. In the case where the first portion is subdivided, each subdivision will typically have a circulating gas ingress conduit which delivers a pre-cooled thermal transfer gas from a higher up heat exchanger to a bottom portion of the subdivision and a circulating gas egress conduit which removes heated transfer gas from a top portion of the subdivision and delivers it to the heat exchanger. A convective loop is thereby defined which can operate even if there is a power outage that deprives blowers of power. This will be made clearer when FIG. 4 is described in detail below. In an alternate embodiment, the entire interior of the cabinet 1008 is cooled by a hermetically scaled and clean circulating gas. The door access system allows components mounted or otherwise disposed within the cabinet, such as air/gas filters (not yet discussed), moisture/particle absorbers (not yet discussed), fans, displays 1018, 1026; speakers 1020*a*, 1020*b*; bill/ticket acceptor 1022 or printer 1024 to be serviced and maintained. For example, a receptor configured to receive currency and tickets, coupled to the bill acceptor, can be emptied. The receptor is often referred to as a bill stacker. In another example, blank tickets can be added to the printer 1022 or paper jams can be cleared from the printer. When door 1014 is opened, the gaming machine can enter a hard tilt state where game play is disabled. Although not explicitly shown, the audiovisual input/output mechanisms of the gaming machine 1002 need not be limited to the illustrated displays 1018, 1026; speakers 1020*a*, 1020*b* and buttons 1032, 1034. Additional audiovisual input/output mechanisms may come in the form of touch-sensitive screens, haptic input/output devices such as vibrators, subwoofers, microphones for picking up verbal requests or audible indications of excitement by the primary player or adjacent other persons and so on. In one embodiment, the chair 1003 may be instrumented so as to detect not only when the primary player 1007 is seated on it, but also when that player is jumping up and down or otherwise moving in the chair due to heightened emotions. This detected movement can be fed back to the services providing network 1004 for adaptively learning what gaming combinations tend to provide more excitement and/or entertainment. This detected movement can also be used by the interior cooling control system to determine if particle anti-lodging actions should be undertaken (reciprocal blowing of air, discussed below). With authorization by the primary player 1007, a microphone and/or motion detector on his/her mobile device 1006 may be activated to provide similar automated feedback. In one embodiment, portions of interface components which are mounted to the cabinet and directly interface with the exterior ambient environment are sealed off, fluid-flow-wise from remaining portions of these components that are directly cooled by the hermetically sealed and ultra-clean circulating gas. (See briefly 310 of FIG. 3.) Fluid impermeable gaskets (e.g., moisture proof and particle blocking; water-tight) may be used to provide the sealing off function.

In addition, a number of further devices (not shown) can be provided within the interior of the cabinet 1008. A portion of these devices is not visible through an aperture in the gaming machine cabinet 1008. For example, a gaming machine controller (GMC) which controls play of a wager-based game on the gaming machine can be found within the cabinet 1008. Typically, the gaming machine controller is secured within a separate lockable enclosure (e.g., a lock box whose interior is directly cooled by the hermetically sealed and clean circulating gas). Details of the gaming machine controller are described below with respect to element 1160 in FIG. 8.

As another example, a number of security and safety sensors can be placed within the interior of the cabinet 1008. The security sensors among these (e.g., see 1140 in FIG. 8) can be configured to detect access to the interior of the gaming machine 1002. For example, the sensors can be configured to detect when the locking mechanism 1016 is actuated, the door 1014 (and/or other security doors) is opened or a locking mechanism associated with the gaming machine controller enclosure is actuated. The safety sensors (not all explicitly shown) may be disposed about the cabinet interior for detecting excessive temperature levels and/or excessive moisture or other contaminant levels. A power source, operable separately from an external power supply, such as a battery can be provided which allows the security and safety sensors to operate and be monitored when the external power supply is not connected or stops functioning for other reasons. In one embodiment, after closure of the main access door 1014 and/or of other security doors, the reclosed interior portion is flushed clean with a flow of an appropriate one of finely filtered air, coarsely filtered air, hermetically sealed and clean gas or with an appropriate sequence of such flows (e.g., coarse air first, then fine air and finely a hermetically sealed and clean gas).

In particular embodiments, the cabinet 1008 can have a sheet metal exterior (e.g., a stainless steel exterior skeleton) designed to provide the rigidity needed to support top boxes, such as 1010 and light kits as well as to provide a serious deterrent to forced entry. For example, the exterior sheet metal can be sixteen gauge steel sheet. Additionally, the door, such as 1014, can be backed with sheet steel in the areas around the displays. Other materials, such as wood, wood composites and sealing gaskets can be incorporated into the cabinet and the example of sheet metal is provided for the purposes of illustration only. Interior lock boxes (not explicitly shown) may also be formed of sheet metal exteriors (e.g., a stainless steel exterior skeleton) designed to provide a serious deterrent to forced entry and in appropriate circumstances, designed to form latchably lockable and re-enterable part or parts of one or more hermetically sealed containment volumes in which a respective one or more clean thermal transfer gases circulate.

Speakers, such as 1020*a* and 1020*b* (only two shown, but there can be more elsewhere disposed), can be protected by one or more metal screens. In one embodiment, a speaker, such as 1020*a* or 1020*b*, can include a subwoofer speaker portion. In general, a sound system associated with the gaming machine 1002 can include an audio amplifier and one or more speakers of various types, such as subwoofers, midrange speakers, tweeters and two-way speakers that also accept voice input.

If the main cabinet 1008 is entered, a "DOOR OPEN TILT" can be displayed halting game play and causing a "DOOR OPEN" event to be sent to the slot accounting system in 1004. In one embodiment, this message can be displayed on the main display 1018. These events can also be stored to the power hit tolerant memory. Upon door closure, the "DOOR OPEN TILT" will be replaced with a "DOOR CLOSED TILT" that can clear after the completion of the next game cycle. Additionally, a logic "DOOR OPEN TILT" can occur if the logic door is opened. The logic door is configured to be lockable independent of how the switch wiring is installed. The gaming machine 1002 can be configured to initiate the logic DOOR "OPEN TILT" regardless of whether or not a lock is installed on the logic door.

The frontal displays such as 1018, 1012 and 1026, the speakers 1020, the printer 1022, the bill acceptor 1024, the card reader 1028 and the button panel 1030 can be used to generate a play of a wager-based game on the gaming machine 1008. Further, the primary display 1018 can include a touchscreen function. The touchscreen function can be used to provide inputs used to play the wager-based game. Some examples of wager-based games that can be played include but are not limited to slot games, card games, bingo games and lottery games. The wager-based games are typically games of chance and utilize a random number generator to determine an outcome to the game.

In general, the wager-based games can be classified as Class II and Class III games. Class II games can include bingo, pull tabs, lottery, punch board, tip jars, instant bingo and other bingo like games. Class III games can include but are not limited to slot games, black jack, craps, poker and roulette.

As described above, the wager-based game can be a slot game. The play of the slot game can involve receiving a wager amount and initiating a start of the wager-based game. A selection of a wager amount and a start of the wager-based game can be performed using buttons, such as 1032 and 1034, on button panel 1030. In addition, the button panel can be used to perform gaming functions, such as selecting a number of lines to play in a slot game, selecting the amount to wager per line, initiating a cash-out and calling an attendant. These functions will vary for different types of games.

In some embodiments, a touch screen function can be provided in or adjacent to (e.g., over) one or more of the frontal displays, such as 1012, 1018 and/or 1026. The combination of the display and touch screen can be used to perform gaming functions that performed using the button panel 1030. Also, display and touch screen can be used to perform operator features, such as providing a game play-back or a hand pay.

The play of wager-based games, such as a slot game, can involve making a wager and then generating and outputting a game presentation. The bet amount can be indicated in display area 1042. The game presentation can include a number of game features that vary from game to game. The game features provide variety in how the outcome to the wager-based is presented. For example, an award to the outcome of the game can be presented in a series of steps that vary from game to game. In some instances, a portion of the total award for a game can be awarded in each step. The steps and their graphical presentation can be referred to as game features. In various embodiments, information associated with one or more of the steps can be stored to a power hit tolerant memory. The power hit tolerant memory is discussed in more detail with respect to FIG. 10.

As an example, a portion of a slot game outcome presentation is shown on frontal display 1018. The slot game outcome presentation can include displaying a plurality of normal reel symbols, such as pointed to by reference 1038 (e.g., blazing sun symbol, wild card symbol, bonus symbol etc.). During the game outcome presentation, the symbols can appear to move on the display 1018 (e.g., vertically to simulate a rotating reel). In addition, symbols can be made to appear to move off the display 1018 and new symbols can be made to newly appear onto the display 1018.

Different combinations of symbols can appear on the primary display 1018 for some period of time, which varies for each instance of the wager-based game that is played. At the end of an action-filled presentation, the symbols can be made to appear to settle and reach a final position or spin outcome. Then an award associated with the game outcome is presented on the display. The total award for the game can be indicated in display area 1044 for example and the total credits available on the gaming machine after the award can be indicated in display area 1040.

In particular embodiments, a portion of the award to the outcome of a game or spin can be presented as a bonus game or a bonus spin (e.g., a free spin). The portion of the award can be referred to a bonus award. The presentation of the bonus award can also be presented in steps where a portion of the bonus award is awarded in each step. These steps can be referred to as bonus game features. In some embodiments, information associated with the steps in the bonus game can be stored to the power hit tolerant memory. In various embodiments, components of the bonus game presentation can be presented on one or more of frontal displays 1018, 1012 and 1026.

More specifically in one embodiment, when a given spin takes place (e.g., indicated as such in one of display areas 1018, 1012 and 1026), a by-chance bonus awarding wheel is presented for actuation by the primary player 1007 (or by a casino dealer in case of a table game) and when actuated, it starts spinning. As the symbols of the spinning wheel in the primary display area 1018 start settling into a near-final outcome state, a relatively large horizontal announcement area may first indicate how close to a jackpot win is the state of the spinning wheel, and then when the wheel finally settles into its final outcome state, announcement area may indicate the win (e.g., "Mini-Jackpot Hit Here !!!) or how close the spin came (e.g., "Missed by one rung!"—not shown). The large announcement area may also be used to indicate the winning of low frequency hands or symbol patterns (e.g., "Royal Flush Here !!"—not shown).

Figure 1B:
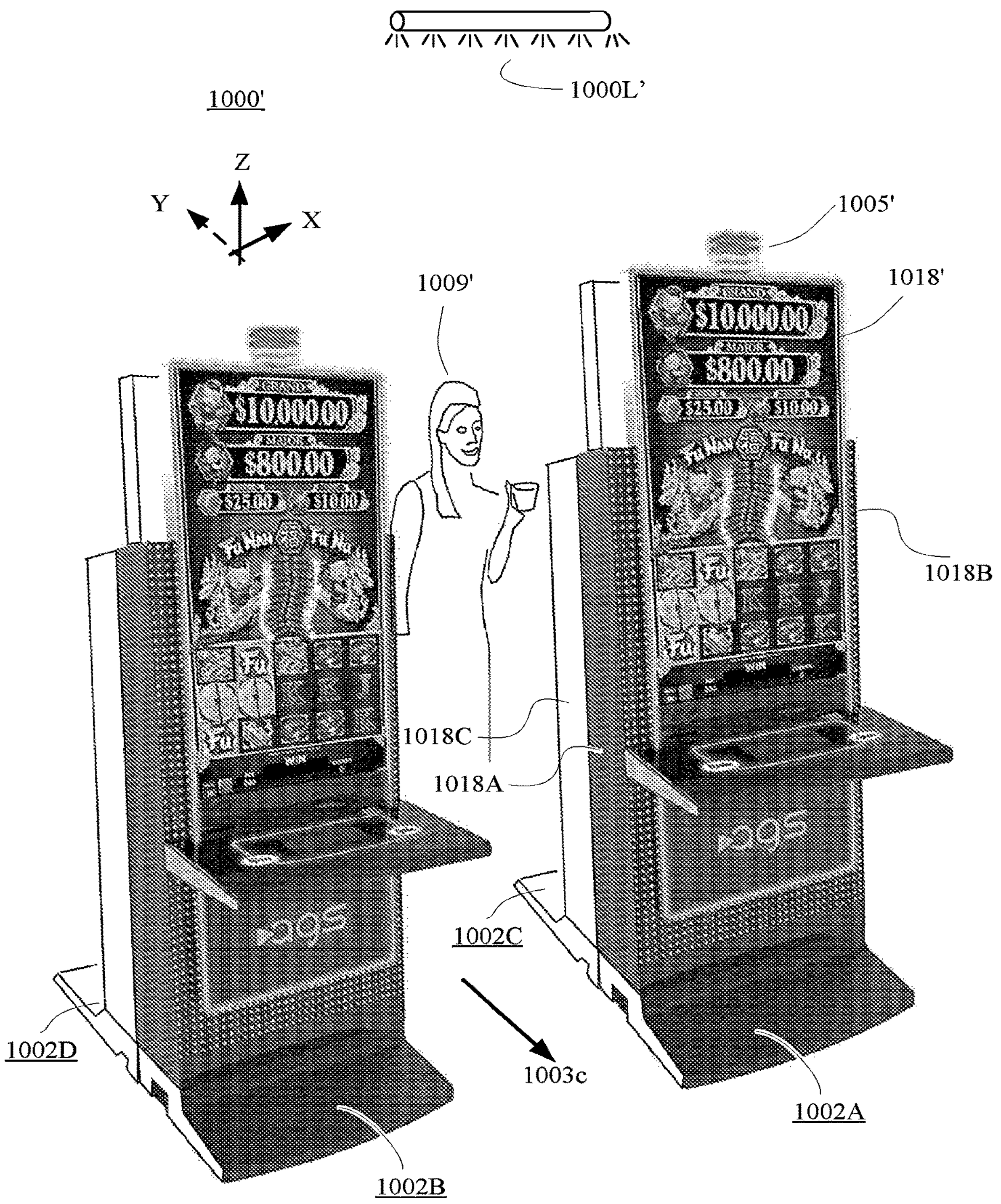
FIG. 1B illustrates a back-to-back kiosk style of organizing slot machines so as to form walk through pathways in accordance with an aspect of the present disclosure.

Next, referring to FIG. 1B, shown is a second gaming environment 1000' where two pairs of so-called or Orion-style slot machines are organized as back-to-back kiosks. That is, a first such slot machine 1002A has its backside joined with the backside of a third slot machine 1002C and a second such slot machine 1002B has its backside joined with the backside of a fourth slot machine 1002D. In the illustrated example, the respective pairs 1002A/1002C and 1002B/1002D are spaced apart from one another in the X direction so as to define a relatively wide walkable aisle or footpath 1003*c* extending in the Y direction and along which one or more walking-through casino guests (e.g., 1009') can pass. In an alternate embodiment (not shown) additional back-to-back pairs of same Orion-style slot machines can abut in the X direction respectively to the right side of first pair 1002A/1002C and to the left side of the second pair 1002B/1002D while leaving the footpath 1003*c* in place. It is to be understood that in addition to the relatively wide walkable aisle or footpath 1003*c*, narrower footpaths will be defined in front of each of the slot machines 1002A-1002D so that players can get to and sit in front of those machines and that passer-byers can at least squeeze through as well.

Referring to the first mentioned Orion-style slot machine 1002A of FIG. 1B, most of the descriptions provided for the slot machine 1002 of FIG. 1A can apply also to the illustrated slot machine 1002A of FIG. 1B. One difference though is that the illustrated slot machine 1002A has a vertically elongated and unitary frontal display 1018' (also denoted as 1018F in FIG. 14A and preferably having a resolution of 1K or better) in place of the top box display 1012 and main frontal display 1018 of FIG. 1A. Although not explicitly shown in FIG. 1B, sound and vibration output devices such as speakers may be positioned at the top of the cabinet for slot machine 1002A so as to be disposed behind that portion of the vertically elongated and unitary frontal display 1018' that extends up above the top of the cabinet. Hot air venting blowers (not shown) may also be disposed there so as to be substantially hidden by that portion of unitary frontal display 1018' that extends up above the top of the cabinet.

Another difference is that the first mentioned Orion-style slot machine 1002A has first and second cabinet sidewall displays 1018A (on the left) and 1018B (on the right). In accordance with a first aspect of the present disclosure, and depending on whether they are exposed at the side of an aisle for viewing by casino guests such as 1009', one or both of these cabinet sidewall displays, 1018A and 1018B, can be activated to add to the optical/audio experience viewable and optionally simultaneously heard by nearby casino guests (e.g., 1009'). In accordance with a second aspect of the present disclosure, the cabinet sidewall displays, 1018A and 1018B, appear as darkened or black surfaces having a metal like texture when not activated. In accordance with a third aspect of the present disclosure, spatially adjoined and/or nearby slot machines (e.g., pairs 1002A/1002C and 1002B/1002D) cooperate with one another so that guest-viewable ones of their respective cabinet sidewall displays work in unison at least in certain circumstances (e.g., event-triggered emergency exit situations as described below, see briefly 1019C of FIG. 1G). More specifically, the right side cabinet sidewall display 1018C of third slot machine 1002C can be operated in unison with the co-planer and adjoining left side cabinet sidewall display 1018A of the first slot machine 1002A such that these sidewall displays (e.g., 1018C and 1018A) appear at least in certain circumstances to operate as a single display. In an alternate embodiment (not shown), an intermediate service unit which is not a slot machine is disposed between the opposed backsides of back-to-back slot machines such as 1002A and 1002C to provide commonly shared services to those back-to-back slot machines (for example, common cooling services, common power supply services, common light sourcing services and common communication services). In such a case, the intermediate service unit (not shown, see briefly 1018I of FIG. 1H) may itself have cabinet sidewall displays of the same vertical length (in the Z direction) as that of the illustrated slot machine sidewall displays (e.g., 1018C and 1018A) where the sidewall displays of the intermediate service unit join with the slot machine sidewall displays (e.g., 1018C and 1018A) to form a display surface that appears to operate as a single display. The apparently-single sidewall display may present text and/or other messages or optical effects to nearby casino guests (e.g., 1009') as will be described in more detail when FIGS. 1G and 1H are described.

Figure 1C:
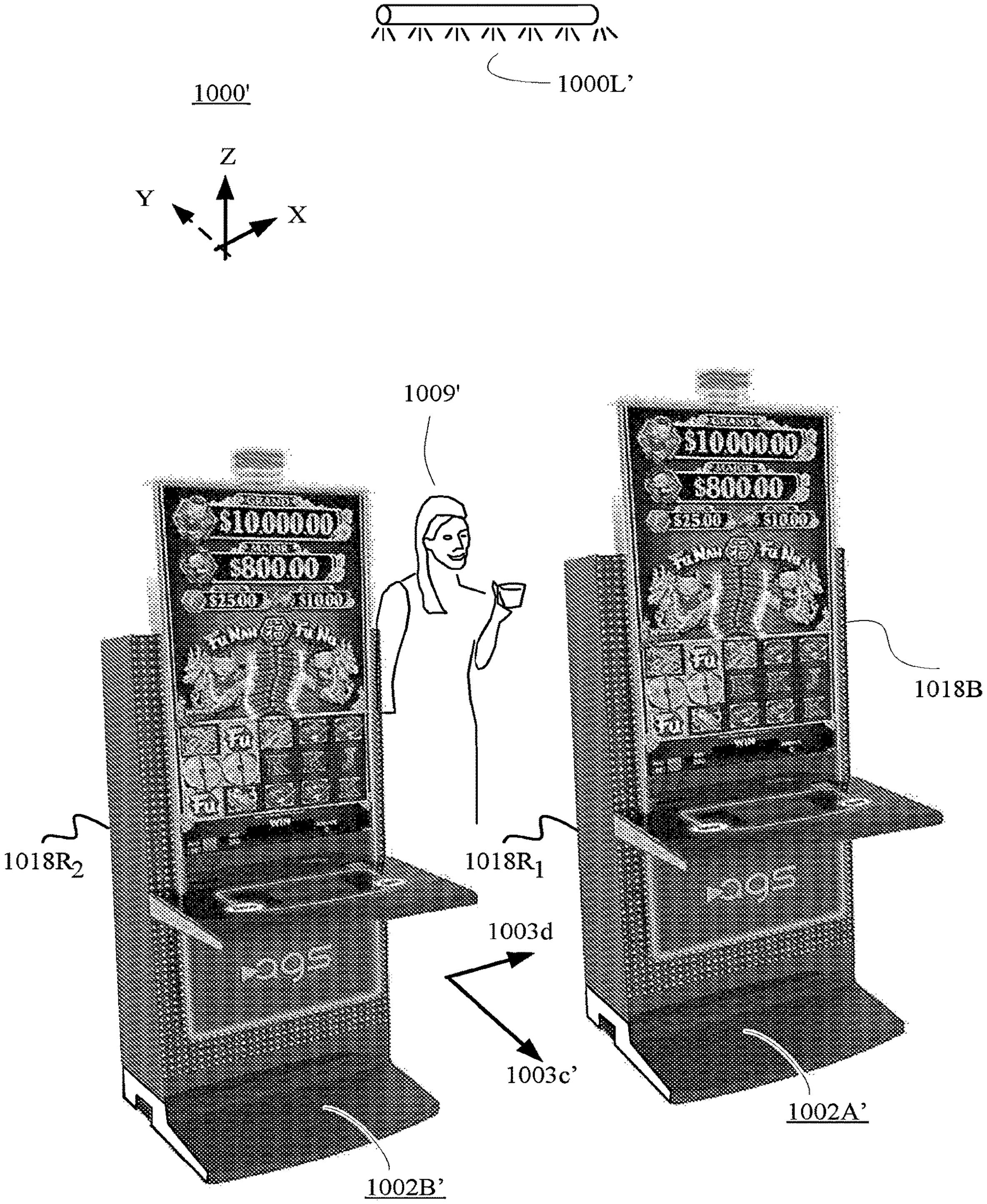
FIG. 1C illustrates an exposed rear faces style of organizing slot machines so as to form walk through pathways extending along backs of the machines in accordance with an aspect of the present disclosure.

FIG. 1C schematically shows in perspective another possible floor plan where at least some slot machines such as 1002A' and 1002B' have at least their respective rear faces 1018$R_1$ and 1018$R_2$ exposed for viewing by casino guests (e.g., 1009'). Slot machines 1002A' and 1002B' may be spaced apart from one another in the X direction as shown to define part of a walkable foot path 1103*c* between them or alternatively they may be disposed abutting one another or closely spaced such that their respective left and right sidewalls are not readily viewable. Slot machines 1002A' and 1002B' are spaced apart in the Y direction so as to define part of another walkable foot path 1103*d* between them and farther behind other machines (or a room wall or other such room feature). Thus, casino guests (e.g., 1009') can walk along the second foot path 1103*d* and view the respective rear faces 1018$R_1$ and 1018$R_2$ of slot machines such as 1002A' and 1002B'. In accordance with the present disclosure, cabinet sidewall displays are provided at least on the rear faces 1018$R_1$ and 1018$R_2$ of slot machines 1002A' and 1002B' so as to provide computer determined images to casino guests (e.g., 1009') standing in or walking along the second foot path 1103*d*. In one embodiment, cabinet sidewall displays are also provided on the left and right sides of slot machines 1002A' and 1002B' so as to provide computer determined images to casino guests (e.g., 1009') standing in or walking along the first foot path 1103*c*. Data processing resources (e.g., CPU's, memories, display drivers) within one or more of slot machines 1002A' and 1002B' and/or within the services providing network 1004 may be employed for generating and/or displaying the computer determined images of the cabinet sidewall displays.

Figure 1D:
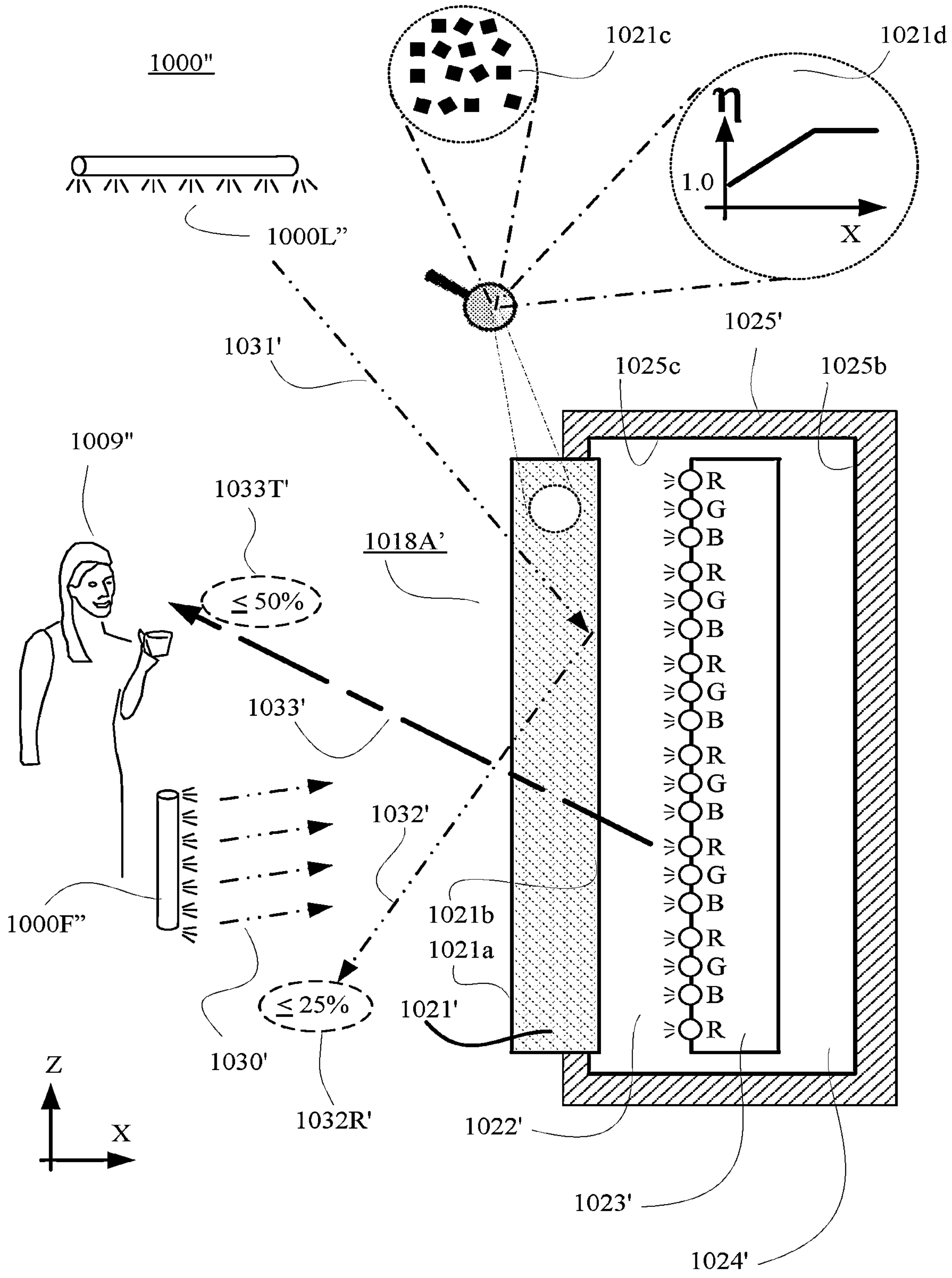
FIG. 1D illustrates a first semi-transparent sidewall display configuration for a gaming machine cabinet in accordance with the present disclosure.

Referring to FIG. 1D, a first embodiment 1018A' of a cabinet sidewall display structure is depicted schematically in cross section with the X axis extending to the right and the Z axis extending upwardly. Front plate 1021' defines a semi-transparent light transmission medium that asymmetrically favors perception by viewing patrons (e.g., 1009') of once transmitted through light 1033' originating from inside the cabinet sidewall display structure as opposed to that of reflected light (e.g., 1032') so that externally sourced light (e.g., 1030', 1031') which could otherwise be reflected from an image displaying surface is perceived as having been substantially absorbed (e.g., by an apparently black surface) and light originating from the display surface (e.g., 1033') is perceived as having brightly come through (e.g., out of the apparently black surface). In one embodiment, plate 1021' is constituted of a semi-transparent material such as a light-passing plastic or other material that has light absorbing particles diffused therein either homogeneously or otherwise, for example as light-collimating structures angled toward the eye elevation of an average guest 1009". Preferably, the density of the light-absorbing particles is such that light rays (e.g., 1030', 1031') incoming from outside the cabinet sidewall display are substantially absorbed and such that a respective optical image generator (e.g., 1023') within the cabinet sidewall display is capable of producing optical images of sufficient intensity so as to be perceived by patrons (e.g., 1009") as coming out of the otherwise dark-appearing semi-transparent front plate. The magnification shown at 1021*c* represents a homogeneous distribution of such light absorbing particles (e.g., black or otherwise colored particles that absorb predetermined portions of the visible spectrum). In one embodiment, light transmissivity (1033T') of the front plate 1021' in the visible range is 50% or less but no less than 5%. That means that at least 75% of external light rays (e.g., 1030', 1031') that enter from outside and reflectively return (if at all) will be absorbed and at most 25% will reflect back (denoted as 1032R'). It also means that 50% or less but no less than 5% of visible range photons emitted from internal light sources (e.g., 1023') will pass through for perception by nearby patrons (e.g., 1009"), where the outgoing transmissivity is denoted at 1033T'. In an alternate embodiment, light transmissivity (1033T') of the front plate 1021' in the visible range is 33% or less but no less than 3%. That means that at least about 90% of external light rays (e.g., 1030', 1031') that enter from outside and reflectively return (if at all) will be absorbed and at most 10% will reflect back. It is within the contemplation of the disclosure to employ other light transmissivity values (1033T') for the front plate 1021' including above 50% but no more than about 70% (so that maximum back reflection is less than 50%).

In one embodiment, the thickness of the front plate 1021' is at least about 2 mm. It could be different however, for example in the range of about 1 mm to 6 mm. The thickness may vary depending on how many laminated layers are used (e.g., ARC layers, color filter layers, polarizing layers, scratch resistance, etc.).

In one embodiment, the refractive index ($\eta$) of the front plate 1021' is relatively low at its front face 1021*a* (e.g., about the same as that of air, around 1.0) so as to minimize refractive reflection and then gradually increases to a significantly greater value with depth beyond the front face 1021*a* (e.g., to about 1.5 or higher) for example as schematically graphed at 1021*d* in FIG. 1D. As a result of the stepped increase of refractive index ($\eta$), there is little refractive reflection (e.g., preferably no more than about 5%) at the front face 1021*a* and thus minimized glare at that front face 1021*a* while at the back face 1021*b* the incoming light can be dispersed (e.g., using dispersion/diffusion techniques such as discussed for FIG. 1E) so as to suppress clear reflection of optical point sources. The stepped increase of refractive index (η) in the X direction may be realized by forming front plate 1021' as a laminated structured having films (not shown) of progressively increasing refractive index. In one embodiment, the film can include anti-reflection coatings (ARC's) configured to minimize reflection of certain prespecified wavelengths (e.g., due to reflected light rays traveling a total of half a wavelength and canceling out with incoming rays). The specific prespecified wavelengths to be operated on by the ARC layers may be ones known to be especially intense within the gaming environment and proximate to the respective cabinet sidewall displays. It is within the contemplation of the present disclosure to allow for more than 5% reflection in the visible range in cases where costs for further reduced reflectivity are prohibitive.

In one embodiment, the light-absorbing particles (1021*c*) are selected to predominately absorb in the spectral ranges output by ceiling lighting 1000L" and on-floor lighting 1000F" of the encompassing gaming environment 1000". The ceiling lighting 1000L" and on-floor lighting 1000F" may include fluorescent lamps and/or light emitting diodes (LED's). Typically, during gaming hours, the ceiling lighting 1000L' is kept dimly lit relative to on-floor light sources (e.g., 1000F") so that the on-floor light sources (e.g., those originating from the gaming machines) dominate user experience. Typically, other items in the gaming areas such as flooring, walls, seats, non-game-presenting sides of gaming machines (e.g., their rear sidewalls) are darkly colored so that the on-floor light sources (e.g., those originating from the gaming machines) dominate the user's psycho-optical experience.

In one embodiment, the light-passing portion of the semi-transparent material of front plate 1021' has a relatively high refractive index (e.g., substantially greater than 1.0) relative to air at its back face 1021*b* so that light rays 1031' originating from the ceiling area 1000L" tend to reflect off of the back surface 1021*b* of plate 1021' where that back surface interfaces with a housing internal air spacing 1022'. Both the ceiling omitted light rays 1031' and the refraction-wise reflected light rays 1032' travel through the semitransparent front plate 1021' in a manner where most, if not substantially all of their photons are absorbed by the light absorbing particles (e.g., 1021*a*) of the front plate. In cases where the ceiling lighting 1000L' is kept dimly lit, the darkness of the cabinet sidewall displays (when not activate) dominates and activated ones of the housing internal lights also dominate (because the internal light sources (e.g., RGB) are operated as high intensity ones). In one embodiment, front plate 1021' includes one or more light polarizing films that allow light rays (1033') originating from inside housing 1025' to exit while substantially preventing light rays (1030', 1031') originating from outside housing 1025' to reflect back out after having encountered the front plate 1021'. Alternatively or additionally, other methods of creating perception of substantially non-reflective dark cabinet sidewall displays whose internally originated lights shine through the apparently dark cabinet sidewall displays when the internally originated lights are activated may be employed, including for example black mask technology (discussed below).

Stated otherwise, when internal light emitting sources such as the exemplary RGB sources of internal display 1023' are not emitting relatively bright lights, the frontal plate 1021' appears to patrons (e.g., 1009") to be a substantially black or other dark colored plate (e.g., like a substantially non-reflective metal cabinet sidewall plate). On the other hand, when various parts of the internal display 1023' light up, their respective light rays (e.g., 1033') shine through while remaining portions of the cabinet sidewall structure 1018A' continue to appear darkened so as to create a stark difference (e.g., similar to star lights of a black night sky) between the lit up parts and those that are not. In alternate embodiments, the light absorbing particles of the semi-transparent front plate 1021' may be configured to reflect rather than absorb certain specific wavelengths so as to give the semi-transparent front plate 1021' a darkened color appearance other than black (e.g., dark blue, dark purple or dark green). While a light-passing plastic is mentioned as one possible light-passing material having a relatively high index of refraction and absorbing particles distributed therein for the semi-transparent front plate 1021', it is within the contemplation of the present disclosure to additionally or alternatively use other materials including for example a smoky glass. In one embodiment, the semi-transparent front plate 1021' is a laminated structure having a thin, scratch resistant cover layer (e.g., made of glass or a scratch resistant polycarbonate) on its aisle facing surface 1021*a* followed by other optical processing layers that are organized to redirect and/or polarize and/or absorb light rays (1031') originating from external ceiling and floor areas (1000L", 1000F") while enabling other light rays (1033') that originate from the interior display 1023' of the cabinet sidewall display structure 1018A' to pass through for visualization by nearby guests (1009") without being fully blocked by the light absorbing particles (and/or a black mask, described below). When the internal lights (e.g., 1023') of the cabinet sidewall display structure 1018A' are not turned on, the cabinet sidewall display structure 1018A' acts as a non-reflective dark surface that does not create unintended glare or other undesired optical effects by reflecting back external lights (1000L", 1000F").

The interior display 1023' of the cabinet sidewall display structure 1018A' may have colored and/or white light emitting elements arranged in various manners for creating desired optical experiences for nearby guests (1009"). Examples of such light sources (but without limitation) include transmissive LCD displays, OLED displays, high intensity groupings of LED's and so on. Alternatively, a guest-facing interior wall 1025*b* of a protective (e.g., metal) housing 1025' of the cabinet sidewall display 1018A' may have reflective elements (e.g., electronically controlled reflectors, i.e. computer controlled MEM mirrors) where lighting for such reflective elements is provided from interior other surfaces of the housing 1025' (e.g., including surfaces not shown in the cross section of FIG. 1G but extending parallel to the X-Z plane and/or parallel to the X-Y plane as does surface 1025*c*). In one embodiment, the sourced lights may come into the interior of housing 1025' by way of optical fibers (not shown). In one embodiment, the high intensity light emitters may be provided within housing 1025' (e.g., on display plate 1023') in the form of high-powered red (R), green (G) and blue (B) LED's, laser LED's, or OLED's. Protective housing section 1025' may join with the front plate 1021' to form a substantially air-tight region through which a cooling fluid may flow from respective inlet tubes entering the interior to respective outlet tubes exiting the interior of housing section 1025' (tubes not shown—see also the description of FIG. 3).

In one embodiment, cooling for the high intensity light emitters within housing 1025' is provided by the blowing of a relatively clean, thermal transfer gas (e.g., filtered clean air) through air spaces (e.g., 1022' and 1024') surrounding the light emitters and respective electronic drive components (not shown) for those light emitters. In one embodiment, the blown thermal transfer gas flows within a clean sealed loop such that it is not contaminated by dust and other particles or vapors found in the ambient atmosphere of the casino environment 1000". Preferably, the flowing thermal transfer gas moves generally in an upward direction (in the +Z direction) so that its movement is assisted by convective forces. Electrical power and control signals for the light emitters within housing 1025' (and optionally externally generate lights) may be provided into the housing by way of one or more electrical and/or optical cables (not shown) passing into the interior of housing 1025' through sealed air-tight grommets. Electrical and/or optical signals may be transmitted as serial multiplexed signals. Housing 1025' may be an integral side portion of the rest of a secured housing for a respective slot or other gaming machine such as that described in conjunction with FIG. 1A. (See also FIG. 3 described below.)

Figure 1E:
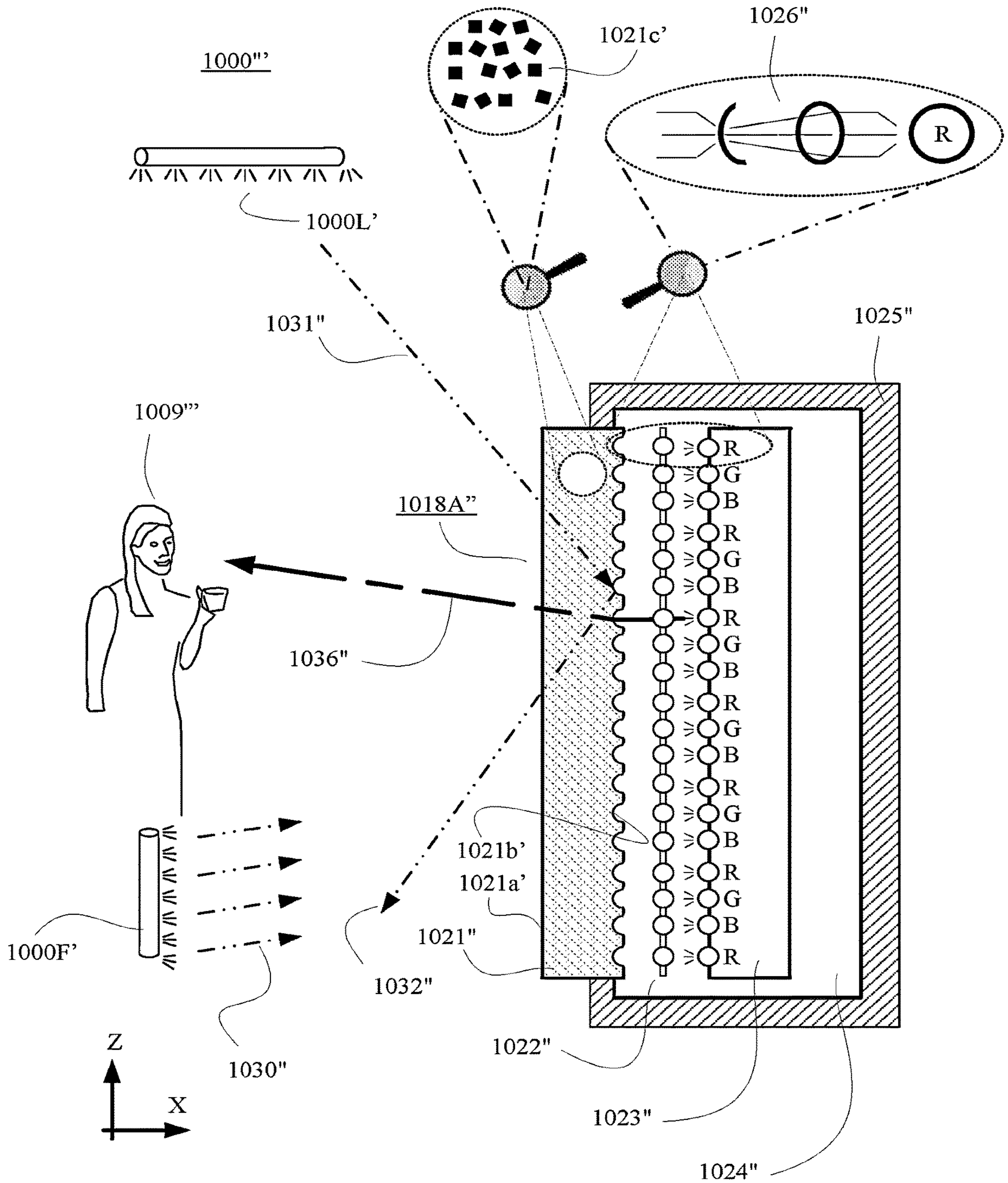
FIG. 1E illustrates a second semi-transparent sidewall display configuration for a gaming machine cabinet in accordance with the present disclosure.

Referring to FIG. 1E, a second embodiment 1018A" of a cabinet sidewall display structure is depicted schematically in cross section. Once again, guest-facing plate 1021" defines a light transmission medium that asymmetrically favors perception by viewing patrons (e.g., 1009') of once transmitted through light 1036" as opposed to that of reflected light (e.g., 1032") so that externally sourced light (e.g., 1030", 1031") which could otherwise be reflected from an image displaying surface is perceived as having been substantially absorbed (e.g., by an apparently black surface) and light originating from the display surface (e.g., ray 1036") is perceived as having brightly come through (e.g., out of the apparently black surface). In one embodiment, plate 1021" is constituted of one or more semi-transparent materials such as light-passing plastics (e.g., acrylic, polycarbonate) that have light absorbing particles diffused therein either homogeneously or for example as elongated light-collimating structures. However in this embodiment, the back wall surface 1021*b*' of plate 1021" has grooves and/or recesses carved into it as schematically shown for thereby creating light dispersing structures. Because the refractive index, at least at the back wall surface 1021*b*' of plate 1021" is relatively high (e.g., n>1.0), light rays 1030", 1031" originating from the external environment (1000L', 100F') are reflectively dispersed by the light dispersing structures such that the incoming light rays generally do not reflect back to the eyes of nearby casino guests 1009'" and instead travel in different directions through the light absorbing material of the guest-facing plate 1021" so as to be substantially absorbed and thus give the plate 1021" the appearance of a black or otherwise darkened surface. Additionally, in one embodiment, the semi-transparent front plate 1021" is a laminated structure having a thin, scratch resistant cover layer (e.g., made of glass or a scratch resistant polycarbonate) on its aisle facing surface 1021*a*' followed by other optical processing layers that are organized to redirect and/or polarize and/or absorb light rays (1031") originating from external ceiling and floor areas (1000L', 1000F') while enabling other light rays (1033") that originate from the interior display 1023" of the cabinet sidewall display structure 1018A" to pass through for visualization by nearby guests (1009") without significant diminishment. When the internal lights (e.g., 1023") of the cabinet sidewall display structure 1018A" are not turned on, the cabinet sidewall display structure 1018A" acts as a non-reflective surface that does not create unintended glare or other undesired optical effects by reflecting back external lights (1000L', 1000F').

The light-dispersing structures at the back surface 1021*b*' of the front plate may be provided as horizontally extending semi-cylindrical troughs, or as vertically extending semi-cylindrical troughs, or as otherwise extending and differently shaped grooves (including zigzagging grooves having sawtooth cross sections) and/or as hemi-spherical or otherwise shaped recesses. The grooves or recesses may be filled with a light passing material having a refractive index less than that of at least the back surface 1021*b*' of the front plate.

A set of optical pre-processing elements such as convex lenses or lenticular lenses may be interposed as shown at 1022" in the air space between the image forming plane (e.g., 1023") of the light sources and the light-dispersing structures at the back surface 1021*b*' so as to counter image distorting effects of those light dispersing structures. An example is shown within magnification 1026". Light rays from a respective light producing element (e.g., a Red LED) are first condensed by a pre-processing convex lens and then the condensation of the light rays is reversed by the counter-facing concave recess or groove of the back surface 1021*b*' of plate 1021". (A more detailed explanation is provided for FIG. 1F.) Accordingly, the image produced by the housing-internal light sources is preserved to pass through the rest of the front plate 1021" while lights originating from the exterior (e.g., 1031" from ceiling lights 1000L') are dispersed by the light-dispersing structures at the back surface 1021*b*'. While not shown, it is within the contemplation of the present disclosure to use alternative or other optical processing layers including an antiglare layer, an optical bandpass layer or bandpass strips, polarizing layers, a perforations populated black mask and either a static or computer-controlled dynamic collimating layer (e.g., one made of liquid crystals) so as to provide additional optical effects.

Figure 1F:
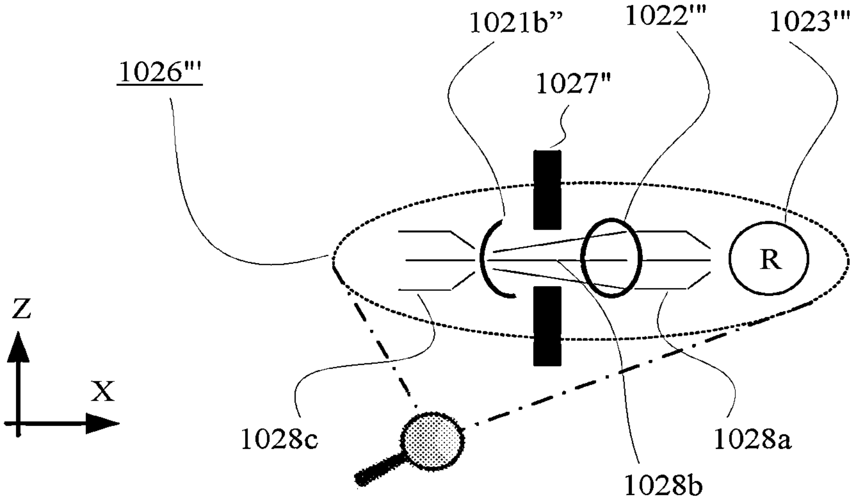
FIG. 1F illustrates part of a third semi-transparent sidewall display configuration for a gaming machine cabinet in accordance with the present disclosure.
Figure 1G:
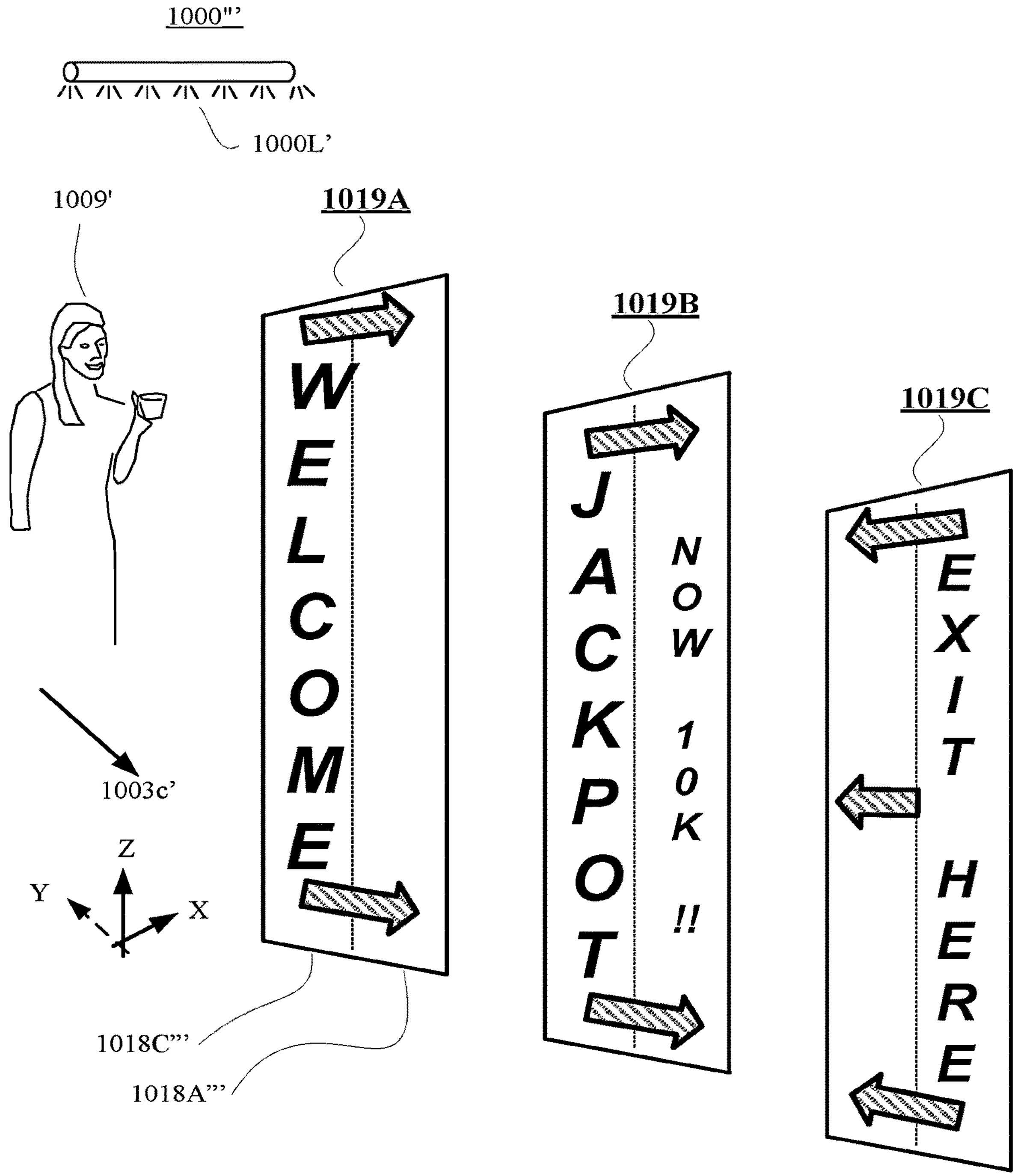
FIG. 1G illustrates some of the displayed images that may be formed on the sidewalls of gaming cabinets in accordance with the present disclosure.
Figure 1H:
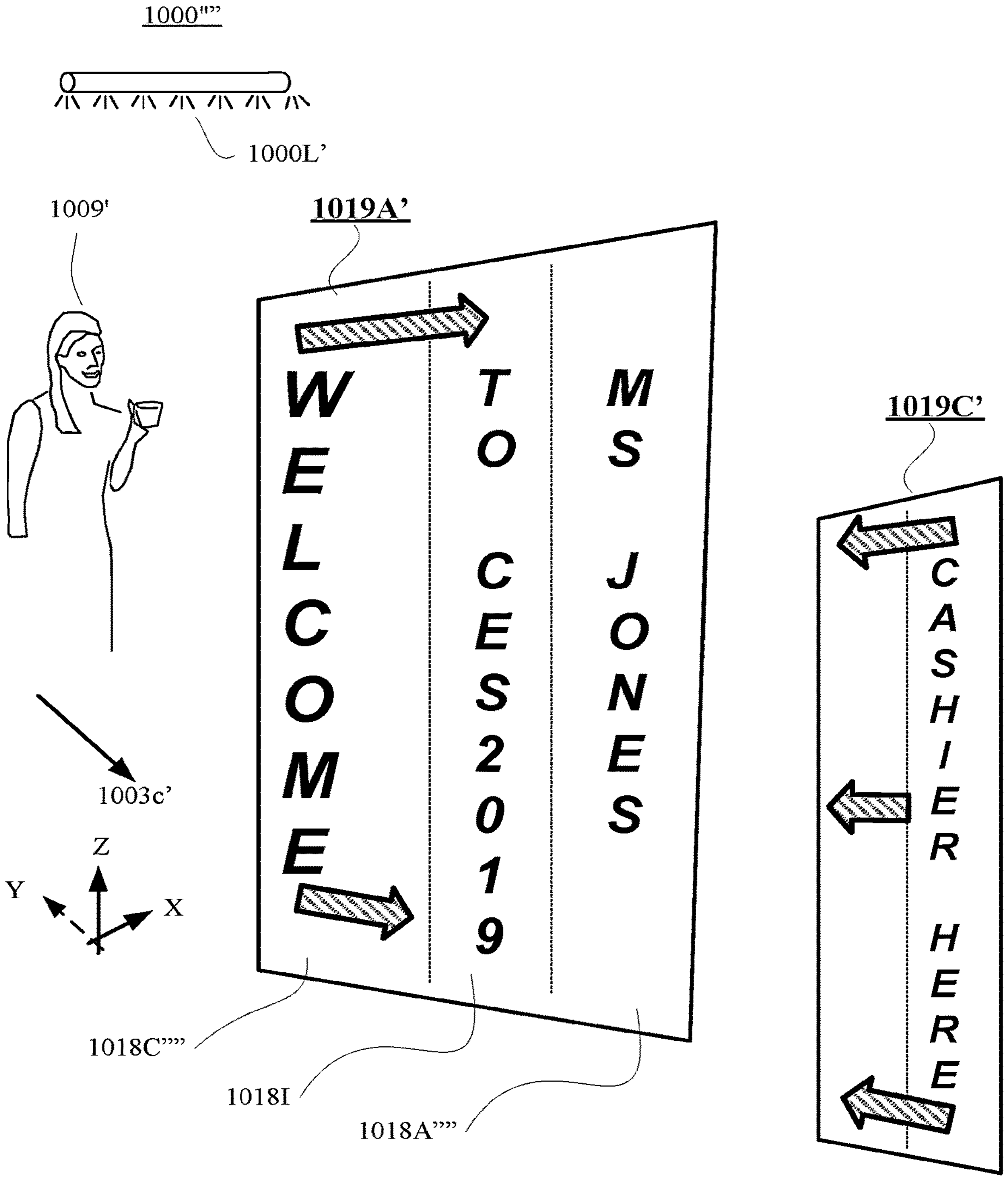
FIG. 1H illustrates some further displayed images that may be formed on the sidewalls of gaming cabinets in accordance with the present disclosure.

FIG. 1F, shows an example 1026'" where a perforations populated black mask 1027" is included. Light rays 1028*a* emanating from light source element 1023'" (e.g., a Red LED or Red LCD pixel) are intercepted by convex lens 1022" (or another such rays condensing element). The condensed rays 1028*b* pass through an appropriately sized and aligned aperture of a black mask 1027". When the aperture-passed rays 1028*b* encounter concave lens surface 1021*b*" (or another such rays de-condensing element), the condensing effects of element 1022" are substantially reversed and the resulting light rays 1028*c* continue on their journey in the leftward direction of FIG. 1F through the material of the front plate (1021"—not fully shown in FIG. 1F).

By contrast, when externally sourced light rays enter from the left side, the higher-to-lower refractive index gradient present at the surface of concave lens surface 1021*b*" (or of another such rays de-condensing element) causes the externally sourced light rays to spread out (not shown) such that at least a portion if not most of them strike the black mask 1027" rather than passing through the aperture. Thus the left to right traveling light rays are absorbed and back reflection is inhibited.

The embodiment illustrated in FIG. 1F may be fabricating by selectively etching the back face of front plate 1021" to have de-condensing elements such as 1021*b*"; depositing a light-passing material having a lower refractive index on top; planarizing the deposited material; depositing the material of the black mask 1027", selectively etching to form apertures aligned to the de-condensing elements (1021*b*"); depositing a second layer of the light-passing material having the lower refractive index; selectively etching partially into it for defining the shapes of next formed rays condensing elements (1022"); then depositing and etching a further layer of light-passing material having a higher refractive index to form the rays condensing elements (1022"). A spacer layer having the lower refractive index may then be deposited and planarized before display element 1023" is attached. In addition to black mask 1027", the image generating display apparatus of which display element 1023" is a part may have its own black mask (not shown) with corresponding apertures for letting through the light rays of its display elements (e.g., 1023").

Referring to FIG. 1G, shown is a gaming environment 1000'" in which the cabinet sidewall displays (e.g., 1018A'", 1018C") of back-to-back slot machines (not fully shown) operate as a unified display, for example that schematically shown at 1019A to display location-relevant messages to nearby guests (e.g., 1009') present in and/or walking through the adjacent aisle area 1003*c*'. More specifically and as one example, if the adjacent aisle area 1003*c*' is at the periphery of an area densely populated by grouped slot machines and/or other gaming devices, the first few cabinet sidewall displays in the periphery of the area may be programmed to periodically display welcoming messages and/or optical effects that entice guests (e.g., 1009') outside the periphery to enter into the machine-populated area. In an alternate embodiment, guest detecting sensors are embedded in the carpeting of the adjacent aisle area 1003*c*' and/or elsewhere for detecting the presence and/or movements of guests and the cabinet sidewall displays (e.g., those of example 1019A) are programmed to light up when a guest approaches the periphery, thus creating an impression that the welcoming message was specifically targeted for that guest. Additionally or alternatively, bands of colored lights may be displayed streaming inwardly toward the machines-populated floor space so as to entice guests toward that area. It is to be understood that the display of text messages, symbolic messages (e.g., arrows) and various lighting effects may include scrolling them in various directions (including horizontally and/or vertically) and strobing (flashing) them and/or alternating them with other images in accordance with various timing schemes that create desired psycho-optical experiences including those synchronized with various background noises (e.g., slot machine emitted noises or vibrations, progressive jackpot announcements, etc.).

Referring to example 1019B, the messaging and/or lighting effects provided on appropriately located cabinet sidewall displays may be synchronized to gaming action outcomes. For example, if a certain local progressive jackpot pool reaches a milestone (e.g., "Local Jackpot Now at $10,000 !!"); the cabinet sidewall displays may post such a message and indicate the direction to be traveled to witness subsequent action at the gaming stations where the jackpot amount is still to be won. In one embodiment, predetermined color codes are flashed on the cabinet sidewall displays for privately indicating to casino operators or floor agents where their attention is to be directed and for what reason (e.g., to assist a player who has just hit a big jackpot and needs to fill in tax forms).

Referring to example 1019C, the messaging and/or lighting effects provided on appropriately located cabinet sidewall displays may be to guide casino guests out of densely populated machine areas to various desired destinations, such as for example to the floor exit points. This may be particularly useful in instances of emergency where a floor area needs to be cleared of guests in an orderly and well distributed manner. Additionally or alternatively, similar messages may be periodically flashed or triggered by respective events for guiding guests toward restroom areas, cashier booths or other casino resource areas. This can reduce the workload on floor agents who otherwise would be asked by guests for assistance in finding these various resources.

Although the examples described for FIG. 1G focus on providing participants (e.g., 1009') with visual assistance and/or enhanced entertainment by way of the cabinet sidewall displays (CSD's), it is within the contemplation of the present disclosure to have one or more of the CSD's be operatively coupled to and cooperative with an audio output device (e.g., a speaker) such that optical effects output by the CSD are responsive to (e.g., at least partly) to audio content output by the corresponding audio output device and/or supplement the audio content. The corresponding audio output device may be embedded in the associated gaming machine and/or may be part of a casino floor speaker system. More specifically and as an example, the visual exit signage depicted in example 1019C may be supplemented with audio instructions, especially in emergency situations, verbally instructing casino guests to follow the visual cues provided by the CSD's when leaving a to be-evacuated portion of the floor. For the case of more private messages as will be shortly described in example 1019A' of FIG. 1H, the optional associated audio output device may be a directed one (e.g., a phased array of speakers) that directs the audio content to a specific one or group of people in the vicinity.

Referring to FIG. 1H, shown is a gaming environment 1000"" in which the cabinet sidewall displays (e.g., 1018A"", 1018C"") of back-to-back slot machines (not fully shown) operate as, or as part of a unified display 1019A' for providing more personalized messages or other guidances to specific guests or types of guests. For example, a casino/hotel guest 1009" " may be carrying a mobile smartphone or other self-identifying device (including possibly an identification badge having a guest-identifying RFID device embedded in it) which automatically informs adjacent data processing resources of their arrival at the periphery of the slot machines area (at aisle portion 1003*c*"). In response to this wireless detection (and/or a face recognition-based detection), the unified display 1019A' may flash or scroll a more personalized welcoming message such as, "Welcome to CES 2019 Ms. Jones". This may be followed by a further personalized message such as, "Walk this way for your complimentary drinks." The guest is then further guided along a desired footpath by cabinet sidewall messagings that track his or her movements as she is guided to a desired location and optionally along a predetermined footpath (e.g., one that takes her past an enticing jackpot machine or one that bypasses a crowded area).

Yet further personalized messagings provided by way of the cabinet sidewall displays can be automatically generated to respond to needs of primary slot machine players, such as for example if they desire to reserve a particular machine for a short time, use the restrooms and then return to that same machine. In one embodiment the player indicates such a desire through the frontal controls of the slot machine and/or through a casino-provided application provided on her smartphone. The cabinet sidewall displays then indicate to the player which way to head to the restrooms and then how to get back to that same machine. At the same time the sidewall cabinet display of the reserved machine may flash an indication that this particular machine is temporarily reserved. Additionally or alternatively, a similar process may be used when the player needs to purchase more chips or other credits at the cashier booth. The sidewall cabinet displays may guide the player to the nearest cashier booth while temporarily reserving her desired slot machine.

As mentioned above, in one embodiment a commonly shared utilities cabinet (not fully shown) may be interposed between back-to-back slot machines so as to provide commonly used services including, but not limited to, cooling airflow, power supplies, light sources, security measures, network communications and so on. The cabinet sidewalls of such interposed utility cabinets may have corresponding semi-transparent display areas (e.g., 1018I) matching with and joining with those (e.g., 1018A"", 1018C"") of the back-to-back slot machines to form unified messaging areas such as the illustrated, three-section area identified as 1019A'. The joining of the separate sections may be substantially seamless or with small width bezels provided between them. This arrangement allows for larger cabinet sidewall displays (not limited to the dimensions of just the slot machines).

Next, referring to FIG. 2, further details of one embodiment of the network services providing portion 1004 and of gaming machine operations, including organization of plural machines as banks disposed close to one another on a sensor embedded floor and possible points of weakness due to such organization are described. In FIG. 2, gaming system 1050 is depicted as including three banks of gaming machines, 1052*a*, 1052*b* and 1052*c* while showing just three side-by-side slot machines in each bank. However, it is to be understood that the banks may alternatively be organized as back-to-back slot machines having a left and right cabinet sidewall displays in accordance with the present disclosure as opposed to cabinet sidewall displays on their rear sides. The choice of three machines per bank is merely for purposes of illustration. A different number of side-by-side and back-to-back slot machines in each bank could be used (e.g., 4, 5, 6, 8 etc.). What is of importance here is how many machines (or banks of such machines multiplied by the machines per bank factor) can be practically assigned to participate in each kind of game (e.g., a high frequency progressive jackpot pool) without running into problems such as when too many people crowd into the area with drinks, snacks, cigarettes and emit undesirably high levels of contaminants (e.g., smoke, dust, moisture, rubbed off carpet fibers, etc.) into the local ambient. While, on the one hand it may be desirable to have crowds of people gather about certain machines for creating a heightened sense of social engagement, too many people can be a problem. It has been found for example that the tars and nicotine in cigarette smoke can create sticky films inside the interiors of unsealed cabinets where the sticky films have dust, carpet fibers, skin dandruff, plant pollen and other thermally insulative materials adhered to them so as to create blankets over all interior components that prevent proper cooling. This is believed to lead to undesirably reduced MTBF's. It has also been found as another example that too many people playing for one local, high-frequency payoff jackpot can create a sense of unfairness where one player hits the jackpot and a second player immediately adjacent to the first misses the jackpot pay off by a split second. Therefore, it may be desirable to provide for crowd density control in part by using the cabinet sidewall displays for guiding crowds to different areas of the casino floor so as to avoid excessive crowding but at the same time to provide sufficient player population density for optimizing social engagement. In one embodiment, the aisle adjacent cabinet sidewall displays are used for automatically guiding different groups of potential players to different areas of the casino floor so as to avoid overcrowding while optimizing crowd-based social engagement that enhances the gaming experience of participating players and their bystanders.

Still referring to FIG. 2, the network services providing portion 1004 includes a central determination server 1054, a local progressives server 1056, a wide area progressives server 1058, a player tracking/slot accounting system server 1060 and ticket-in/ticket-out (TITO) server 1062. In gaming system 1050, all of the gaming machines in each bank, 1052*a*, 1052*b* and 1052*c*, are operatively coupled to the slot accounting system server 1060 and the TITO server 1062. However, for purpose of illustration it is assumed that only the gaming machines in bank 1052*a* are coupled to the central determination server 1054. Further, it is assumed that only gaming machines in bank 1052*b* and display 1068 are coupled to the local progressive server 1056. Finally, it is assumed that only the gaming machines in bank 1052*c* are coupled to the wide area progressive server 1058. The communication couplings between the gaming machines in each bank and the servers 1054, 1056, 1058, 1060 and 1062 can be wired connections, wireless connections or various combinations/permutations thereof.

In various embodiments, the central determination server 1054 can be used to generate a controlling portion of the game played on the gaming machines in bank 1052*a*. For example, the central determination server 1054 can be used to generate random numbers (by any of a variety of RNG techniques including those corresponding to examples mentioned above) used to determine outcomes to the games played in bank 1052*a*. In another example, the central determination server 1054 can be used to generate all or a portion of the graphics used during play of the games on the gaming machines in bank 1052*a*. For instance, the central determination server 1054 can be configured to stream a graphical presentation of a game to a gaming machine, such as that of upper display graphics 1064 and/or of the gaming machine's lower displays. (Lower displays not numbered here because primary player 1062*a* is illustrated obstructing those further displays.) The streamed upper display graphics 1064 may include that which on occasion (e.g., randomly or pseudo-randomly) reveals an active special bonus situation (e.g., Possible Jackpot win Here), reveals the awarding of a substantial prize (e.g., Jackpot !!! in area 1012*e*). The streamed graphical presentations can be output to respective displays on respective ones of the gaming machines and also to additional larger displays mounted on walls or other fixtures near the respective bank of machines and/or to appropriate ones of cabinet sidewall displays. Because execution of gaming actions within the central determination server 1054 takes priority over the updating of the displays (signages) on the external machines (e.g., those of bank 1052*a*), there may be a slight delay between when an outcome of a specific gaming action is internally determined in the central determination server 1054 and when the displays (signages) on corresponding external machines (or signages on nearby additional displays) get updated to reflect the latest outcomes. This will be referred to herein as signage latency. Signage latency can vary as function of work load placed by higher priority operations on the data processing resources of the network services providing block 1004. If some of the circuits are overheating, processor clocking speeds may have to be reduced and signage latency may undesirably increase.

In one embodiment, the central determination server 1054 can be used to randomly generate numbers and/or other symbols used in a bingo type games played on the gaming machine in bank 1052*a*. These bingo type games are often referred to as class II games whereas traditional slot machines are referred to as class III games. In class II games, a draw of numbers (and/or other symbols) is made. The numbers/symbols can be mapped to a bingo card or equivalent, which the player purchases to play the bingo type game and which the player (e.g., 1062*b*) focuses on as the numbers/symbols are called or otherwise published. The announced/published draw of numbers/symbols can result in at least one winning game combination on the bingo type cards participating in the current bingo type game. In some games, the first player to recognize and call (or otherwise publicly indicate) his/her completion of a bingo like pattern wins the entire prize (a winner takes all rule for the first-in-time winner). In some other games, all the players who recognize and call their completion of a bingo pattern within a predetermined first time window after the last bingo number was announced, split the prize or all win the same prize amount. In yet other games, the machine system automatically determines who the winners are without need for player recognition and call indication.

The central determination server 1054 can be configured to repeat the number draws for the bingo type games at regular intervals. For example, number draws can be repeated every 20 milliseconds or according to a longer interval period. Players at the various gaming machines coupled to the central determination server 1054, such as the players at the gaming machine in bank 1052*a*, can initiate bingo games which utilize the bingo numbers from a particular bingo number draw. The bingo numbers in the number draw can be mapped to a bingo card displayed on the screen of the gaming machine, such as on display 1064.

Wins can be indicated by a winning pattern on the bingo card, such as four in a row or four corners. In response to a winning pattern on a bingo card on a particular gaming machine, the central determination server 1054 can send a prize amount associated with the win to the gaming machine with the winning pattern. This prize amount can be displayed on the gaming machine and the credits associated with the prize amount can be deposited on the gaming machine. For example, win of a bingo game on gaming machine 1064 can result in a prize amount being displayed on the main display. Further, the prize amount can be deposited as credits on the gaming machine 1064 such that the credits are available for additional game play.

In one embodiment, the prize amount can be output to look like a slot game. For example, if the prize amount is ten credits. Video reels can be displayed spinning on a main display of the gaming machine and a reel combination associated with a ten credit win in a slot game can be output to the display screen. If the outcome to the bingo game on a particular gaming machine is no award (e.g., because the player's call of bingo came after the strict adherence timing window closes), then the video reels can be displayed spinning and a reel combination associated with no award in the slot game can be displayed on the gaming machine. This process can be repeated on various participating gaming machines, as number draws for various bingo games are initiated and completed on the central determination server 1054. The local progressive server 1056 can be used to generate one or more progressive prizes that are limited to a local group of gaming machines, such as only the gaming machines in bank 1052*b*. When games are played on the gaming machine in bank 1052*b*, an amount of each wager (a predetermined or variable fraction) can be contributed to one or more progressive prizes that accumulate in a respective progressive contribution fund. The local progressive server can receive the contribution amounts from the gaming machines linked to the progressive game and can keep track of the prize amounts associated with the one or more progressive prizes. The prize amounts valid at a given time for the one or more progressive prizes can be output to displays on the participating gaming machines as well as to separate displays (cabinet enclosed signages) near the participating gaming machines.

The local progressive server 1056 can be configured to receive information regarding gaming events on the participating gaming machines. For example, the local progressive server 1056 can be configured to receive a notification from each of the participating gaming machines when a game outcome has occurred associated with a win of a progressive prize. In other examples, the local progressive server can be configured to receive gaming information, such as when each game is played on one of the participating gaming machines, an amount of wagered for each game and when one or more type of game outcomes occur on each of the gaming machines.

The gaming information associated with gaming events on the one or more gaming machines can provide a basis for additional bonus scenarios. For example, a bonus award can be triggered on one of the gaming machines after a random number of games are played on the gaming machines as a group. As another example, a bonus award can be triggered on one of the gaming machines after a particular game outcome occurs a random number of times on the participating gaming machines as a group, such as a particular combination of symbols appearing a random number of times.

The wide area progressive server 1058 is connected to the gaming machines in bank 1052*c* and display 1066. The wide area progressive server 1058 can be used to enable a progressive game played on gaming machines distributed over a wide area, such as multiple casinos distributed within a state or other such jurisdiction. Similar to the local progressive server 1058, when wagers are made, the wide area progressive server 1058 can receive contributions to the progressive prize from the participating gaming machines. The wide area progressive server 1058 can report these contributions to a remote device which tracks the total progressive jackpot. Further, if a progressive jackpot is won on one of the gaming machines to which it is connected, the wide area progressive server 1058 event can be reported to the remote device. Yet further, the wide area progressive server 1058 can receive a current progressive jackpot amount from the remote device. The current progressive jackpot amount can be reported on displays on the gaming machines participating in the progressive jackpot and/or nearby signage, such as 1068.

An exemplary display 1068 of yet another gaming machine or other display device (e.g., wide area display device) can have a digital sign controller 1070. The digital sign controller 1070 can have a network interface which allows it to communicate with a remote device, such as the wide area progressive server 1058. In this example, the digital sign controller 1070 can be configured to output information to display 1068 associated with the progressive game, such as a current jackpot amount. In some instances, due to differences between meter update speed and signage update speed, the displayed as current jackpot amount may be incorrect because a split second earlier, one of the players (e.g., 1062*a*) may have already won the jackpot. Other players (e.g., 1062*b*) who are looking to the slow-updated displays (e.g., 1068) may feel upset if the late displays show (or seem to have just shown) a higher amount and yet that not-first-in-time winner is awarded a lower amount. Such customer upsetting delays may be due in part to excessive temperatures building up in some cabinets and forcing temporary slowing or stoppages of the affected components.

In general, displays with digital sign controllers can be provided throughout a gaming environment, such as casino. The digital sign controller, such as 1070, can be configured to communicate with a remote device. The remote device can be configured to send information to the digital sign controller to output to a display. The information can include video, audio and picture data. Further, the remote device can be configured to send commands to the display, such as a command to output information to the display. In one embodiment, the wide area display devices (e.g., 1068) may provide announcements of when particular gaming machines (e.g., 1002) in the local area have awarded beyond a predetermined threshold number. In one embodiment, aisle exposed cabinet sidewall displays are operated in accordance with commands sent to them from respective digital sign controllers such as 1070 four providing various general or guest specific message indications and/or for providing messages to casino floor agents as automatically deemed appropriate by system recognized events.

The slot accounting system portion of server 1060 can receive accounting information from each of the gaming machine in system 1050, such as an amount wagered for each game and amounts awarded on each gaming machine and/or the number of further extra gains awarded due to initially settled upon outcome combinations (e.g., K, A, J, Q) and follow up bonus award opportunities. The server 1060 can also receive information which uniquely identifies each gaming machine including a machine ID number and a current game being played on the gaming machine. The accounting information can be used for auditing purposes.

The player tracking system portion of server 1060 can track the game play of individual users. For example, a player can input account information into one of the gaming machines that is associated with a player tracking account that has been previously set-up. Based on the account information, a particular player tracking account can be located. The player tracking account can include information which identifies an individual user, such as user 1062*a* (User 1062*a* can be playing games at one or more of the gaming machines in bank 1052*a*). The player tracking account information can include a player's name, address, phone number, gender, etc. It is to be understood that the graphics presentations on any given gaming machine can be structured for entertainment and heightened emotions and/or expectations of not only the primary player 1062*a* but also for that of nearby other persons 1062*b*.

In one embodiment, a player, such as user 1062*a*, can insert a player tracking card in a card reader (e.g., see card reader 1022 in FIG. 1A). The card reader can read player tracking account information from the player tracking card, such as on a magnetic strip on the card, and send the information to the player tracking/slot account system server 1060. Based upon the received player tracking account information, the player tracking system portion of server 1060 can locate a player tracking account.

The player tracking account information can be input via other means on the gaming machine. For example, as shown in FIG. 1A, the gaming machine 1002 may be able to wirelessly communicate with a mobile device, such as 1006. Thus, in one embodiment, the gaming machine 1002 may be configured to directly receive player tracking account information from a mobile device. In another embodiment, the gaming machine 1002 may be configured to generate an input interface on a touch screen display that allows a player to input player tracking account information.

After the player provides account information and an account is located, the player tracking system can enter accounting information associated with a player's game play into the identified player tracking account, such as an amount wagered over time. As described above with respect to FIG. 1A, the accounting information associated with a player's game play can provide a basis for awarding comps to the player. For example, based upon a player's previous game play, the player tracking system portion of server 1060 can send an amount credits to the gaming machine on which the player is playing. In another example, the player tracking system portion of server 1060 can send a command to a printer (e.g., see 1022 in FIG. 1A) on the gaming machine on which the player is playing to print out a ticket. The ticket can be redeemable for goods or services or a discount on goods or services, such as a free meal or discount a meal.

As described above, each of the gaming machines can be coupled to a ticket-in/ticket out (TITO) server 1062. TITO server 1062 can be used to generate and validate instruments associated with a credit and/or cash value. One example of an instrument, which can be generated and validated, is a printed ticket. Another example is a digital instrument, such as a printed ticket stored in a digital form. In one embodiment, a digital instrument can be stored on an electronic device carried by a user, such as a mobile device carried by user 1062*a*.

As an example, when a printer, such as 1022, is employed in a "cash out," the gaming machine controller (e.g., see 1160 in FIG. 8) can contact a TITO server (e.g., see 1062 in FIG. 2) with a cash out amount. In response, the TITO server can generate a unique number, associate the unique number with a value and send the gaming machine a unique number. The unique number can be sent to a printer (e.g., see printer 1022 in FIG. 1A). Then, the printer can print a ticket with the unique number, such as a unique number encoded in a bar-code, and a value of the ticket, such as five dollars.

When the ticket is later presented for redemption (e.g., where the player is assisted to getting to the cashier booth by the cabinet sidewall displays), the unique number can be used to validate the ticket. For example, the user 1062*a* can "cash out" at a first gaming machine, such as 1064 in bank 1052*a*, and receive a printed ticket with a unique number generated by the TITO server 1062. Then, the user 1062*a* can go to a gaming second gaming machine, such as 1066 in bank 1052*c*, and insert the ticket into a bill acceptor (e.g., see 1024 in FIG. 1A). The second gaming machine 1066 can contact the TITO server 1062 and send the ticket information, i.e., the unique number read from the ticket, to server 1062. Then, the server 1062 can validate the ticket and send back to the second gaming machine 1066 an amount of credits to deposit on the second gaming machine. The deposited credits can be used for additional game play.

In these examples, the servers can include processors, memory and communication interfaces. Various gaming functions are associated with each of the servers, 1054, 1056, 1058, 1060 and 1062. The described distribution of gaming functions is for the purposes of illustration in only. In alternate embodiments, combinations of gaming functions can be combined on the same server or repeated on different servers. For example, the central determination server 1054 can also be configured to provide a local progressive to the bank of gaming machine 1052*a*. In another example, the local progressive server 1056 can be configured to provide a number of different progressive prizes for different groups of gaming machines. In yet another example, the player tracking system portion of server 1060 can be configured to provide bonusing features at each of the gaming machines.

In FIG. 2, while gaming machines, such as those of displays 1064 or 1066, are operational, a user such as 1062*a* or 1062*b* can engage in game play. Under some conditions, such as tilt conditions, game play can be suspended and an intervention by an operator (e.g., casino floor agent), such as 1065, may be required. An operator intervention may require an operator, such as 1065, to be directly present at a gaming machine, such as that of display 1064. For example, the presence of an operator may be required to directly access an interior of the gaming machine to clear a tilt condition (e.g., one caused by accumulated dirt layers within the cabinet interior). In other examples, an operator may be able to clear a tilt condition from a remote location via a near field or other communication coupling with the gaming machine (e.g., using a mobile device such as 1006).

In one embodiment, during game play, the gaming machine can award an amount above some threshold amount. Prior to receiving the award, an operator, such as 1065, can be sent to the gaming machine to have the player fill out a form for tax purposes. In the United States, this tax form is referred to as a W2G form. In addition, the operator may verify that the gaming machine was operating properly when the award was made prior to the player receiving the award. For example, if the gaming machine indicates a progressive jackpot has been won, the operator may check to verify the gaming machine was operating properly. In a hand pay, the operator, such as 1065, may provide an instrument redeemable for the jackpot amount.

As described above and in more detail with respect to FIGS. 1A, 2, 10 and 11 an operator, such as 1065, may be required to be physically present at a gaming machine, such as 1064 and 1066, to clear a tilt condition and/or to deal with other customer needs or desires. For example, to clear a tilt condition, the operator, such as 1065, may have to access an interior of a gaming machine to remove built-up dirt, to clear a paper jam in a printer or a bill acceptor (e.g., see printer 1022 and bill acceptor 1024 in FIG. 1A). In another example, to clear a tilt condition, the operator 1065 may have to access an interior of the gaming machine, such as 1064, to add more tickets to a ticket printer or empty a note stacker associated with the bill acceptor. For some tilt conditions, the gaming machine operator 1065 may access a menu output on a main display of the gaming machine, such as 1064 or 1066, to perform a RAM clear. RAM clears are described in more detail below with respect to FIG. 8. In yet another example, one or more customers may feel upset based on their perception of when certain timing windows closed or certain prize amounts changed and they may wish to lodge complaints or disputes with the operator.

As earlier mentioned, the various data processing devices (e.g., 1054-1064) in the network services providing block 1004 and in the individual slot or other software driven gaming apparatuses (e.g., 1052*a*-1052*c*) or combinations thereof are generally dependent on called upon and executed software programs (not individually shown) where the actual gaming action runs rapidly and is recorded on official "meters" within a secured part of the system. Non-official displays or other signages (e.g., 1068, 1018A/1018C) may thereafter get updated on slower basis as system data processing bandwidth permits. The execution of the official gaming actions takes priority. A conventional installation of one or more software programs for carrying out the official gaming actions may proceed as follows. One or more software coding persons or code updating persons generate corresponding pieces of source code. The generated source code or codes are compiled by an automated compiler. Installable object codes produced by the compiler are transmitted to a build assembler. The build assembler creates an installation build from the received object codes and transmits the installation build to an appropriate automated software installer (not shown). At install time, the software installer automatically copies the to-be-installed object codes into one or more respective portions of the network services providing hardware 1004 and at the same time generates respective SHA-1 hashes of respective segments of the being-installed object codes. The generated SHA-1 hashes are automatically stored into corresponding records within a database server (not shown).

After installation, an automated software verifier may be activated and used for comparing hashes of the installed software segments (which should be the same as corresponding segments of the compiled code) against the respective hashes that had been stored in the database server. If all of the compared hashes match, then the installed software segments are deemed ready to be run (executed) within the network services providing hardware 1004 and/or in whatever destination data processing units (e.g., in respective ones of gaming apparatuses 1052*a*-1052*c*) they are predestined to be transmitted to by way of a secured transmission mechanism (not shown). In one embodiment, each time new or updated software is to be installed in the network services providing hardware 1004, a government official or other authorized agent/inspector authorized to do so, is called in to oversee the installation process and to obtain as an output of the software installer of its generated SHA-1 hashes in the form of a GLI certification letter that is in compliance with the latest government requirements and includes an unalterable copy of the SHA-1 hashes created for the respective segments of the received and installed object codes. In this way the integrity of big ticket jackpot runs may be preserved.

Thereafter, the government official/agent may return at any time to run the software verifier for the purpose of accessing respective segments of the installed object codes within the network services providing hardware 1004 and automatically generating SHA-1 hashes for those accessed respective segments of the installed object codes and then comparing the generated hash values against the SHA-1 hashes in the GLI certification letter to thereby verify that nothing has changed.

When the verified software is up and running, task completion speed may be a function of several variables, including temperature levels inside and outside the cabinets. If temperatures are too high (e.g., above predetermined thresholds), the clocking speeds of some components may have to be temporarily reduced to avoid permanent damage, some operations may have to be temporarily stopped, cooling fans may have to be run at higher speeds to get cabinet internal temperatures down to acceptable levels. Other factors that may interfere with smooth running of casino operations can include intermittent connections between circuits, faulty switches, corrosion impacted components and so on.

Figure 3:
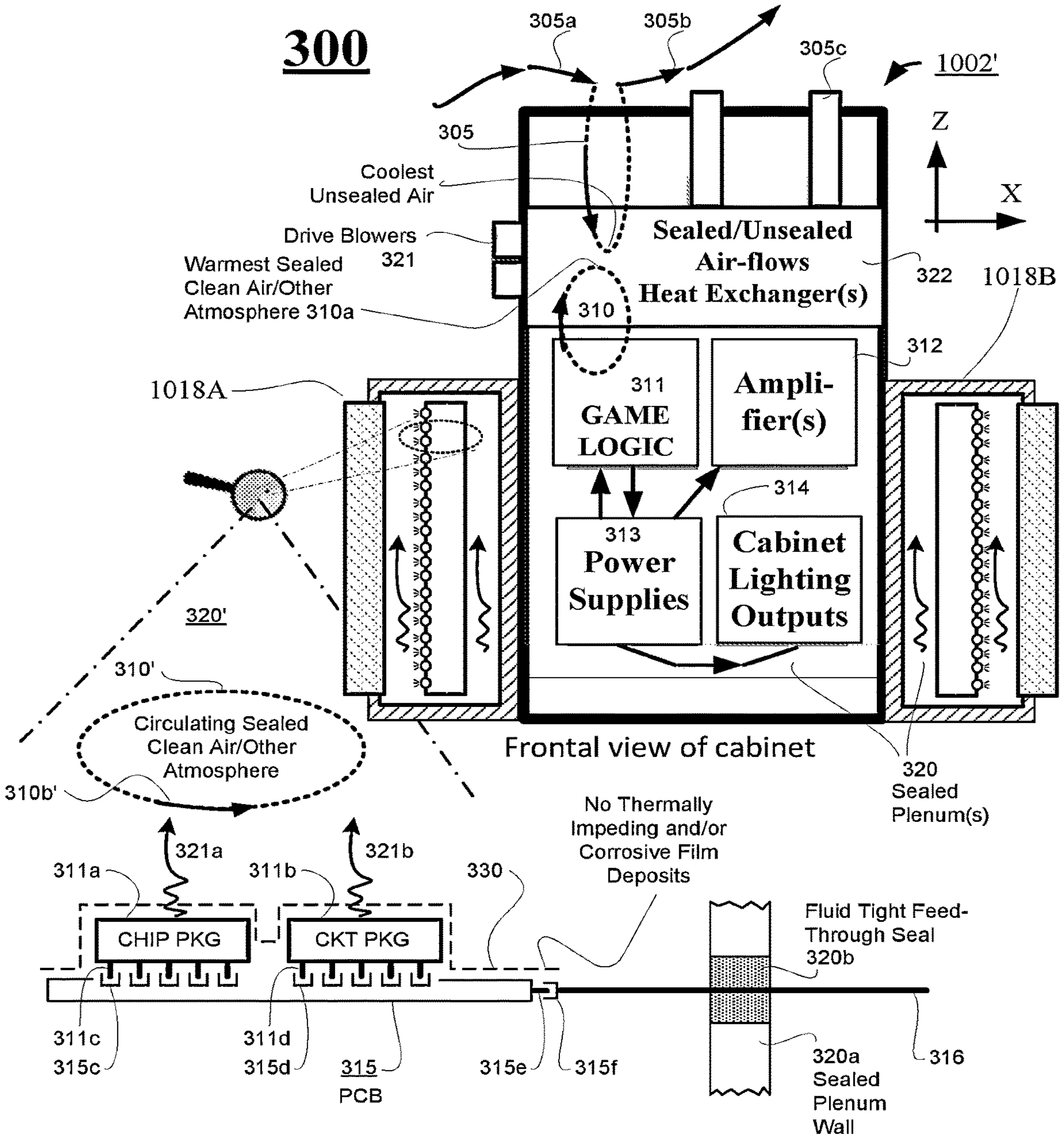
FIG. 3 schematically illustrates a gaming machine in accordance with the present disclosure that is configured to have a sealed and clean cooling gas (e.g., clean air) circulating in a loop to cool at least some of securely enclosed components of the gaming machine including its cabinet sidewall displays.
Figure 4:
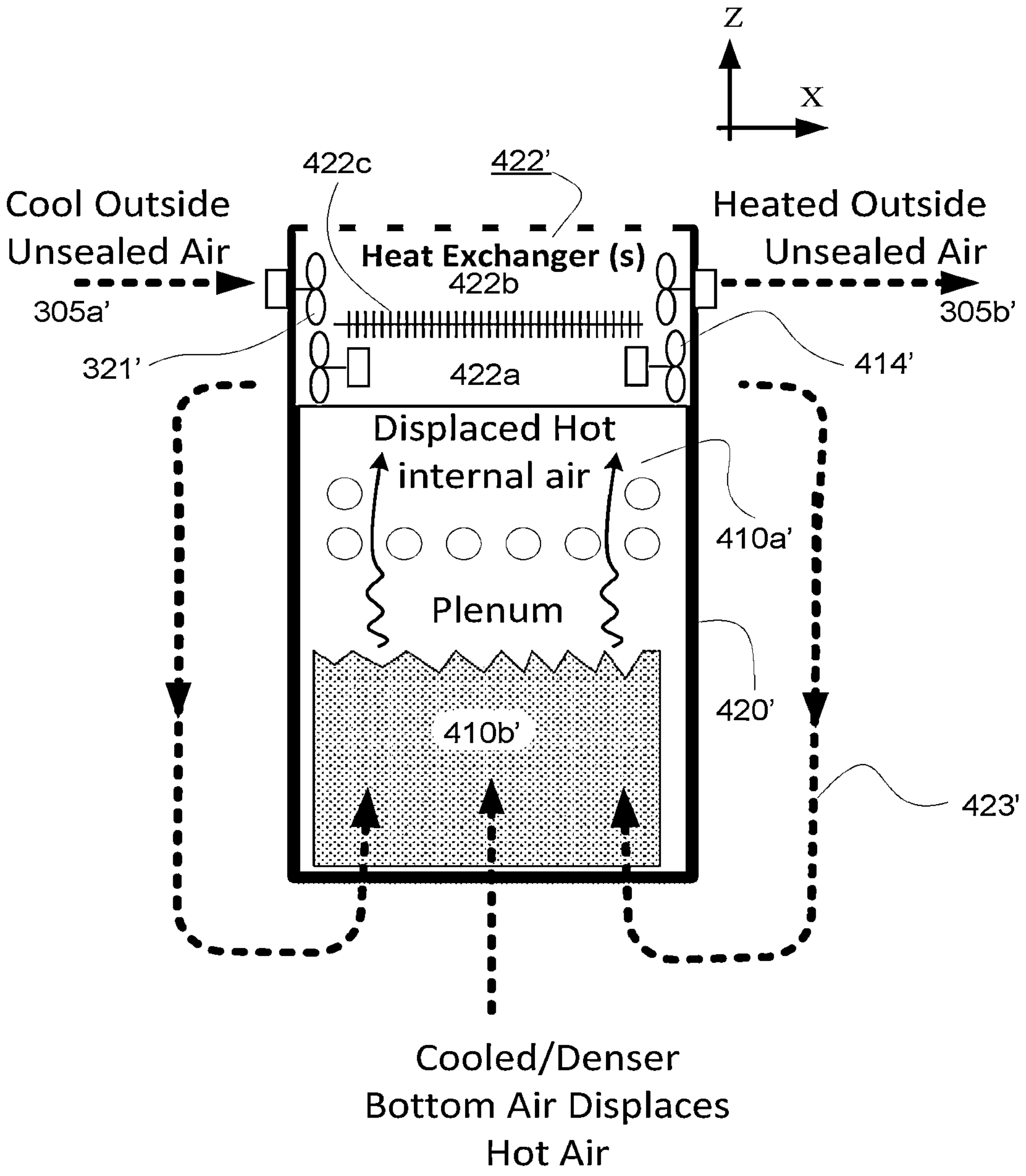
FIG. 4 schematically illustrates a thermal transfer scheme used in a sealed gas cooling system in accordance with the present disclosure.

Referring to FIG. 3, part of a cabinet cooling system in accordance with the present disclosure is described. It is to be appreciated that the present disclosure contemplates the simultaneous use of plural cooling subsystems and/or atmosphere flushing/purging subsystems within a primary enclosing cabinet where, a variety of different gases may be used as appropriate, including for example, unsealed finely filtered air, unsealed coarsely filtered air, unsealed unfiltered ambient air and hermetically sealed gases of various levels of cleanliness (used as appropriate for example to achieve cost minimization goals). In FIG. 3, a frontal, but see-through view of part of primary cabinet 1002' is shown when facing towards the Z-X plane. The illustrated part includes one or more air-tight-wise sealed plenums 320 within which clean thermal transfer gases (e.g., clean air) circulate. One or more multi-flow heat exchangers 322 are provided each configured to have an air-tight sealed (e.g., hermetically sealed) and clean gas circulation flow 310 moving through them and then looping through a corresponding one or more of the plenums 320. The multi-flow heat exchanger(s) 322 is/are preferably provided inside and near the top (in the Z direction) of the primary cabinet 1002' such that ambient air 305*b* warmed by the heat exchanger(s) 322 can be discharged immediately therefrom and out of the cabinet near a top portion of the primary cabinet 1002' (e.g., by way of optional exhaust chimneys 305*c*). More specifically, an unsealed flow 305 of ambient air (filtered or unfiltered) is schematically shown as having a relatively cool ingress portion 305*a* entering the primary cabinet 1002' and a relatively warmer egress portion 305*b* leaving the cabinet, where the egress portion 305*b* carries heat energy away from the cabinet 1002' preferably moving out an upper back portion of the respective cabinet. In cases of back-to-back kiosk arrangements, the back-to-back two or more gaming machines may share a common heat exchanger and common blowers, thus reducing cost of per/machine cooling. The hermetically sealed and closed, second flow 310 of relatively clean or ultra-air and/or other gases is schematically shown as having its relatively warmest portion 310*a* passing heat energy (through a heat transferring interface of the heat exchanger—not shown, see briefly 422*c* of FIG. 4) to the unsealed first flow 305, preferably with the warmest portion 310*a* of the sealed and closed, second flow 310 thermally engaging with the coolest portion 305*a* of the unsealed first flow 305 so as to provide a substantial thermal gradient.

The hermetically sealed and closed, second flow 310 loops past one or more heat emitting internal components (e.g., 311, 313) of the cabinet 1002' so as to absorb heat energy from them and then carry the absorbed heat energy up (substantially in the +Z direction) to the heat exchanger(s) 322 for transferring the absorbed heat energy to the unsealed air flow 305 and ultimately out and away from the cabinet 1002' by way of egress flow portion 305*b*. In accordance with one aspect of the present disclosure, part of the sealed and closed, second flow 310 loops upwardly past display elements of active ones of cabinet sidewall displays (e.g., 1018A and 1018B) so as to cool those elements. (In one embodiment, if one of the cabinet sidewall displays is not being used, the cooling flow bypasses that cabinet sidewall display structure.) Because it is generally warmer than the average temperature of the ambient air, the egress portion 305*b* of the unscaled first flow 305 will typically rise up above and away from the top of the cabinet 1002'. This natural flow may be assisted by action air blowers (not shown—see briefly 321' of FIG. 4). In one embodiment, one or more chimneys 305*c* are provided for guiding the egress portion 305*b* up above and away from the top of the cabinet 1002' so that the warmed air 305*b* moves away from gaming machine players and bystanders. In one embodiment, the chimneys 305*c* each have two or more spaced apart security screens oriented to block straight line access through each other's apertures and into the interior of the cabinet 1002'. Power lines and/or other electromagnetic linkages (not shown) may be coaxially extended from the casino ceiling and through one or more of the hot air exhausting chimneys 305*c*. Alternatively, power lines and/or other electromagnetic linkages (not shown) may rise up from a raised floor which also supplies air-conditioned ambient air to the gaming machines.

Examples of heat generating internal components of the cabinet 1002' are schematically illustrated at 311, 312, 313 and 314 as well as inside cabinet sidewall display structures 1018A and 1018B (and/or a rear one 1018R if present). These heat generating internal components may all be disposed within a single plenum structure 320 or alternatively distributed to be housed in separate plenum structures having shared or separate flows of cooling gases. The plenum structures (320) may be disposed in a respective one or more locked security boxes provided within the primary cabinet 1002' and/or one or more of the locked security boxes may be configured to define a respective, air-tight sealed (e.g., hermetically sealed) plenum. As used herein, the term "plenum" is to be taken to mean a substantially hermetically sealed container into which contaminant containing fluids (gases and/or liquids) cannot normally enter from the outside (one exception being where a plenum access door is opened to service internal components). The here used term, "plenum" is not required to have a fluid pressure different from the ambient air and indeed, in one embodiment, the pressure inside the plenum structure 320 is substantially equal to that of the outside ambient air or slightly above by a predetermined amount. Although for sake of illustrative simplicity the hermetically sealed and closed, second flow 310 is shown looping only through the components-containing module denoted as game logic 311, it is to be understood that the second flow 310 may additionally, in one embodiment, snake through one or more of further modules 312-314, 1018A-B, before carrying its absorbed heat energy back up to the heat exchanger(s) 322. If such a sequential/serial snaking is utilized, the module that requires the most cooling preferably receives the coolest portion of the second flow 310 right after it egresses from the heat exchanger(s) 322 while other modules that can operate at higher temperatures receive more downstream and thus warmer portions of that snaking serial flow 310. Alternatively, each of the modules 311-314 has its own copy of the second air-tight flow 310 (hermetically sealed and clean gas flow) looping through that module with the coolest portion of the second flow 310 entering through a respective bottom portion of the module and with warmest portion of the respective copy of second flow 310 egressing from an upper portion of the module. See briefly FIG. 4 as detailed below.

In the illustrated example 300, four of the modules that are cooled by respective and/or shared loops of the second flow 310 are denoted as game logic 311, amplifiers 312, power supplies 313 and cabinet lighting outputs 314. Cabinet sidewall displays 1018A-B are shown to internally have at least some of their utilized light sources. In an alternate embodiment, module 314 may transmit parts of its internally generated lights (e.g., laser lights) by way of appropriate optical transmission means (e.g., fiber optics) to the cabinet sidewall displays 1018A-B. Even in such a case, cooling of the cabinet sidewall display structures may be advisable since their internal electronics (not shown) will generate heat. For the illustrated embodiment, game logic 311 receives regulated power from power supplies module 313 and also controls how much power module 313 will deliver to the other modules. For example, if the casino is closed/idle during certain times of the day or week it might be advantageous to reduce power consumption of unneeded portions of the cabinet (e.g., bright lighting, loud loudspeakers etc.). When power consumption is reduced, heat produced inside the cabinet may be reduced and circulation speed of blowers inside may be reduced so as to further reduce power consumption.

While the illustrated embodiment has four modules 311-314, in other embodiments there can be more or less of such modules with respective similar of different functionalities. The game logic 311 typically includes digital data processing units (e.g., CPU's, APU's, GPU's, ASIC's) normally operating at relatively high frequencies (e.g., in the GHz ranges) and thereby generating significant amounts of locally concentrated heat. These various data processing units may each provide one or more functionalities including, but not limited to, general central data processing functions (CPU functions), specialized arithmetic processing functions (APU functions, including for example random number generations), specialized graphic image processing functions (GPU functions, including for example determining what gaming action animations will appear on the displays of associated gaming machines) and application specific functions (ASIC functions, including for example automated security and maintenance functions). Because of the locally concentrated heated generated by one or more of these various game logic units, module 311 may include heat sinks and/or cooling fans (not shown) thermally coupled to respective ones of the game logic components. In other words, although game logic module 311 is denoted as logic, it is not necessarily limited to containing only digital logic chips and may have many other components including those tasked with actively moving heat energy away from the chip packages for exhaust by way of a heat exhausting portion of the cabinet 1002' (e.g., ultimately by way of chimneys 305*c*).

Referring to magnified sample view 320' of FIG. 3, shown is a more detailed possible structure within one of the cabinet sidewall displays 1018A. It includes a printed circuit board (PCB) 315 having one or more of integrated circuit chips mounted as packaged units (e.g., 311*a*) either directly on the PCB or coupled thereto by way of contact-making socket structures 315*c* engaged with contactable terminals 311*c* (e.g., pins, contact bumps) of the IC packages (e.g., 311*a*) or of daughter boards (not shown). As mentioned, the various components of respective modules (e.g., 311, 1018A, 1018B) are not limited to just chips (e.g., 311*a*) directly mounted to a respective one or more PCB's (e.g., 315) and may additionally include optical output elements, daughter boards (referred to more generally as circuit packages 311*b*) plugged into corresponding motherboards and optionally themselves having contact-making socket structures 315*d* engaged with respective contactable terminals 311*d*. The included components may include discrete ones such as inductors, capacitors, resistors, power transistors, light sources, sensors and so on. The main motherboard(s) 315 may themselves have contact-making structures 315*e* (e.g., edge connectors) configured for engaging with counter-part contacting 315*f*.

In prior configurations, where contaminant carrying ambient air (not shown) was allowed to circulate freely over the circuit components (e.g., 311*a*-315*f*), a relatively thick and thermally insulative and/or optically impeding film 330 (shown in phantom) tended to build over time on and between the components, especially in casino environments. The film (or films) could be composed of a variety of substances. Typically, tars, nicotine and/or other sticky substances from tobacco smoke would adhere to the exteriors of the circuit components (e.g., 311*a*-315*f*) followed by secondary adhesion of carpet fibers, human skin particles, hair particles, plant pollen and the like. The layering process can repeat many times to form thick carpets of thermally insulative films 330. These thermally insulative films 330 can impede the transfer of heat energy (e.g., represented by heat flows 321*a* and 321*b*) away from the respective circuit components (e.g., 311*a*-315*f*). Temperatures would then rise and lead to undesired secondary effects including, but not limited to, unwanted thermal expansions and associated mechanical stresses, faster thermal degradation of circuit components, increased rates of undesirable chemical reactions including corrosive ones. Because of the uncontrolled chemical nature of the prior, contaminant carrying ambient air (not shown), the developed film(s) 330 could include reactive substances which, with the aid of built up heat and moisture in the ambient air, could corrode away electrical contacts (e.g., 311*c*, 315*d*) within the modules or grow into spaces between such contacts, leading to increased contact resistance and possibly intermittent or broken contacts and circuit malfunction.

In accordance with one embodiment of the present disclosure however, a contaminant-free thermal transfer gas 310' is circulated within the plenum 320' in which one or more of the cabinet interior components (e.g., 311-314, 1018A-B) are hermetically enclosed. As used herein, contaminant-free means one or more of: substantially free of, essentially free of, and completely free of tobacco smoke, dust, carpet fibers, human dandruff, plant pollen, insect or other pest particles or other such air borne debris which may undesirably coat or undesirably react with the hermetically enclosed components. The contaminant-free gas 310' may be comprised of pre-cleaned air optionally mixed with or replaced (wholly or partially) by one or more other gases that do not negatively affect operations of the co-enclosed cabinet interior components (e.g., 311-314). More specifically, the pre-cleaned injectable thermal transfer gas includes pre-cleaned air and/or other gases from which particles of sizes larger than a predetermined diameter (e.g., 3 microns) have been removed and vapors in excess of respective predetermined concentrations (e.g., those that may cause corrosion) have been removed. The other gases may be selected from a group having as representative members thereof, nitrogen (N2), carbon dioxide (CO2) and a noble gas of the periodic table. Aside from these relatively inert gases, molecules of heavier molecular weight (e.g., heavier than that of CH4 and) that are relatively chemically inert with respect to exposed surfaces in the hermetically sealed loop and remain gaseous within expected operating temperatures of the cabinet interior may be used, where the heavier molecular weight gases or vapors are included for their ability to better absorb heat (e.g., due to vibrations of greater numbers/kinds of molecular bonds, for example multiple C=C bonds). It is not an object of this disclosure to identify an optimal gas or gas mixtures for thermal transfer. It is noted that simple clean air may be sufficient and cost effective. Carbon dioxide (CO2) is known to be heavier than air of same temperature and to be a good absorber of infra-red (IR) emissions. Nitrogen (N2) is the majority gas in normal air and generally does not chemically react at room temperature with other substances. One desired attribute of the contaminant-free gas 310' is that cooler portions thereof should be substantially denser (heavier) than warmer portions so that when the cooler portions are introduced at the bottom of the plenum (see briefly the flow coming out of blower(s) 424 of FIG. 4A) the introduced cooler portions will convectively displace warmer portions (see briefly 426 of FIGS. 4A and 410*a*' of FIG. 4B) at least due to gravitational forces if not also due to the general direction of gas flow (e.g., as urged by blowers and/or other propelling devices and/or by guiding conduits or baffles). The circulating contaminant-free gas 310' not only keeps heat outputting surfaces clean and efficient, but also keeps optical input/output surfaces clean and thus efficient.

The contaminant-free gas 310' may be initially introduced into the plenum interior from any convenient source(s) including for example, from one or more compressed gas cylinders that are operatively and removably coupled to the plenum interior. If simple clean air is used, it can be produced on-site at the casino, for example in a back room where outdoor air (or air conditioned air) is captured, cycled through a series of filters, compressed and stored in cylinders. In one embodiment, the series of air filters includes a first filter (not shown) configured to capture air borne particulate matter including particular matter associated with the tobacco smoke. For example, a "true" HEPA filter can be configured to capture 99.97% of particles 0.3 microns in diameter or larger. However, other less efficient but less costly filters, such HVAC filters can be used. The second filter (not shown) in the series can include activated carbon and/or other porous absorbent materials having relatively large surface area due to interconnected pores (open pores). The activated carbon and/or other porous absorbent materials can adsorb volatile chemicals including those associated with smoke or any other pollution producing source. Some of the porous absorbent materials can convert gaseous pollutants, such as volatile organic compounds (VOC's) found in smoke, into nongaseous solid form where the latter can be captured by particulate entrapping filters (e.g., HEPA filters). The first and second filters can be provided as a single periodically replaceable unit or they can be provided as separate filters which are individually replaceable. As mentioned the cleaning flow through the series of filters takes place outside of the gaming machine cabinet using blowers or pumps outside the cabinet. Thus, heat is not generated inside the cabinet for producing these pre-cleaned gasses. In accordance with one aspect the present disclosure, different gradations of cleanliness may be used for different ones of the cabinet supplying gas sources, including moderately clean air/or-other-gas and more or ultra-cleaned air/or-other-gas. The moderately clean air/or-other-gas may be used for purging the containment volume of the plenum before the more or ultra-cleaned air/or-other-gas is substituted in for purpose of long term circulation and thermal transfer.

Although one set of embodiments uses on- or in-cabinet gas supplying sources for causing the air-tight-wise sealed portions of the cabinet to be substantially or essentially free of contaminants, it is fully within the contemplation of the disclosure to allow for much less stringent requirements for cleanliness within the air-tight-wise sealed portions of the cabinet. As long as the air-tight-wise sealed and cooling-gas circulating portions of the cabinet are isolated on a long term basis from the dirtier ambient of the outside so that dust and/or other contaminants do not accumulate over the long term and thus interfere with thermal transfer and/or other attributes of critical cabinet interior components that is better than the alternative where the critical cabinet interior components (e.g., thermal transfer portions thereof) are exposed to the substantially dirtier ambient of a casino or other like external environment. Accordingly, in one embodiment, substantially or essentially clean air is introduced into the air-tight-wise sealed and cooling-gas circulating portions of the cabinet just before the cabinet is shipped to the casino with the expectation that over the long term, the air-tight-wise sealed and cooling-gas circulating portions of the cabinet will remain sealed and thus not subject to long term internal accumulation of dust and/or other contaminants present in the ambient exterior. If the access doors are on occasion opened for attending to tilt or other service-needing situations, the amount of time that the access doors are open should be relatively small compared to the total amount of time that the gaming machine is operated without having its air-tight-wise sealed and cooling-gas circulating portions exposed to the ambient. Thus improved operation is obtained even in such less than stringently clean modes of operation. In one embodiment, the cabinet is manufactured in a relatively clean factory air environment and just prior to shipping, even cleaner air is flushed through the air-tight-wise scaled and cooling-gas circulating portions of the cabinet to clean their interiors before they are sealed (e.g., and their seals are tagged with seal certifying date tags that break if violated) and shipped to the casino or like other usage environment. Cost effective improved operation may be obtained with such less stringent approaches.

In operation, the essentially or substantially contaminant-free gas 310' is circulated long term (e.g., between scheduled maintenance servicings) within the plenum 320 such that a relatively coolest portion **310*b* of that sealed circulating flow engages with design-specified heat emitting portions (e.g., surfaces, heat sinks, air intakes of on-package mounted cooling fans) of the co-enclosed cabinet interior (and/or lock box more interior) components (e.g., 311*a*, 311*b*). The contaminant-free and circulating gas 310' absorbs heat energy from these engaged-with heat emitting portions and then flows to the higher-up located heat exchanger(s) 322 to transfer the absorbed heat via heat transfer members of the exchanger(s) 322 to the passing through exterior air flow 305**.

Since the sealed circulating flow of contaminant-free gas 310' is essentially or substantially free of contaminants such as those mentioned above, the undesired thermally-insulative and/or corrosive and/or electrically-interfering and/or optically-impeding films 330 do not take hold or grow over the long term. Good thermal heat transfer (e.g., **321*a*, 321*b*) is maintained. Excessive thermal expansion due to relatively high cabinet internal temperatures is avoided. Good electrical contacts (e.g., 331*c*/315*c* and 315*e*/315*f***) are maintained. As a result, mean time between failures (MTBF) is reduced and the cost of operating the casino or other such gaming establishment is advantageously reduced.

Although it is preferable to include as many cabinet interior components as possible inside the one or more plenums (e.g., 320) that have respective and air-tight sealed and closed, contaminant-free gas(es) 310 circulating in them for purposes of heat removal, some connectors and/or components (e.g., feed-through connector 316) may have to extend through the sealed air-tight plenum wall **320*a*. In such cases, fluid tight feed-through sealants 320*b* (e.g., water-tight grommets) are used in the feed-through apertures for keeping the interior of the plenum sealed in air-tight manner. Examples of connectors and/or components that may have to extend through the plenum wall 320*a* may include primary power supplying lines (e.g., AC power), input/output lines, cables or optical fibers that connected to user interface devices (e.g., switches, buttons 1032, 1034 of FIG. 1**), couplings to external RF antennas and/or optical communication devices and so forth.

Referring to the power supplies module 313 of FIG. 3, while the primary input power for the gaming machine 102' typically comes in from outside by way of a fluid tight feed-through sealant (e.g., **320*b*), cabinet internal voltages (e.g., regulated voltages, clocking signals) and the like are preferably generated inside the cabinet in a circulating clean air and/or other clean gas environment 320' so that power transistors, heat sinks, inductors, switching transformers, etc., are kept dust free and able to operate at optimum performance levels. In one embodiment, backup batteries are also contained within a respective clean gas environment like 320' so that proper cooling is provided and contact corrosion or contact degradation is avoided or reduced. The backup batteries may produce undesirable off gases or vapors. In one embodiment a moisture and/or off gas absorbing element (not shown) is included alongside the flow path of the circulating clean air and/or other clean gas 310 for absorbing such internally generated contaminants. Preferably the internal contaminant absorbers and/or filters are disposed so as to not block the free flow of the circulating clean air/gas(es) 310**.

Referring to the cabinet lighting outputs module 314 of FIG. 3, in some embodiments it is desirable to generate bright lights at the exterior of the cabinet for the purpose of attracting players and producing various states of excitement. Various elements may be used to generate the bright lights including, but not limited to, LED's (e.g., backlighting LED's within LCD displays), laser diodes, gas discharge bulbs (e.g., plasma displays), incandescent bulbs, fluorescent bulbs (e.g., providing backlighting within LCD displays) and so on. Such light generating elements tend to produce significant amounts of heat. Accordingly, at least heat emitting portions of these light generating elements (e.g., heat sinks) are preferably contained within a respective clean gas environment like 320' so that proper cooling is provided and contact corrosion or contact degradation is avoided or reduced. In some instances, the entire bodies of the light generating elements are inside a respective clean gas environment while optical fibers and/or other optical communication mechanisms (e.g., mirrors, feed-through windows) transfer the optical energy to the outside.

Referring to the amplifiers module 312 of FIG. 3, in some embodiments it is desirable to output loud sounds to the exterior of the cabinet for the purpose of attracting players and producing various states of excitement. Various elements may be used to generate the loud sounds (e.g., music, bells, gongs etc.). However, power amplifiers that driver the sound production elements (e.g., speakers, woofers, vibrators etc.) and/or drive other high power output components are preferably contained within a respective clean gas environment like 320' so that proper cooling is provided and contact corrosion or contact degradation is avoided or reduced.

While in one embodiment, a sealed loop clean cooling fluid 310 is used, in an alternate embodiment, the tops of the cabinet sidewall displays may be vented ones from which a pre-filtered cooling gas (e.g., clean air) exhausts vertically to the ambient. The exhausted cooling gas (e.g., clean air) may be sourced from a filtering system (not shown) that is housed in a secured interior area of a closed kiosk arrangement (see FIG. 14B as an example), takes in ambient air from an area where customers do not normally traffic through (e.g., the kiosk interior area of FIG. 14B), filters it through a series of filters that sequentially remove larger particles and then smaller ones and then supplies the filtered air to the immediately surrounding gaming machines (e.g., the four of the square kiosk configuration of FIG. 14B).

Referring next to FIG. 4, shown schematically is a convective heat transfer mechanism that may be employed in accordance with the present disclosure. One or more gas conduits such as 423' may be provided to guide a flow of an exchange-cooled heat transfer fluid (e.g., clean air and/or other clean gases or vapors) to a substantially bottom most portion of a sealed air-tight plenum 420'. This creates a bottom up rising volume 410*b*' of relatively cooler, denser and heavier gas to displace a comparatively hotter, less dense and thus lighter volume 410*a*' of the heat transfer fluid that has already absorbed heat energy from plenum interior components (not shown in FIG. 4). The upwardly rising (generally in the +Z direction) volume 410*b*' of relatively cooler heat transfer fluid absorbs heat energy from higher temperature surfaces with which it engages. At the same time, the higher up volume 410*a*' of already heated transfer is urged into a first chamber or other containment area 422*a* of the heat exchanger 422' (could be plural such heat exchangers with respective first chambers) where that first containment area 422*a* defines part of a sealed air-tight integrated and gas circulating structure together with the interior of the plenum 420'.

A heat exchange member 422*c* air-tight-wise isolates the first containment area 422*a* from a second and optionally open area 422*b* of the heat exchanger 422'. Any of a variety of different designs may be used for implementing the heat exchange member 422*c* as long as the isolation and cleanliness of the heat transfer fluid 410*b*'/410*a*' is not compromised. One example will be described below in conjunction with FIG. 5. A first set 414' of one or more blowers propel the transfer fluid that has been cooled by way of heat transfer through the heat exchange member 422*c* down through conduits 423' for return to the bottom area of the plenum 420'. Although FIG. 4 schematically depicts the first set of blowers 414' as being driven by plenum-internal motors operatively coupled to respective fan blades, it is within the contemplation of the present disclosure to instead drive respective fan blades by way of rotating magnetic force fields passed from the exterior and through nonmagnetic wall portions (not explicitly shown—see briefly FIG. 5) of the plenum. This way the fan blade driving means does not contribute to heat build-up inside the plenum 420'.

A second set 321' of one or more blowers propel ambient air (optionally slightly pre-filtered air) over/along an opposed side of the heat exchange member 422*c*. Although second area 422*b* of the heat exchanger 422' is schematically shown as being a flow-through chamber for sake of simplified understanding, it does not have to be so. The second area 422*b* can be open to the ambient air so as to allow already heated portions of that unsealed air to rise up and out of the cabinet. (Note the apertures populated top of second area 422*b*. See also the example of FIG. 5.) While heat exchange member 422*c* is schematically shown as having a large number of fins (e.g., for creating large surface areas along which the propelled fluids 410*a*' and 305*a*' flow), it is within the contemplation of the present disclosure to use any of a wide variety of gas-to-gas (or gas-to-liquid-to-gas) heat exchange designs employing one or more of laminar, helical and/or turbulent flow schemes. Preferably, the inner side of the heat exchange member 422*c* along whose surface area(s) the heated transfer fluid 410*a*' flows does not significantly impede the flow of that transfer fluid 410*a*' so that minimal power is needed for circulating the plenum internal transfer fluid 410*a*'/410*b*' over the long term.

As illustrated in FIG. 4, while the plenum internal, heat transfer fluid 410*a*'/410*b*' is circulating through the interior of the plenum 420' and through the co-extensive first containment area 422*a* of the heat exchanger 422', cool external air (unsealed air) 305*a*' enters one side of the second area 422*b* of the heat exchanger 422' and correspondingly heated unsealed air 305*b*' exits from another side. Although FIG. 4 schematically illustrates the unsealed air flow 305$a$'/305$b$' as being left to right (in the +X direction), it may alternatively be right to left (in the −X direction) or periodically switched from one to the other such that dust or other clogging materials do not lodge and accumulate in the second area 422$b$ of the heat exchanger 422' or on the fins of heat exchange member 422$c$. Alternatively or additionally, unsealed cool air may be pumped in from along the back side (disposed further back in the +Y direction of FIG. 1A) of the plenum 420' and passed through second area 422$b$ or its equivalent (latter not shown, picture the heat exchange member 422$c$ as having an L-shaped cross section when viewed in the Z-Y plane with one of the fin-populated legs of the L being in the back) where the passed through air egresses as heated air, up and out of top-side apertures populated portion of the second area 422$b$ or its equivalent in the +Z direction.

Figure 5:
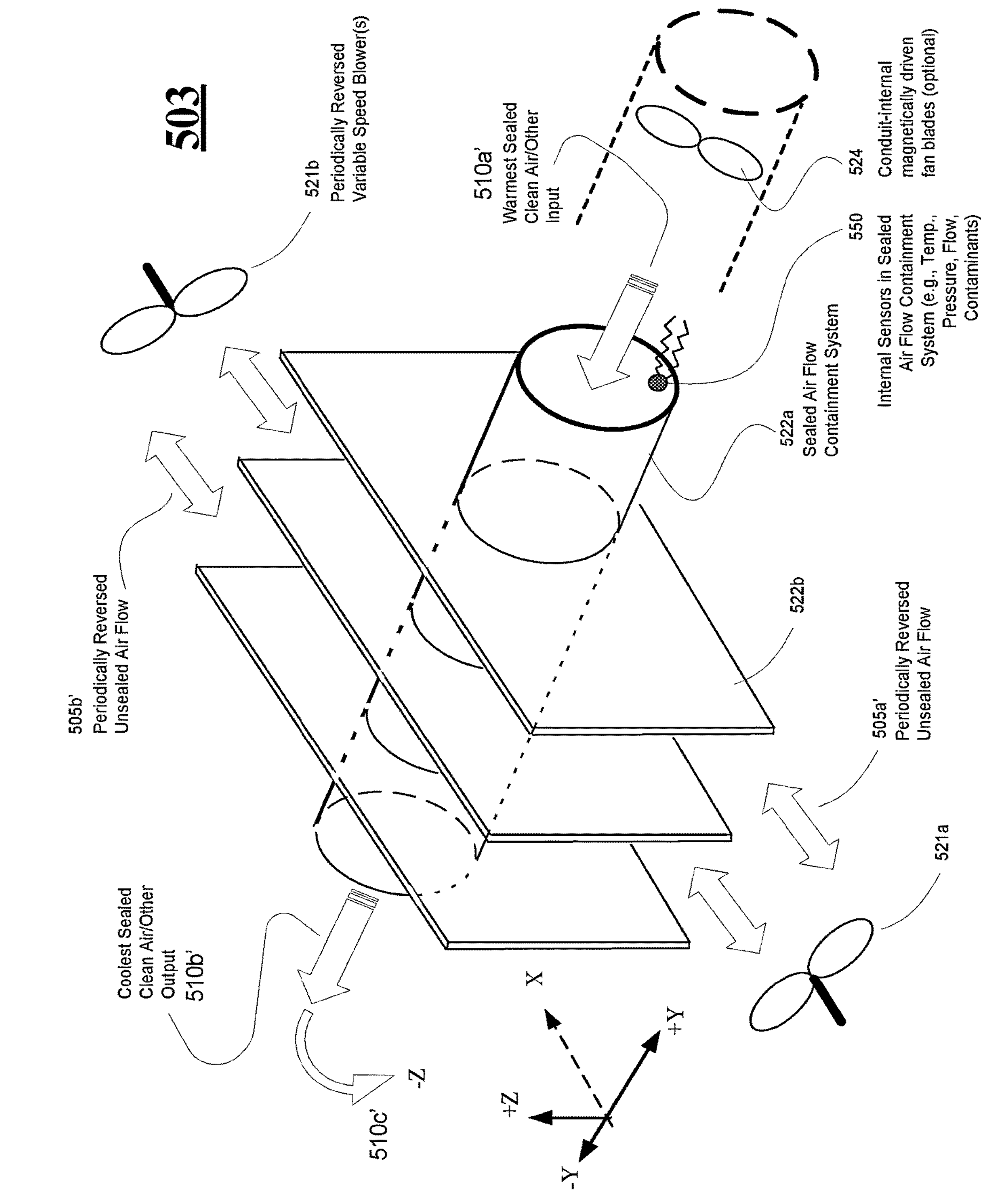
FIG. 5 schematically illustrates by way of a perspective view one possible heat exchange structure that allows for heat exchange between an air-tight-wise sealed and circulating clean gas and an unsealed flow of ambient air in accordance with the present disclosure.

Referring to FIG. 5, a perspective schematic illustration of one example embodiment depicts a dual flow heat exchanger 503 that allows at least one of the flows, 510$a$'-510$b$' to pass through and exchange heat energy while remaining sealed in air-tight fashion. The second flowing through stream 505$a$'-505$b$' is not sealed and, although shown moving parallel to the X axis, is not so confined and may instead flow or reciprocate back and forth at any angle or plurality of angles as shadowed onto the Z-X plane so as to extend roughly parallel to the illustrated and exemplary flat plate fins 522$b$. (Although not shown, fins 522$b$ may be augmented with bumps, grooves or other flow disturbing features so as to induce turbulent flow in addition to or in place of purely laminar flow.) As shown, the ingressing part 510$a$' of the first flow is constituted by the warmest part of the air-tight-wise sealed stream of clean transfer fluid (e.g., air and/or other gases or vapors) while the egressing counterpart 510$b$' is constituted by a substantially cooled part of the flowing through clean transfer fluid. Preferably conduit 522$a$ turns downward (in the −Z direction) after advancing its sealed clean gas flow through the fins 522$b$ as indicated by turn arrow 510$c$' and then returns the flow back through the fins the other way (e.g., in the +Y direction) or delivers the flow 510$b$' to a downwardly directed conduit like 423 of FIG. 4 for guidance of the heat exchange cooled flow to the bottom of a respective one or more plenums.

Similarly, if or when its flow is moving in the +X direction, portion 505$a$' of the unsealed air constitutes the coolest part of the flowing through ambient air while portion 505$b$' constitutes a substantially warmer one. In one embodiment, computer controlled blowers 521$a$, 521$b$ are in unison or individually controlled to have variable speeds and/or directions of air propulsion. The controlling computer (not shown) may periodically, or based on detected environmental context (e.g., one or both cabinet internal and cabinet external environmental contexts such as above threshold temperature), reverse the flow direction of the blowers 521$a$, 521$b$ (and optionally swivel them) so as to prevent dirt from lodging on or between the fins 522$b$ and impeding the free flow of air between them or dislodging dirt that is suspected (due to sensed cabinet internal and/or cabinet external environmental contexts) to have lodged in one or more of the flow paths. Conduit 522$a$ for the clean flow 510$a$'-510$b$' communicates in an air-tight sealed fashion with a respective one or more plenums (not shown) through which the clean transfer fluid loops. Although conduit 522$a$ is illustrated for sake of simplicity as a single circular pipe passing through fins 522$b$ and making good thermal contact with them, it is within the contemplation of the present disclosure to have plural such conduits like 522$a$ running in parallel and/or snaking back and forth through the fins 522$b$ so as to increase the effective surface area of heat exchange. Conduit 522$a$ need not be circular or of any specific dimension. The interior surface of conduit 522$a$ need not be smooth as shown but may instead have bumps of grooves for inducing nonlinear flow of the contained heat transfer gas 510$a'$.

In one embodiment, one or more sensors like 550 are mounted inside and along the ingress and egress flow portions of the conduits for the clean flow 510$a$'-510$b$' so as to respectively detect one or more of performance metrics including, but not limited to, temperature at the input and/or output of the heat exchanger 503, gas pressure at the input and/or output of the heat exchanger, gas flow rates, and level of moisture and/or other contaminants within the flowing by gas. The sensors may include photonic sensors. Advantageously, because the sensors 550 are mounted inside the air-tight sealed containment area, they are not subject to smoke, dust, moisture or other contaminants as they might be if mounted on the outside. Nonetheless, it is also within the contemplation of the present disclosure to mount one or more further sensors on the outside for example for the sake of detecting one or more of performance metrics of the unsealed flow 505$a$'-505$b$'. In response to detected sensor levels (e.g., both internal and external of the sealed cooling gas flow paths), the controlling computer (or computers, not shown) may speed up or slow down the rotation rates of one or both of blowers 521$a$, 521$b$, activate additional blowers including those that blow external air in different directions (e.g., intake cool air from different directions while testing for the coolest source air at the time), shut off some of the external blowers, send performance reports to a management server (e.g., indicating how well the heat exchanger is working) and/or output alarms calling for a casino operator to manually attend to the equipment cooling system (e.g., if one or more of the blowers fail, if filters need replacement, etc.).

In one embodiment, additional blowers like 524 are provided inside the clean air/gas conduit 522$a$ for example at the input and/or output sides of the heat exchanger 503. The motors for driving the blowers (e.g., fan blades 524) may be mounted inside the conduit 522$a$; or in one embodiment, the fan blades are mounted to freely rotate inside the conduit 522$a$ while external electromagnets are sequentially activated (e.g., by computer control) to rotate the in-conduit internal blades 524, where the latter have ferromagnetic materials and/or permanent magnets for interacting with the externally rotating magnetic fields. The externally produced and driving magnetic fields may be rotated at various desired speeds and even optionally in different directions or occasionally stopped at a desired angle of rotation. Since in the case of using external electromagnets, motors do not block the gas flow path inside the clean air/gas conduit 522$a$ and heat generated by the driving external electromagnets is not added to the heat removal workload of the heat exchanger, power for operating the cooling system may be conserved.

Figure 6A:
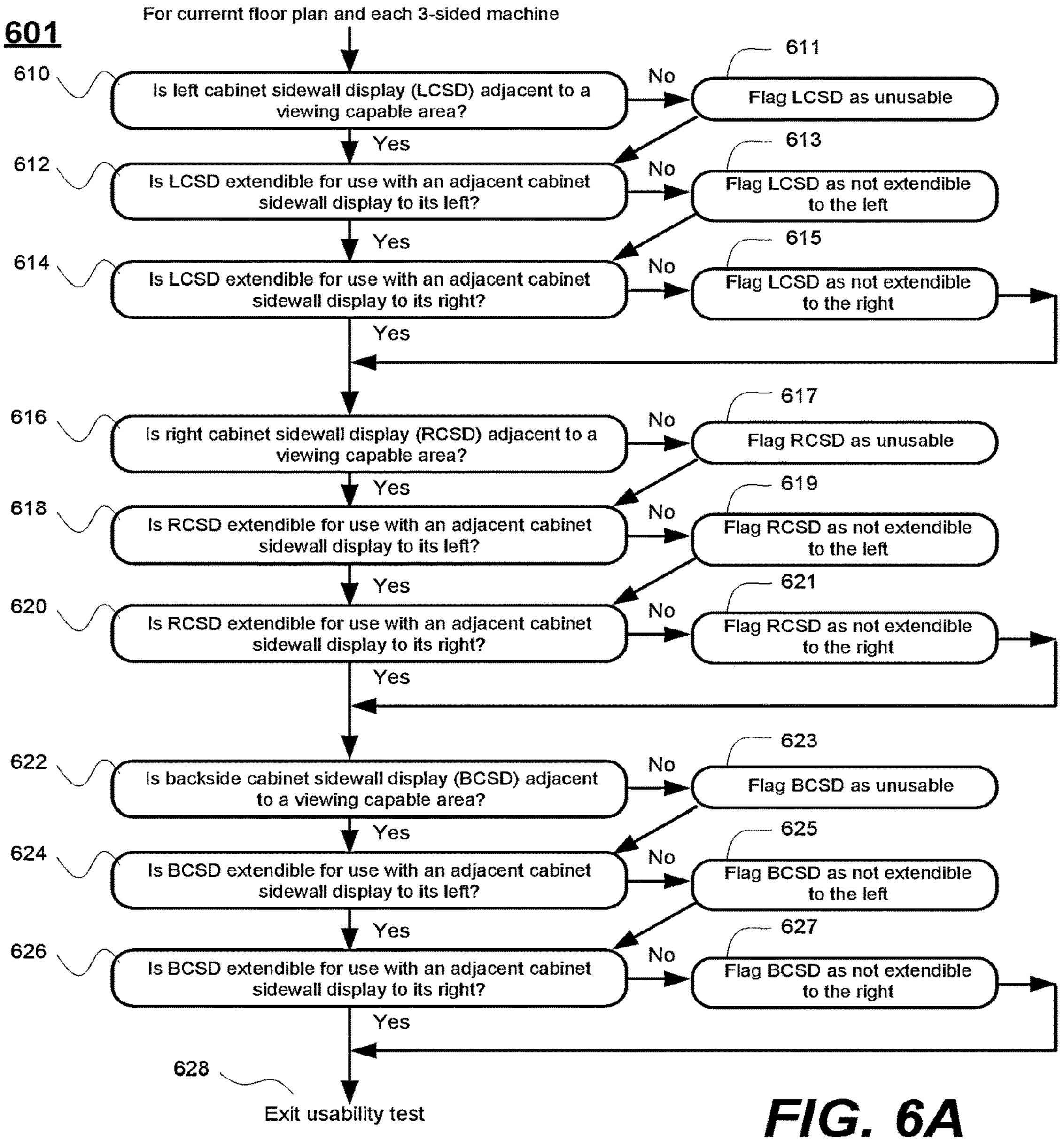
FIG. 6A is a flow chart depicting a method of determining based on floor plan, which of the cabinet sidewall displays are operatively disposed for providing an enhanced floor experience.

Referring to FIG. 6A, shown is a machine implemented and automated process 601 that may be used with the here disclosed gaming machines having left, right and rear surfaces each sporting a respective cabinet sidewall display. While not shown, it is to be understood that process 601 is preceded by the fetching of a current floorplan for the casino and stepping through that floor plan for each machine-supporting footprint that is allocated for supporting a respective gaming machine with three cabinet sidewall displays on its respective non-frontal sidewalls. (The process can of course be adjusted to account for gaming machines that have more than three non-frontal sidewalls.)

In step 610, the respective left cabinet sidewall display (LCSD) of the respective machine is considered. The current floorplan is analyzed to determine if the LCSD is adjacent to a viewing capable area. In other words, it is determined if the LCSD is hidden from view or not by an adjacent feature such as an abutting other gaming machine. If the analysis determines that the LCSD is not viewable, control passes to step 611 where a database entry is made flagging that LCSD of the respective machine as being unusable. Later, when allocation of power supply resources, computing resources and cooling resources is undertaken, the database entry for the flagged LCSD of the respective machine is consulted and since it is flagged as unusable, the respective resources are not allocated to that unusable LCSD. Control then passes to step 612 in either case, whether from step 611 or due to a yes answer from step 610.

Steps 616 and 617 constitute similar usability determinations for the right cabinet sidewall display (RCSD) of the respective machine. Steps 622 and 623 constitute similar usability determinations for the backside or rear cabinet sidewall display (BCSD) of the respective machine.

Depending on floorplan and the nature of any abutting other cabinets, each of the cabinet sidewall displays (CSD's) may optionally be operated as a part of unified display that includes yet others of cabinet sidewall displays of abutting other cabinets. Step 612 tests to determine if the LCSD of the respective machine is optionally so extendible on its left side due to the presence of an adjacent other cabinet sidewall display on its left side. If no, step 613 flags it in the database as not being extendible to its left. Step 614 tests to determine if the LCSD of the respective machine is optionally extendible on its right side due to the presence of an adjacent other cabinet sidewall display on its right side. If no, step 615 flags it in the database as not being extendible to its right.

Steps 618/619 and 620/621 constitute similar extendibility determinations for the right cabinet sidewall display (RCSD) of the respective machine. Steps 624/625 and 626/627 constitute similar extendibility determinations for the backside or rear cabinet sidewall display (BCSD) of the respective machine.

The above described process 601 may be understood to constitute part of a machine-implemented method of assisting or entertaining one or more persons (e.g., 1009') in a gaming environment having a floor, where the gaming environment has a plurality of gaming machines disposed on its floor in accordance with a predetermined floor plan and where at least a subset of the gaming machines (e.g., 1019A, 1019B of FIG. 1G) each has a respective foot print in the floor plan, the respective footprint including a front side (e.g., 1018 of FIG. 1A) out of which gaming action for the respective gaming machine is presented, a back side (e.g., 101R$_1$, 1018R$_2$ of FIG. 1C) opposed to the front side and two or more additional sides (e.g., 1018A, 1018B of FIG. 1B) interposed between the front side and the back side, where each of the subset of gaming machines has a respective cabinet disposed over the respective footprint, the cabinet including a frontal gaming action presentation mechanism (e.g., FIG. 1A) configured to present gaming action for the respective gaming machine, where wherein the respective cabinet of each of the subset of gaming machines further includes one or more cabinet sidewall displays (e.g., 1018A, 1018C of FIG. 1B) operable to output content (which can still photos, video, light bars and/or other optical effects provided alone or with ancillary audio) to one or more respective persons within viewing/hearing distance of the respective one or more cabinet sidewall displays, where the one or more cabinet sidewall displays are structured (e.g., FIG. 1E) to be non-reflective such that the one or more respective persons within viewing distance of the respective one or more cabinet sidewall displays respectively perceive a light-absorbing surface for each of the cabinet sidewall displays when the respective cabinet sidewall displays are not outputting imagery and such that the one or more respective persons within viewing distance of the respective one or more cabinet side wall displays respectively perceive imagery presented on an otherwise light-absorbing surface for each of the cabinet sidewall displays when the respective cabinet sidewall displays are outputting imagery. The machine-implemented method of assisting or entertaining one or more persons is understood to comprise: (a) using the floor plan and automatically determining based on the floor plan whether one or more of the cabinet sidewall displays is disposed such that it can provide at least one of assisting imagery and entertainment imagery to a respective one or more persons that could be positioned within viewing distance of the respective one or more cabinet sidewall displays; and (b) in response to determining that the one or more of the cabinet sidewall displays is operatively disposed such that it can provide at least one of assisting imagery and entertainment imagery, automatically determining based on priority or urgency, what form of at least one of assisting imagery and entertainment imagery, if any, to present on respective ones of the operatively disposed cabinet sidewall displays. A decision to not present at least one of assisting imagery and entertainment imagery on one or more of the cabinet sidewall displays can be based on a machine-implemented and countervailing determination that the assisting imagery and/or entertainment imagery is not urgent and would likely interfere with something else then occurring within the vicinity of the respective cabinet sidewall display. In other words, one aspect of the structure (e.g., FIG. 1E) of the cabinet sidewall displays is that when they are not active (outputting imagery), they are non-reflective (glare free) and appear as blackened or otherwise darkened surfaces so as to not interfere with something else occurring within the vicinity of the respective cabinet sidewall displays.

On the other hand, if it is determined that some of the cabinet sidewall displays can at given times and/or locations contribute positively to the psycho-optical experiences of adjacent casino patrons, then one or more check lists of prioritized task may be consulted for automatically determining how best (if at all) to utilize the imagery presenting capabilities of the cabinet sidewall displays.

Figure 6B:
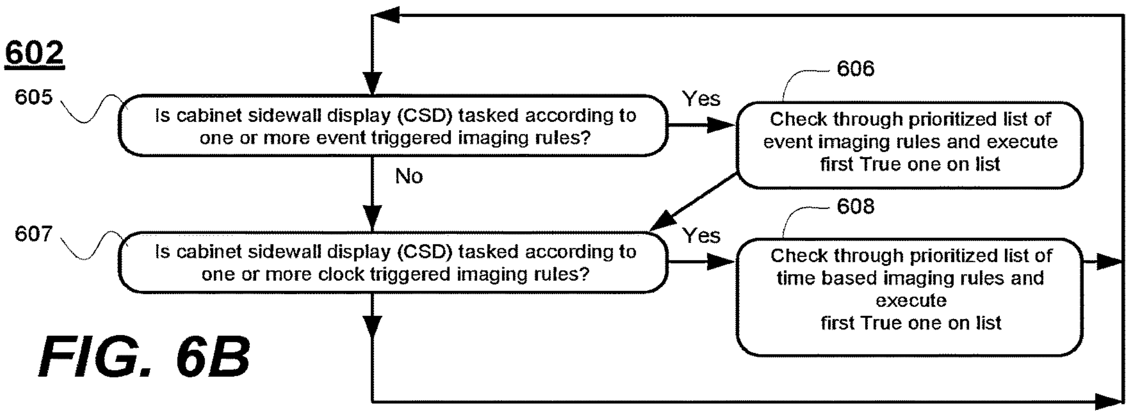
FIG. 6B is a flow chart depicting a method of cycling between event triggered uses of the cabinet sidewall displays and chronologically triggered usages.

Referring to FIG. 6B, shown is a machine implemented and automated process 602 that may be used with the here disclosed gaming machines having usable (and optionally extendible) cabinet sidewall displays. Various events associated with respective parts or all of the gaming floor plan and various timing schedules associated with respective parts or all of the gaming floor plan may be assisted with use of the cabinet sidewall displays. Process 602 is automatically repeatedly carried out for each of the cabinet sidewall displays based on current floor plan and current usability (and optional extendibility) and after it is determined (except for cases of overriding urgency) that such use will not interfere with something else occurring within the vicinity of the respective cabinet sidewall displays. In step 605 it is determined if the referenced cabinet sidewall display (CSD) is being tasked with an image presenting job in accordance with one or more event-triggered rules. (The rules are understood to be stored in a rules storing database and tested against by appropriate data processing resources, e.g., programmed CPU's.) If yes, in step 606, a prioritized list of event-triggered rules applicable to the referenced CSD are checked through and the first not-yet-done True task on the list is executed. Control then passes to step 607.

In step 605 it is determined if the referenced cabinet sidewall display (CSD) is being tasked with an image presenting job in accordance with one or more chronologically-triggered rules. (The rules are understood to be stored in a rules storing database and tested against by appropriate data processing resources, e.g., programmed CPU's.) If yes, in step 608, a prioritized list of time-triggered rules applicable to the referenced CSD are checked through and the first not-yet-done True task on the list is executed. Control then returns to step 605. Although FIG. 6B illustrates an embodiment in which execution of event-triggered tasks and of chronologically-triggered tasks are given equal opportunity, in alternate embodiments, one may be given greater preference than the other. Also, certain predetermined cabinet sidewall displays and/or locations of such may be referenced more often than others.

Figure 6C:
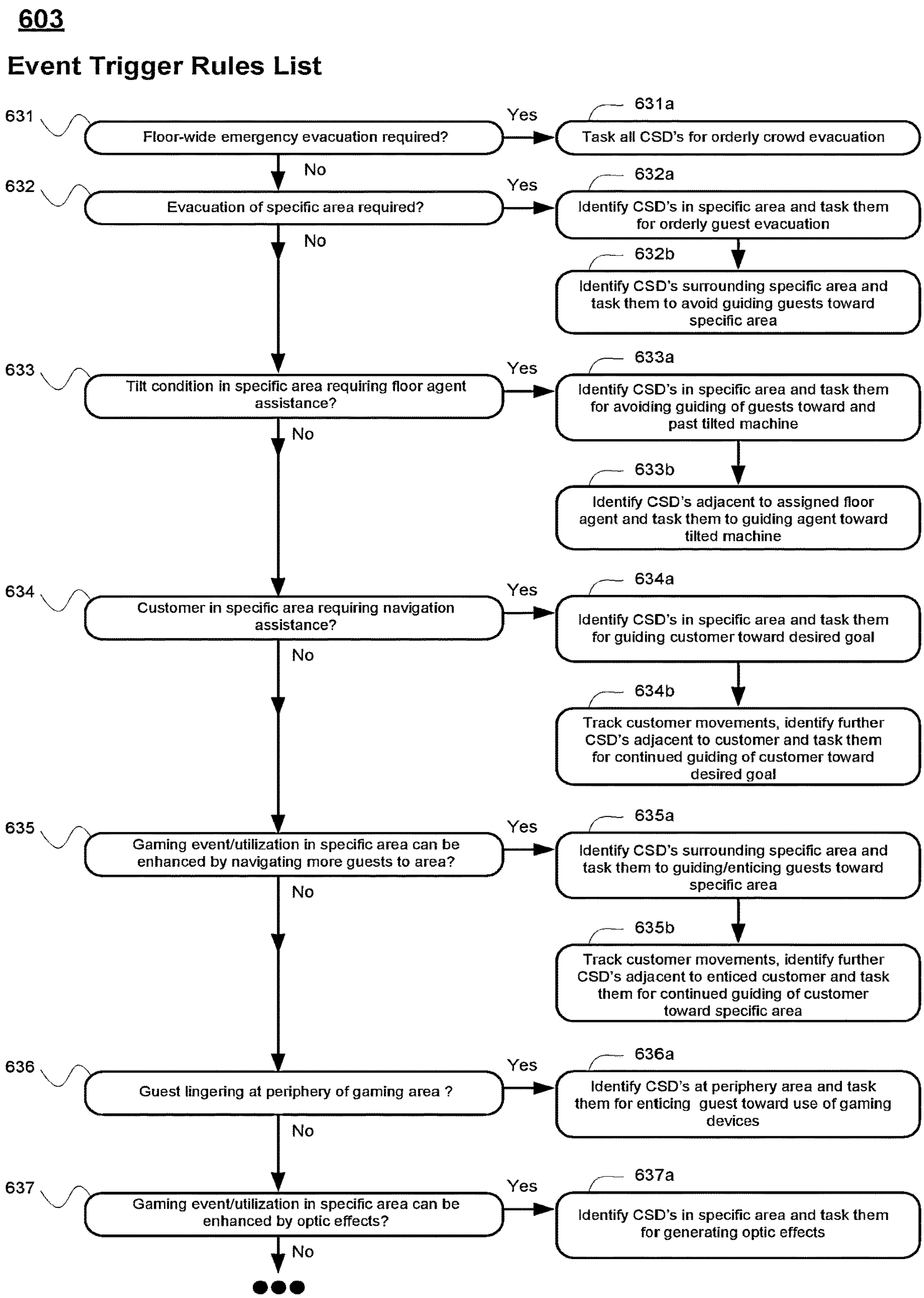
FIG. 6C is a flow chart depicting scanning through a prioritized list of event triggering rules.

Referring to FIG. 6C, shown is a machine implemented and automated process 603 in which a list of predetermined event rules, sorted according to priority are scanned through to see if any apply to one or more cabinet sidewall displays (CSD's). A higher or highest one of the prioritized events is tested for in step 631. In one embodiment, the highest priority events include floor-wide emergency events such as fire, gas leaks and so on which require floor-wide evacuation of the casino. If the presence of such an event is detected in step 631, then in step 631*a* all the CSD's on the floor are tasked with organizing an orderly evacuation of the floor. The process may include automatically determining where on the floor the largest crowds are located and generating evacuation messages that split the larger crowds into smaller groups which are separately guided along different foot paths to corresponding exit points.

If the answer to test step 631 is No, control passes to step 632 in which it is determined whether there is any event requiring evacuation of only a portion of the casino floor rather than the entire floor. Examples of such events include: a disturbance in a certain portion of the floor; a failure of multiple machines in a certain portion of the floor; a failure of support services such as lighting in a certain portion of the floor. If the presence of such an event is detected in step 632, then in step 632*a* the CSD's of the certain portion are identified and tasked with orderly evacuation of guests from that portion. Additionally, in step 632*b* CSD's surrounding the certain floor portion are identified and tasked with guiding other patrons who appear to be heading towards that certain floor portion, away from that certain floor portion. Thus, not only are the patrons who currently occupy the certain floor portion evacuated from that portion but also patrons who would otherwise start infiltrating into that portion are guided to move away from that portion.

If the answer to test step 632 is No, control passes to step 633 in which it is determined if a tilt condition is present in a specific gaming machine and therefore requires assistance of a casino floor agent. If yes, then in step 633*a* specific ones of the CSD's adjacent and surrounding the tilted machine are identified and tasked with the job of guiding patrons away from heading towards that specific machine or from heading past that specific machine. This creates room for the assigned floor agent to work on the tilted machine. In one embodiment, a foot path is identified and reserved for the floor agent to get to the machine and for keeping patrons away from that specific foot path. In step 633*b*, the current location of the assigned casino floor agent is identified and CSD's adjacent to the agent are tasked with the job of guiding the agent to the tilted machine, preferably using the reserved foot path. In one embodiment, colored code sequences and/or special symbols recognizable only by casino staff are used for guiding the agent to the tilted machine.

If the answer to test step 633 is No, control passes to step 634 in which it is determined if a specific casino guest has requested assistance in navigating to a specific resource on the casino floor (e.g., restrooms, snack bar, cashier booth, hotel desk, etc.). If yes then in step 634*a* CSD's that are in the specific location of the assistance requesting guest are identified and tasked with providing one or both of general purpose messages and semiprivate messages (e.g., Exit this way") to the guest for guiding the guest to his or her requested resource. Optionally, in step 634*b*, the specific guest is tracked as he or she progresses towards the desired goal and CSD's adjacent to the moving guest are tasked with continuing to guide that guest towards the desired goal. In one embodiment, the guest may signal a change of desired goal before reaching the first goal; for example indicating a desire (e.g., using a mobile app) to first go to the cashier booth before proceeding to the restrooms. In such a case, the process automatically re-tasks the adjacent CSD's accordingly.

If the answer to test step 634 is No, control passes to step 635 in which it is determined if there is an ongoing gaming event (e.g., a growing local progressive jackpot) for which guest experience can be enhanced by directing more patrons to the area where the gaming event is occurring. If yes, then in step 635*a* the CSD's immediately adjacent to the location of the gaming event are tasked with enticing more guests to move closer to the location of the event. In one embodiment, the number of guests who respond positively to the enticement is automatically determined and, if below a predetermined threshold; the perimeter for CSD's tasked with enticing or directing guests to the event is incrementally increased until it is determined that a sufficient number of guests are moving towards the location of the event. Optionally in step 635*b*, guests who have been enticed to start moving toward the location of the event are tracked, CSD's adjacent to them are identified and are tasked with continuing to guide the moving guests toward the desired location.

If the answer to test step 635 is No, control passes to step 636 in which it is determined if there guests lingering at the periphery of a floor area populated by gaming machines; particularly a populated floor area that is being underutilized. If yes, then in step 636*a* CSD's adjacent to those lingering guests are identified and tasked with enticing the lingering guests to enter into the area. A variety of inducements may be tried. One example is simply welcoming the guest into the area such as indicated by display 1019A of FIG. 1G. If the guest does not respond to this first inducement, a second inducement such as indicated by display 1019B of FIG. 1G may be tried. If the guest still does not respond further inducements such as offering the guest a starter amount of free chips or free spins and/or snacks and drinks may be attempted. The latter case may require assistance of a casino floor agent where in one embodiment, CSD's adjacent to that floor agent are identified and used to guide the agent to the induced guest (preferably using codes recognized only by casino staff).

If the answer to test step 636 is No, control passes to step 637 in which it is determined if there is an ongoing gaming event whose enjoyment can be enhanced by presenting various optical effects on CSD's adjacent to the location of that ongoing gaming event. Examples include cases where a player has just won a jackpot or a chance for spinning for a progressive jackpot. The optical effects may include bands of colors that stream towards and thus bring attention to the location where the exciting event is or has happened. This may be accompanied by synchronized audio effects. In one embodiment, the utilized CSD's adjacent to the location of the ongoing gaming event can include one or more of the rear cabinet sidewall displays (e.g., 1018$R_1$, 1018$R_2$) of other gaming machines whose back sides face the frontal display side of the gaming machine on which the ongoing gaming event is being presented. In other words, even though those other gaming machines might not be participating in the to-be-enhanced ongoing gaming event, their rear cabinet sidewall displays (e.g., 1018$R_1$, 1018$R_2$) are nonetheless utilized for enhancing the ongoing gaming event of the machine(s) in a next floor area forward of them.

The above examples of prioritized triggering events are merely illustrative and nonlimiting. It is to be understood that many other events can constitute triggering events for which assistance by adjacent and/or further away CSD's may be requested. Further examples of such events can include automated detection that a group of pre-identified people are planning to meet at a specific spot on the casino floor; guiding each of them to that location; detecting that all or most of them have reached the location and then guiding the group as a group to yet another location (e.g., one of the on-floor restaurants where the crowd has reserved a table or room).

Figure 6D:
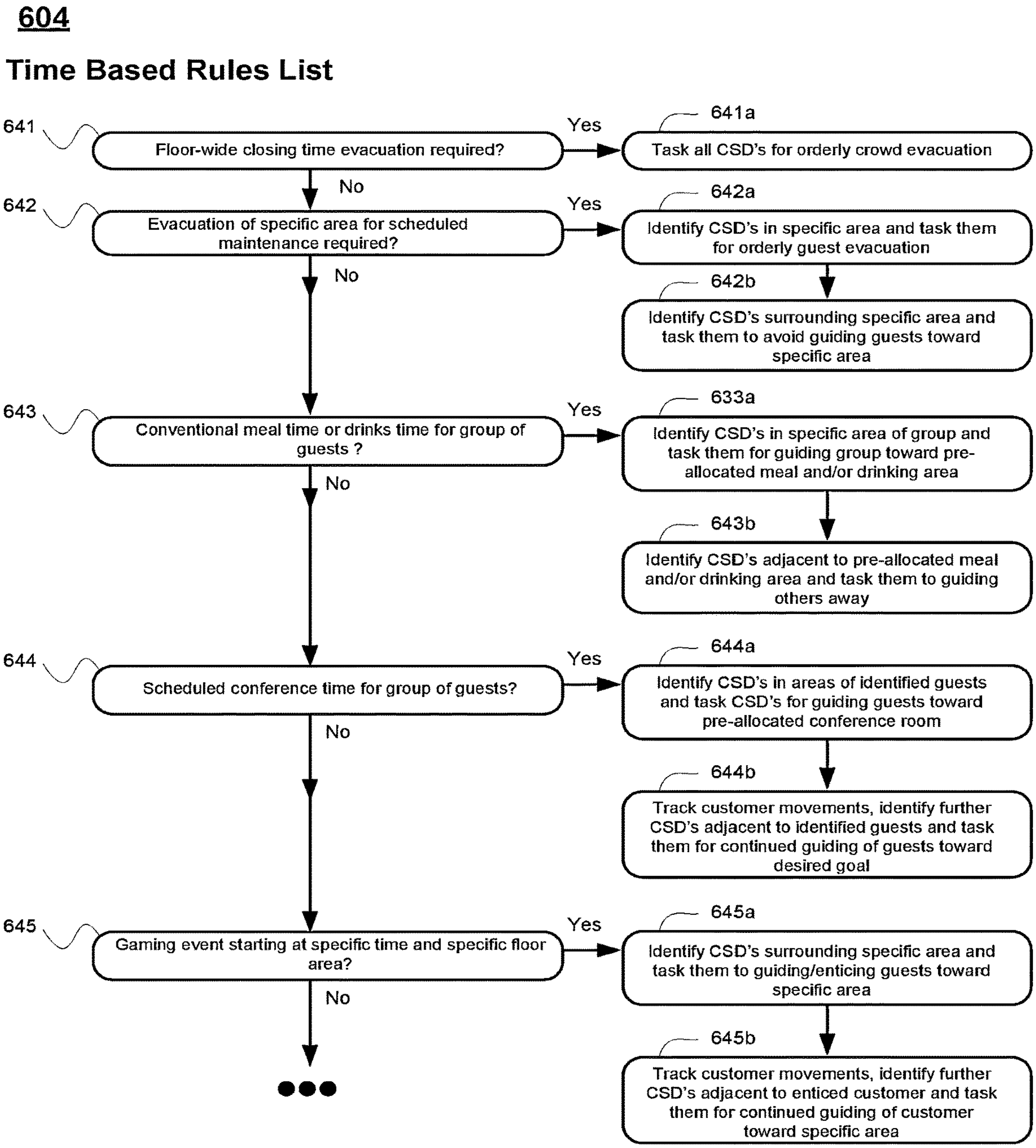
FIG. 6D is a flow chart depicting scanning through a prioritized list of chronological triggering rules.

Referring to FIG. 6D, shown is a machine implemented and automated process 604 in which a list of predetermined time-based rules, sorted according to priority are scanned through to see if any apply to one or more cabinet sidewall displays (CSD's). A higher or highest one of the prioritized events is tested for in step 641. In one embodiment, the highest priority chronologically triggered events include floor-wide ones such as for example if the casino has a closing time for removing all guests and cleaning and/or maintaining the on floor equipment and support features (e.g., vacuuming the carpet). In such a case, then in step 641*a* all the on-floor CSD's are tasked with urging the guests off the floor in an orderly manner over a predetermined period prior to the actually required closing time.

If the answer to test step 641 is No, control passes to step 642 in which it is determined if a specific area of the casino floor needs to be cleared for a scheduled maintenance event or other such localized event. If yes control passes to step 642*a* in which the local CSD's are tasked with orderly evacuation of that specific floor area. Optionally in step 642*b* other CSD's surrounding the identified location are tasked with keeping other guests from entering into the area.

If the answer to test step 642 is No, control passes to step 643 in which it is determined if there is a group of guests on the floor for whom the current time is a conventional meal time or other daily chore time. Conventional time for such daily chores may vary based on culture or simply based on staggering over time so that not all guests rush to the lunch counter at the same time. In step 643*a* the CSD's adjacent to the locations of the identified guests are tasked with guiding those guests towards the time-based conventional event. As the identified guests start converging towards the location of the scheduled event it may be desirable to clear the way for their movement. Accordingly in one embodiment a further step 643*b* is activated in which CSD's adjacent to the convergence area are tasked with keeping other guests away from the convergence area thereby freeing the area for entrance by the converging group of identified guests.

If the answer to test step 643 is No, control passes to step 644 in which it is determined if there is a group of guests on the floor for whom the current time is close to that of a prescheduled meeting at a prescheduled location. If yes, then in step 644*a* the respective guests and their locations are identified and they are reminded by adjacent CSD's of the prescheduled meeting and prescheduled location. In one embodiment the adjacent CSD's also provide navigation assistance to the identified guests for moving them towards the prescheduled location such that they arrive shortly before or at the prescheduled time. Optionally in step 644*b* the progress of each of the identified guests is tracked and CSD's adjacent to them are tasked with continuing to guide them towards the prescheduled meeting location. Additionally, if large numbers of guests are invited to the meeting yet other CSD's adjacent to the allocated footpaths heading towards the meeting are tasked with moving non-invited patrons away from the allocated footpaths.

If the answer to test step 644 is No, control passes to step 645 in which it is determined if there are specific gaming events (e.g., live bingo, live Keno™) scheduled to begin at predetermined times and in predetermined spots on the casino floor. If yes, then various CSD's about the floor may be tasked with reminding guests of the prescheduled event and its location. In one embodiment, the process automatically detects casino guests who are lingering outside the area where the prescheduled gaming event is to occur and the adjacent CSD's are tasked (step 645*a*) with inducing those lingering guests to start moving towards the location of the prescheduled gaming event. Optionally, in step 645*b* the guests who start moving towards the location are identified and CSD's adjacent to them are then tasked with continuing to guide them towards the desired location so they reach it prior to the start of the gaming event.

The above examples of prioritized and chronologically triggered events are merely illustrative and nonlimiting. It is to be understood that many other events can constitute chronologically triggered events for which assistance by adjacent and/or further away CSD's may be requested. Further examples of such events can include automated detection that a group of pre-identified people are planning to have a specific social event (e.g., dancing drinking) at a specific spot on the casino floor; guiding each of them to that location; detecting that all or most of them have reached the location and then guiding a group organizer to that location to initiate the preplanned social event.

Figure 7:
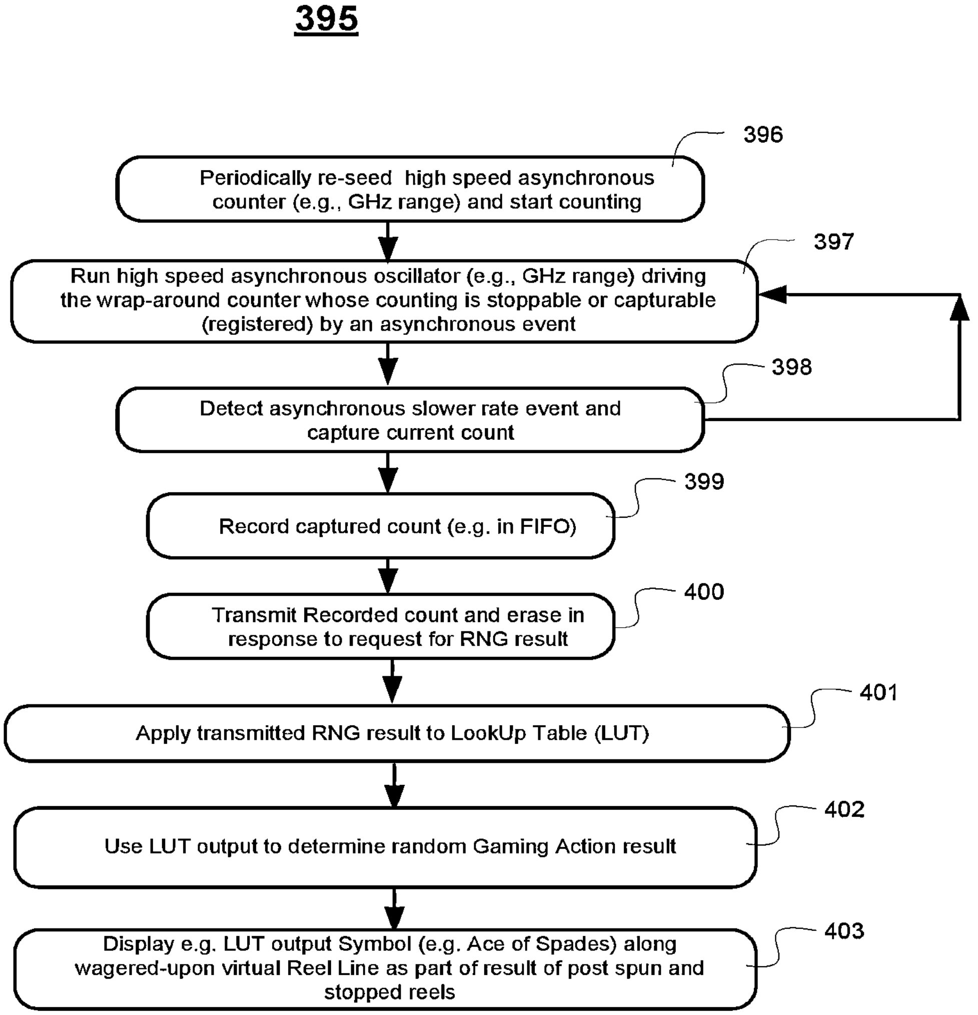
FIG. 7 illustrates a random number generating method.

Referring to FIG. 7, shown as a non-limiting example is a method 395 of using a random or pseudorandom number generator (RNG) for determining gaming action outcome. At step 396 a counter initializing value is determined as a seed for starting up a wrap-around digital counter driven by a high-speed oscillator. In one embodiment, a pseudorandom generator selects a subset of digits of the system real time clock. The selected digits are combined (e.g., summed) with a predetermined name seed and selected environmental noise measurement (e.g., background radio noise) to form the counter initializing seed. Then at step 397, the seeded counter begins its wraparound count while driven by a high-speed asynchronous oscillator (e.g., one operating in the GHz range). The counter may be a linear counter or a gray coded counter or account or otherwise wired for generating pseudorandom sequences.

At step 398, an external event that occurs asynchronously at a substantially slower rate (e.g., much slower than in the GHz range) is detected and used to trigger a register which captures the current counter value. The register captured value is stored in a temporary and secure memory such as a first-in first-out register (FIFO). In one embodiment, the FIFO is a circular one of limited size whereby unused recorded counts are overwritten by newly captured random count values. At step 400 a request is received for an orangey result and in response the count value at the output end of the FIFO is transmitted to the requester. The transmitted count value is erased from the FIFO.

In step 401 the relatively random RNG result value is applied to a statistics skewing look up table (LUT). The statistics skewing LUT differentially maps various ones of the input random numbers into respective output values or output symbols. Output values/symbols that are to have higher frequencies of occurrence are mapped to more of the input random numbers while values/symbols that are to have lower frequencies of occurrence are mapped to fewer ones of the possible input numbers. For example, in one embodiment the possible output symbols are the fifty-three possible cards in a normal playing card deck. The possible input number set may have thousands of unique members. At step 402, the output of the LUT forms at least part of the gaming action outcome. For example, the LUT output may represent an Ace of spades card. Plural an independent RNG's and LUT's may be simultaneously used for generating respective parts of a gaming action outcome having plural parts (e.g., a five card poker hand). At exemplary output step 403, the symbol represented by the LUT output is displayed for example along a wagered upon line of a set of virtual reel's that are first virtually spun and then slowed to a stop which settles on the predetermined gaming action outcome. Preferably, the RNG's and their associated LUT's are disposed in a secured central enclosure (e.g., 1004) where the graphics for the gaming action are also generated and the graphics are transmitted by secure communication links to the local gaming machines in the respective banks.

Figure 9:
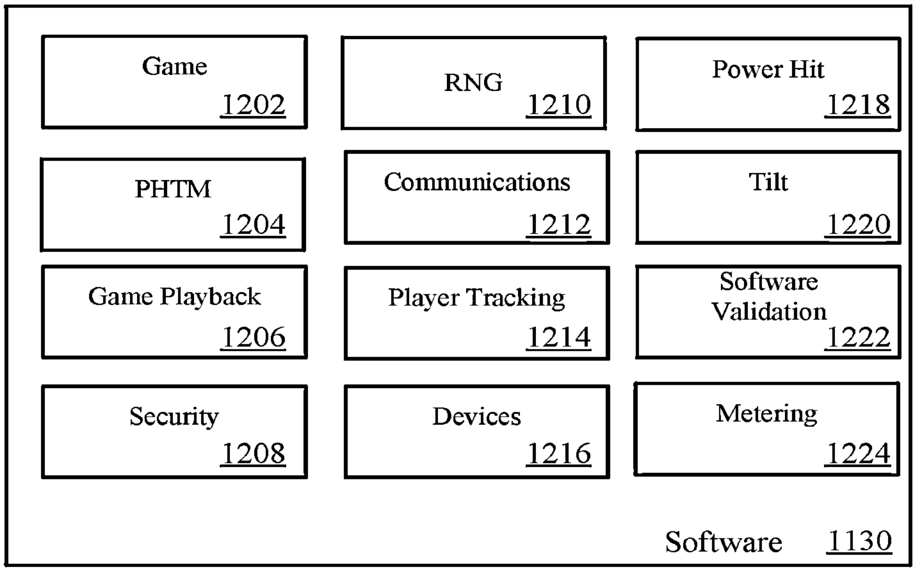
FIG. 9 illustrates gaming software in accordance with the present disclosure.

Referring to FIG. 8, details of a gaming machine controller that may be used to control the play of wager-based games including generating the game presentations and controlling the various gaming devices is described. FIG. 9 illustrates a block diagram of gaming machine components including a securely housed gaming machine controller (GMC) 1160. The GMC 1160 can be coupled to an external power supply 1146, frontal displays such as 1018' 1012; etc. and to cabinet sidewall displays (CSD's) such as 1018A, 1018B, 1018R; I/O devices 1134, external non-transient memories, such as a disk drive 1136, a power-off security device 1138, security sensors 1140, communication interfaces 1142 and meters 1144.

The external power supply 1146 can provide a DC voltage to the GMC 1160. The power supply can also provide power to the other devices in the gaming machine cabinet, such as I/O devices. Typically, the power supply 1146 is configured to receive power from an external power source, such as an AC voltage source. In some embodiments, an uninterruptable power supply (UPS) 1148 can be coupled to the power supply 1146. The UPS 1148 can be configured to provide back-up power for some time period in the event external power is lost. The GMC 1160 includes its own internal and thus securely housed battery 1124 (e.g., a rechargeable battery).

In a particular embodiment, the UPS 1148 communicates with the GMC 1160 on boot up and periodically to indicate power status and battery capacity of the UPS. If the UPS 1148 is not operational, this communication will fail and the game will display a soft tilt on the main game display, such as 1018', indicating that the UPS is not available. Under normal circumstances the UPS 1148 functions to condition the input power and ensure that the UPS battery remains fully charged. However, upon a power failure, the UPS 1148 in conjunction with the game platform will take one of two paths depending on the state of the UPS battery, which are described as follows.

If a power fail occurs and the UPS battery is more that 50% charged the GMC 1160 can immediately determine if there are credits on the machine (The threshold level can be a different percentage). If the game has no credits, the GMC 1160 can immediately hard tilt and become unplayable. The GMC 1160 can continue to run on battery power until either the battery level passes below 50% or power is restored to the game. If power is restored, the hard tilt is cleared and the gaming machine can become playable again.

If credits are on the machine, the GMC 1160 can allow game play to continue until the battery level reaches 50% charge. At that point, the GMC 1160 can complete a game in progress, cash out the player and begin an orderly shutdown. Allowing game play prior to shutting down allows the player to complete a game in progress and continue to remain on the game for a small period of time in case power is restored quickly. This keeps the game from tilting and the GMC 1160 cashing out the player for momentary glitches in power. It also allows some time for backup generators to come on line for a more serious power outage.

The power-off security 1138 can be configured to monitor the security sensors 1140 while power is off to the gaming machine, such as during a power failure or shipping. The power-off security 1138 can include its own processor, memory and power supply, such as the internal battery 1124. The power-off security device 1138 can report detected problems while the power was off to the GMC 1160 after power is restored. In some instances, a detected problem can cause a tilt condition. For example, a detected door open condition while the power was off may cause a tilt condition which has to be cleared by an operator. As another example, if the GMC 1160 can't detect the power-off security 1138, then the gaming machine can tilt.

The I/O devices 1134 can include the gaming devices that are directly or indirectly coupled to the GMC 1160 to provide the external interfaces that allow players to play the wager-based game(s) on the gaming machine. Examples of these gaming devices are described above with respect to FIG. 1. In some embodiments, a memory device 1136, such as disk drive and/or a flash drive, can be provided. As will be described in more detail below, the memory device 1136 can be used as a power hit tolerant memory (PHTM) or used to receive crucial data from another PHTM.

The communication interfaces 1142 can include wired and wireless communication interfaces, which use communication protocols, such as but not limited to Ethernet, Bluetooth,™ Wi-Fi, and NFC. A schematic indication of such a wireless communication interface 1046 is shown in FIG. 1. The remote servers (e.g., each server including one or more data processing units such as CPUs and appropriate memory such as SRAM, DRAM, Flash etc.) can form and provide the network services of block 1004 as described above with respect to FIGS. 1 and 2. The communication interfaces can be used to communicate with remote devices, such as remote servers, mobile devices in proximity to the gaming machine or other gaming machines. The GMC 1160 can be configured to support a variety of communication protocols over these communication interfaces.

In one embodiment, communications can be carried out with a back-end slot accounting system (SAS) (e.g., see network services block 1004 in FIGS. 1 and 2). In one embodiment, the SAS protocol uses a CRC redundancy check to ensure the integrity of messages going to and from the host. All type S, M, and G Long polls are CRC'd over the entire package including the address and command byte. The SAS engine can be configured to isolate the gaming code from the external communications. The SAS engine can be configured to only accept correctly formed SAS messages. Malformed, invalid or incorrect messages can be summarily dropped. Although CRC is mentioned here as one basis for data integrity validation, it is within the contemplation of the present disclosure to use of numerous other data and code integrity validation techniques including, but not limited to, hash matching techniques.

Messages that are valid can be translated into requests for the game player. The result of the message translation can be two-fold. First, the message is parsed and then evaluated for correctness and validity. If the message does not meet this criterion, it may not be translated and forwarded to the game player for a response, such as on display 1026 in FIG. 1. Second, no command, request or message from the external communication interface ever reaches any further than the SAS engine. This process ensures that erroneous signals or data will not adversely affect the game.

The meters 1144 can include hard meters, which are mechanical devices and meters maintained in software by the GMC 1160. In one embodiment, electronic digital storage meters of at least 10 digits that accumulate and store all the meters required can be used. For example, the number of games played since a RAM clear can be accumulated. In a RAM clear, critical memory can be cleared of data. Further, the number of games since the last power-up can be accumulated. As another example, games since the last door close can be accumulated.

Some other functions which may be tracked by a physical or software meter include but are not limited to attendant paid jackpots, attendant paid cancelled credits, bill in, voucher in (e.g., credit voucher), voucher out, electronic fund transfer in, wagering account transfer in, wagering account transfer out, non-cashable electronic promotion in, cashable electronic promotion in, cashable promotion credits wagered, non-cashable electronic promotion out, cashable electronic promotion out, coupon promotion in, coupon promotion out, machine paid external bonus payout, attendant paid external bonus payout, attendant paid progressive payout, machine paid progressive payout, non-cashable promotion credits wagered, number of progressives won, number of jackpots won, number of games won, number of games lost and total amount paid by attendant. Other meters can include main door open, logic door open, cash door open and stacker door open.

In a particular embodiment, software meters can be accessed from an operator menu by turning a key on the side of the gaming machine. The operator menu can be output on one of the displays (e.g., 1018', 1012'). All software meters can be cleared upon a RAM clear. In addition to the meters, the machine can also display the configured denomination, theoretical payout and actual payout. This information is accessible from the operator menu under the statistics screen. This information can be cleared upon a RAM clear event.

The GMC 1160 is preferably mechanically secured within an interior of the gaming machine. For example the GMC 1160 can be contained in a metal box. The metal box can include a secure entry, such as a hinged door, that is lockable. The openings for cables and wiring in the metal box can be purposefully designed to be as small as possible while still allowing proper electrical wiring standards regarding bend radius and connector strain. The locking mechanism for the metal box can be monitored by one of the sensors 1140.

The GMC 1160 can include a motherboard. The motherboard can be the only circuit card that contains control programs. The control programs include those used to control programmable operations within the GMC 1160. Other gaming devices, such as the I/O devices 1134, can include device specific control programs. However, these device specific control programs don't affect or alter the behavior of the control programs on the motherboard.

The mother board can include a chipset 1110. The chipset 1110 can include a Northbridge 1106, which is a memory controller hub, and a Southbridge 1108, which is an I/O controller hub. The Northbridge 1106 and the Southbridge 1108 can communicate via an internal bus 1116.

The Northbridge 1106 can be coupled to a memory bus 1112 and a front side bus 1113. The front side bus 1113 can couple on or more processors, such as CPU 1102, to the Northbridge 1106. The CPU 1102 can receive clock signals from clock generator 1104 via the front side bus 1113.

The memory bus 1112 can couple one or more graphics cards, which include graphical processing units (GPUs), to the Northbridge 1106. The graphics card or cards can be installed in the graphics card slot(s). The graphics cards can be coupled to displays, such as display 1018'. Further, the memory bus 1112 can couple one or more memory slots 1115, configured to receive volatile random access memory, to the Northbridge 1102. The CPU 1102 can communicate with the volatile memory in the memory slots 1115 and the graphics card in the graphics card slot 1114 via the memory bus 1112 and the front side bus 1113.

The Southbridge 1108 can be coupled to one or more PCI slots 1118 via PCI bus 1120. In various embodiments, the Southbridge 1108 can provide a variety of communications interfaces. The communication interfaces include but are not limited to IDE, SATA, USB, Ethernet, an audio Codec and CMOS memory. In addition, the Southbridge can communicate with a flash ROM (BIOS) 1126 and super I/O 1128 via the LPC (Low Pin Count) bus 1152. Typically, super I/O 1128 supports older legacy devices, such as a serial port (UART), a parallel port, a floppy disk, keyboard and mouse. Some of the gaming devices, such as the sensors 1140, can be coupled to the Southbridge 1108 via super I/O 1128.

The GMC 1160 can be configured to execute gaming software 1130 to control playing of a respective one or more wager-based games. On boot-up, a self-bootstrapping check of basic hardware, firmware and software integrity 1132 can be performed using firmware logic driven by the BIOS 1126. In a particular embodiment, an isolated and separate hardware device can be installed which includes the boot-up checking algorithms for the basic hardware, firmware and software integrity. The separate hardware device can be coupled to the Southbridge 1108.

In one embodiment, the gaming software 1130 can be stored on two compact flash cards, which are not conventional ROM devices. The verification mechanism can use one or more SHA-1 hashes, which produce a message digest of some length, such as one hundred sixty bits. Message digests can be stored on both compact flash memories. A public/private key covered and/or symmetric key covered algorithm with a key of some length, such as a 512-bit key can be used to encrypt and decrypt the message digests. If any errors are detected in the validation of the gaming software 1130, the GMC 1160 can automatically switch to a tilt mode and halt execution of gaming actions. The GMC 1160 can be configured to prevent programs deemed to be invalid (e.g., those failing periodic verification checks) from running.

When the gaming software 1130 is compiled and built, one or more of its respective code and/or data segments can be hashed using a hash algorithm, such as the SHA-1 hash algorithm. Other hashing algorithms can be used and SHA-1 is mentioned for illustrative purposes only. The resulting hash answers can form the hash digest. This digest, along with the start and stop values for the validation algorithm, can be encrypted by a private key. The key can be stored in a computer which is not connected to any network and which is physically stored in a secure location, such as a locked safe.

In one embodiment, prior to use, the public key can be installed in a power-hit tolerant memory, such as the NVRAM 1122 on the motherboard. This step can be performed when the gaming machine is manufactured. In another embodiment, the corresponding public and/or symmetric keys can be loaded from a secure mobile memory device, such as an authentication compliant USB device, in the field. In one embodiment, the USB port is only accessible when the enclosure which holds the GMC 1160 is opened. Without a proper public key, the machine will not operate.

When the game initially powers up, the BIOS 1126 can run a Power On Self-Test (POST) and checksum over itself and/or perform other boot-strapping integrity self-checking. If these tests fail, the game does not boot and an operator can be required to clear this tilt. If the BIOS self-test passes, the BIOS can retrieve the public key from NVRAM 1122 and can run a CRC over the retrieved key to ensure it is the correct key. The correct CRC answer can be stored on the BIOS. If the public key does not exist or if the public key CRC returns an incorrect answer, the game can halt and prompt the user to install the correct public key.

Once the public key is validated, the BIOS 1126 can test the integrity of the code stored in the system compact flash 1130 by using the validated public key to decrypt the SHA signatures for the data stored on the system compact flash 1130 and the start and stop sector identifiers indicating where the respective segments of data are stored on the compact flash for each corresponding SHA signature. The data can be stored between the start and stop sectors, inclusive. Unused sectors can be set to 0 (zero). The BIOS 1126 runs a low-level block-by-block integrity check using one or more SHA-1 hashes over the kernel and operating system (Boot and Root) partitions and compares the result to the decrypted file from the manifest. In one embodiment, the operating system can be Linux and the kernel can be a Linux kernel. If any of the hash values does not match, the game automatically goes into tilt mode.

If the values match, the BIOS 1126 can load the now-validated boot loader program and can relinquish control of the validation process to the boot loader. The boot loader can be executed by the operating system using CPU 1102. The procedure can validate the entire partition, not just the file structure. Thus any unused or unallocated areas of the partition can be tested for unintended programs or data.

Next, a file-by-file SHA-1 verification (or other hash based verification) can be performed over the pay table, assets, and player files. The resulting information can be compared against the decrypted results from the manifest file and/or from a secure encrypted database server (not shown). If the calculated answers match the decrypted answers, the GMC will proceed with the boot-up. If the hash answers do not match, the game tilts and requires operator intervention to clear.

In one embodiment, as an additional security measure, a compressed file system that is designed to be read-only can be used. The file system may not support or contain a write command or the ability to write to a file. The file system can be compressed so that it is not human-readable.

Each block of data in the file system can have a corresponding CRC stored with the block. When the block is read, the CRC is calculated and compared with the stored CRC. If the answer does not match, the file system can generate an error and the game tilts. Any changes, whether additions, deletions, or modifications, will change the CRC of the affected blocks and cause the game to tilt. This feature, in effect, monitors the integrity of the entire file system as well as the integrity of the media on a real-time basis. Although CRC is mentioned here as one basis for data integrity validation, it is within the contemplation of the present disclosure to use of numerous other data and code integrity validation techniques.

The SHA hash answers can be available on-screen and may also be accessed via the Gaming Authentication Terminal (GAT) interface. The GAT interface (not shown) can be provided as one of the I/O devices 1134 or within the super I/O 1128. The GAT interface can be configured to allow an operator to initiate an SHA-1 hash or an HMAC SHA-1 on-demand so that an operator (or other independent entity) can validate the integrity of the software 1130 at any time. In one embodiment, a nine-pin "D" connector is available to an operator or regulator (e.g., government authorized inspector) for access the GAT serial terminal.

Access to the GAT port requires opening of the main door. Further, it may require unlocking of the GMC enclosure. In one embodiment, a GAT port can be provided on the outside of the GMC enclosure. Hence, the GMC enclosure can remain locked while the GAT port is utilized.

As described above, the gaming machine can include a power hit tolerant memory (PHTM). For example, NVRAM 1122 (nonvolatile memory, for example a RAM coupled to battery 1124) can be used as a PHTM. The PHTM can be used to store crucial data, such as data generated during the play of a wager-based game. The PHTM can be configured to be able to quickly write the crucial data in response to a detection of an imminent power interruption. The CPU 1102 can be configured to detect a potential power interruption via the power interruption signal received from the power supply. The power interruption signal can indicate a fluctuation in the power.

Not all memory types may be suitable for use as a PHTM because their write times are not fast enough to store data between the detection of a potential power interruption and the power interruption. For example, some disk drives don't typically have fast enough write times for use as a PHTM. In one embodiment, a disk drive 1136 can be used. However, it requires that use of an uninterruptable power supply coupled to the disk drive 1136 and GMC 1160 to maintain power after the external AC power source is lost. Other types of memory with slower write times can be employed when an uninterruptable power supply is used.

Typically, a volatile RAM (random access memory) has a fast enough write speed to be used as a PHTM. However, after the power is lost, data stored in the volatile RAM is lost. To overcome this deficiency, a rechargeable battery, such as 1124, can be coupled to the RAM 1122 to provide persistence memory storage. This memory configuration can be referred to as a non-volatile RAM (NV-RAM). The battery power levels can be monitored so that it can be replaced as needed if it is no longer rechargeable. Alternatively or additionally, other forms of nonvolatile memory can be used including for example flash memory, phase change memory, etc.

In one embodiment, an NVRAM 1122 with a battery 1124 is shown inserted in one of the PCI slots 1118. The NVRAM 1122 can be used as a PHTM. In other embodiments, it may be possible to use a RAM inserted into one of the memory slots 1115 that is coupled to a battery. It yet another embodiment, it may be possible to use a high-speed USB connection to a memory storage device to provide a PHTM. As noted above, a hard disk, such as 1136, in combination with an uninterruptable power supply 1148 can be used as a PHTM.

In yet other embodiments, a GMC 1160 may utilize multiple memory storage devices to store crucial data. For example, the NVRAM 1122 can be used as a PHTM. However, crucial data can be copied to a non-PHTM from the NVRAM 1122 as needed. The copied data can provide a back-up of crucial data stored in the PHTM. Further, after crucial data is copied from the PHTM and the validity of the crucial data is verified, it may be deleted from the PHTM to free up space.

In one embodiment, crucial data can be stored in an NVRAM chip and in a high speed read/write compact flash. Crucial data such as RNG outcome, game recall, game state (credits, wager, winnings), and meters can be stored in NVRAM as files. Each file is hashed (MD5 or SHA-1 depending on the file) and the hash answer can be stored with the file and/or stored in encrypted form in a secure encrypted database server (not shown).

Additionally, in a particular embodiment, in NVRAM, the critical files can be kept in triplicate with each copy having a separate MD5 hash of the information. Prior to displaying each game outcome, this data can be rehashed and the three outcomes can be compared. If all three hash answers match, the data is deemed to be good and the game results are displayed to the player and a copy is stored in NVRAM. If two of the sets match, the non-matching set is deemed to be corrupt and it is replaced with a copy from one of the other two and the results are displayed to the player. If all three are different, memory can be deemed to be corrupt and a tilt can occur, halting play. The comparisons can occur continuously, each time the memory is updated, which may be multiple times during the course of a single play. However, a comparison can be performed at least once prior to displaying the game outcome.

To protect meters in the event of a power loss, various meters can be stored in NVRAM 1122. Thus, the meters are protected in the event of a power loss. The battery 1124 can be a lithium cell rated, based on the current draw of the NVRAM, to maintain the meters for at least 90 days. In one embodiment, the lithium cell can be rechargeable via the power supply 1146.

In particular embodiments, a game play history associated with recent games can be stored in the NVRAM 1122. This information can be retrieved from the NVRAM 1122 via an operator menu and output to a display, such as display 1018. In particular embodiments, a complete play history for the most recent game played and the nine prior games can be made available. A method involving game play history is described in more detail with respect to FIG. 13.

Various embodiments in accordance with the disclosure can include one or more of the following as components thereof: as a CPU (e.g., 1102) or other processor: an Intel LGA1150™ Socket set (H3 socket) populated by a Haswell G3420™ dual core; for the Northbridge hub (e.g., 1106): an Intel Q87 Platform Controller Hub (PCH)™ chip set; for the Southbridge hub (e.g., 1108): this part is integrated within Q87 PCH™ chip set; for the system memory Bus (e.g., 1112): a PCI Express x16 Bus; for system Memory Slots (e.g., 1115): Dual 200 pin SODIMM, Non-ECC DDR3, providing e.g., 8 GB total; for NV RAM (e.g., 1122): a PCIe x1 Interface, e.g., providing 8 MB Battery Backed SRAM; for a backup Battery (e.g., 1124): a CR2032; for FLASH ROM(BIOS) (e.g., 1126): the SPI FLASH, W25Q128™ using a LOTES ACA-SPI-004-K01 Socket™; for Super I/O interface (e.g., 1128): a Realtek F81866AD-I™; for Gaming Software (e.g., 1130 Software): corresponding Game Software stored on 32 GB 2.5" SSD; for Software Verification (e.g., 1132): OS Software stored on a 4 GB CF Card; for a Power Supply (e.g., 1146): the N2 Power XL375-12™ controller; for a UPS (e.g., 1148): the CyberPower CP1350™ controller.

For a slot game, the game play history can include credits available, credits wagered, number of lines played (when appropriate), bonuses won, progressive won, game winnings (credits won) and credits cashed out. For "pick" bonuses, the intermediate steps involving the player picks can be retained. In games with free spins, the initiating game is retained with all or, for cases where more than fifty free games have been awarded, at least the last fifty free games played. This gaming information can be displayed in the recall screens through standard text meters, screen shots, graphical display elements and textual representations of specific situations that occurred during game play. The game play history can illustrate unique game play features associated with the game in general and specific game features that occurred during the instantiation of a particular play of the wager-based game.

A gaming machine controller configured to generate a wager-based game in accordance with player selected volatility parameters is described with respect to FIG. 8. Gaming software used to generate the wager-based game is discussed with respect to FIG. 9. With respect to FIG. 9, a power hit tolerant memory (PHTM) configured to store crucial data generated from playing the wager-based game is discussed. The crucial data can include information associated with selected volatility parameters and wager-based games generated using the selected volatility parameters.

Figure 11:
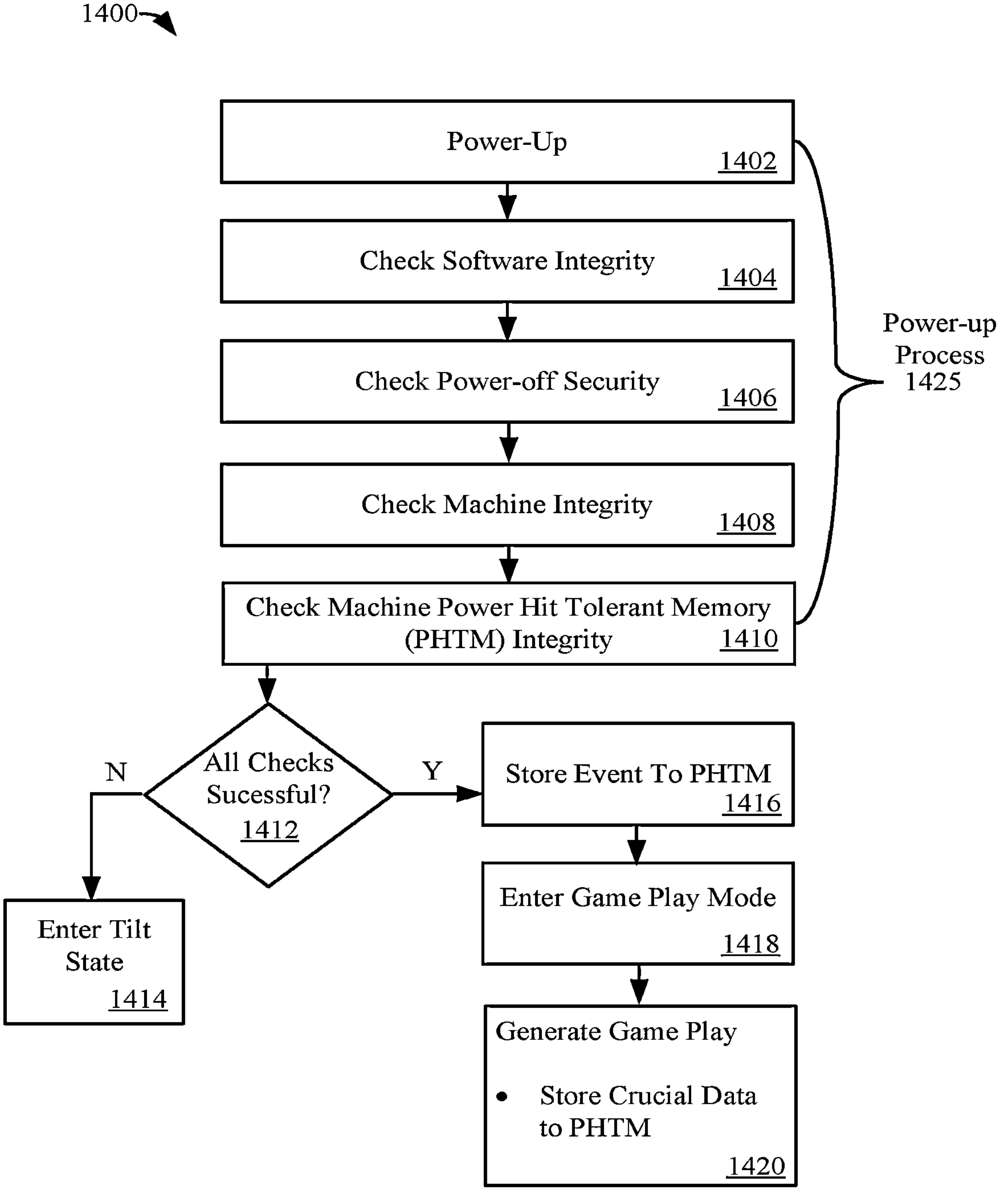
FIG. 11 illustrates a method powering up a gaming machine in accordance with the present disclosure.
Figure 12:
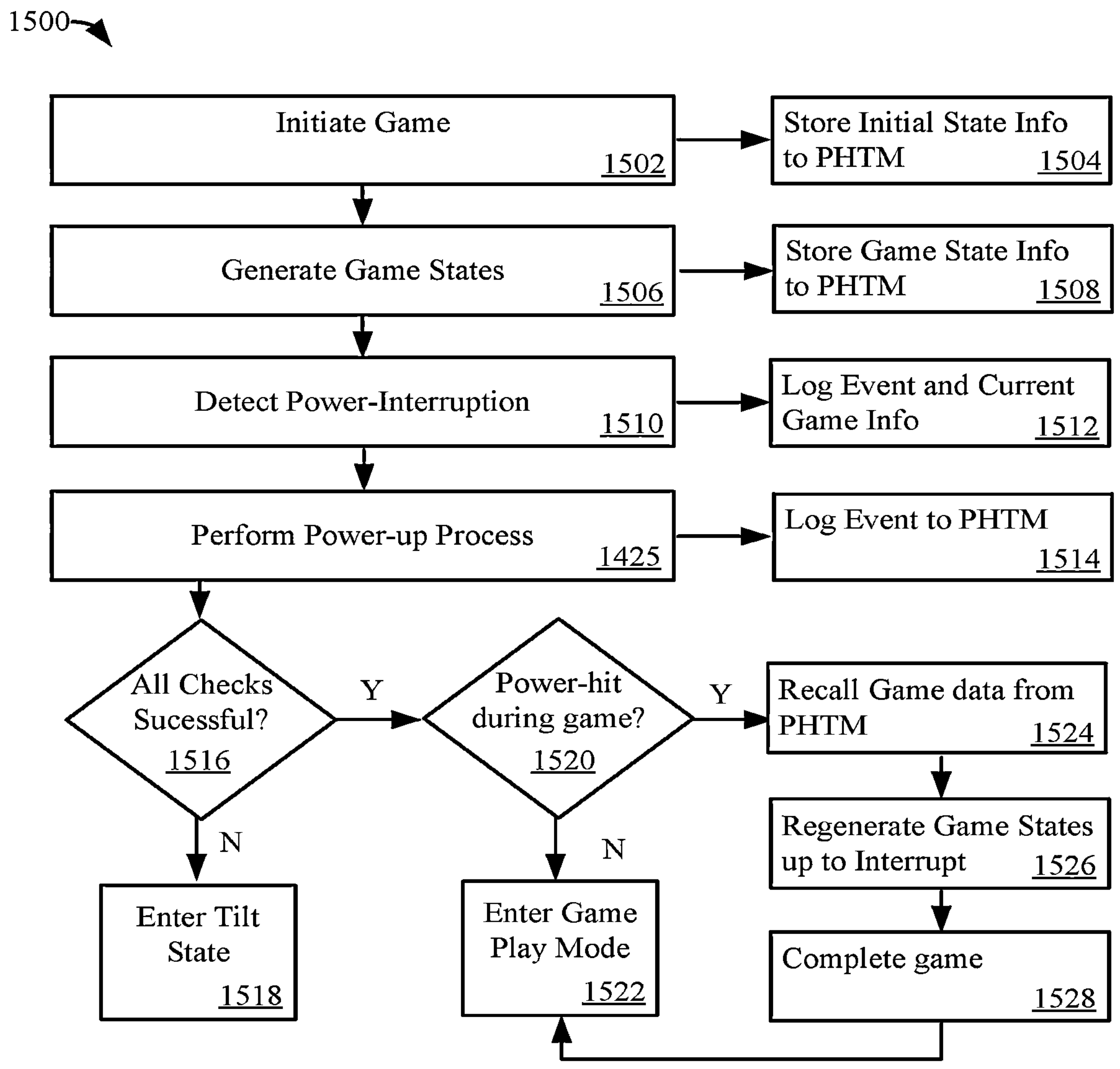
FIG. 12 illustrates a method for responding to a power interruption on a gaming machine in accordance with the present disclosure.

With respect to FIG. 12, a method for responding to a power interruption on a gaming machine, which utilizes the power hit tolerant memory, is discussed. With respect to FIG. 11, a method of powering up a gaming machine is described. Finally, with respect to FIG. 13, a method playing back a game, such as a wager-based game including a first primary game and a second primary game, previously played on a gaming machine is discussed.

FIG. 6 illustrates a block diagram of examples of gaming software 1130 that can be executed by a Gaming Machine Controller (GMC) 1160 in FIG. 8. The game software 1202 can be configured to control the play of the game. The play of the game includes determining a game outcome and award associated with the game outcome using the RNG software 1210.

The game software 1202 can be configured to utilize reel strips and/or wheels of chance with different properties. For example, virtual reel strips with different total number of symbols, different symbol combinations and different stopping probabilities. As described above, the game software may utilize different virtual reel strips in response to a selection of different prize structures involving scatter distributed symbols.

The award can be presented as a number of different presentation components where a portion of the award is associated with each presentation component. These presentation components can be referred to as game features. For example, for a video slot game, game features can involve generating a graphical representation of symbols moving, settling into final positions and lining up along a combination of different lines (e.g., paylines). Portion of the award can be associated with different lines. In another example, the game features can involve free spins and chance award of bonus wilds during the free spins. In yet another example, the game feature can involve generating a graphical representation of symbol and then actuating a mechanical device, such as wheel to indicate an award portion.

In a further example, a game feature can involve a bonus game where a portion of an award for a game is presented in a separate bonus game. The bonus game can involve inputting choices, such as a selection of a symbol. Similar to the primary game, the bonus game can include bonus game features where bonus game award is graphically presented in a number of different portions. A primary game can include game features which trigger different bonus games with different bonus game features.

As described above, game features and bonus game features can be stored to a power hit tolerant memory (PHTM). The PHTM software 1204 can be configured to manage the transfer of crucial data to and from the PHTM. Further, as described above, the PHTM software 1204 can be configured to verify the integrity of the data stored in PHTM.

In particular embodiments, the game 1202 has no knowledge of PHTM. Thus, the utilization of the PHTM can be totally abstracted from the game 1202 and contained in a shared object that is loaded at runtime. This shared object will also determine if the PHTM is available and how much memory space is available. If there is no PHTM, or it doesn't contain enough memory, the shared object can be configured to automatically use a disk file instead. This function may allow the game to be run in a windows environment and still have the ability to recover from a power hit.

One purpose of the PHTM 1204 is proper recovery from a power hit. In order to facilitate proper power hit recovery, numerous transition points can be built into the game 1202 where crucial data is stored to PHTM at each transition. The transitions can be implemented as states, which can be referred to as game states or game state machines. The states themselves can also be stored in PHTM so that on startup, after validating that the PHTM is not corrupt, the game 1202 can then check the current state that is stored. That state will then determine where the game will restart. The idea is that whenever a state transition occurs and is saved, the data needed to recover to that state has also been stored in PHTM.

Different approaches can be used in deciding when to save data to PHTM. In one embodiment, a thread runs in the background that constantly checks the data in memory against a copy of what's in PHTM as well as a force write flag. If the force write flag has been set or if it sees that the crucial data has changed, PHTM software 1204 writes it to the physical PHTM, updating the copy as well.

In another embodiment, the PHTM software 1204 can be configured to write all data directly to PHTM as it occurs. At certain times the PHTM software 1204 can be configured queue writes rather than committing them in order to make it an "all or nothing" write. This feature can be normally done for something that is going to cause a state change, a cash-out, etc. This feature can allow all the meters or crucial data associated with the game to be written at once, keeping the window of opportunity for corruption to the smallest amount of time possible.

In particular embodiments, multiple state machines can be used that are based on the overall game state machine. For example, separate "sub-state machines" can be used for critical functions that use external I/O devices, such as bill acceptors and printers. If the game 1202 restarts in a state that requires more granularity and has a different state machine such as a cash out or a ticket inserted state, it can switch to that sub-state machine to complete the actions and then return to the overall game state machine.

In particular embodiments, the sub-state machine concept can be used for areas of the game that are outside of the main game flow such as bonus games. For example, if the game is in a bonus game with bonus game feature including a free spin bonus round and the power cycles before all of the free spins have finished, the game will recover to the spin that was being executed when the power cycled and will continue from there. If the game is in a bonus game during a bonus game feature including a pick bonus, the game 1202 can recover to the point where the power cycle occurred. In particular, the picks that have already been made can be displayed and then the bonus game can continue from that point including receiving additional picks. Further, the game 1202 may be configured using the crucial data stored in the PHTM to regenerate on the display all or a portion of the game states prior to the power hit, such as the initial state of the game and game states that occurred prior to the bonus game.

The game playback 1206 can be used to display information associated with one or more game states of a wager-based game previously played on a gaming machine. As an example, a particular wager-based game can be initiated and played on the gaming machine. During game play of the particular game, crucial data associated with game states that occur can be stored to the PHTM. Subsequently, one or more additional games can be played on the gaming machine. Then, using crucial data recalled from the PHTM, game information associated with the particular game can be redisplayed on the gaming machine. The game information can include but is not limited to a) text information, b) screen shots that were generated during game play and c) a regeneration of all or a portion of a graphical game presentation associated with the particular game.

Typically, to access the gameplay back feature, the gaming machine has to be placed in a tilt mode where an operator menu is available. From the operator menu, using game playback software 1206, an operator can select a particular game for playback from among a plurality of games previously played on the gaming machine. To resume normal game play, the tilt mode can be cleared and the gaming machine can revert to a normal operating state. More details of game play back are described with respect to FIG. 10.

The security software 1208 can be configured to respond to information received from various security sensors disposed on the gaming machine and from the power-off security device (e.g., see 1138 in FIG. 8). For example, the security software 1208 can be configured to detect that a locking mechanism has been actuated on the gaming machine and then cause the gaming machine to enter a tilt mode. As another example, the security software 1208 can be configured to receive information from the power-off security device that the gaming machine door was opened while the gaming machine was being shipped. In response, the security software 1208 can cause the gaming machine to enter a tilt state. In yet another embodiment, the security software 1208 may not be able to detect a sensor, such as a sensor (e.g., see sensors 1140 in FIG. 8) which monitors a state of a door and in response enter a tilt state.

The RNG software 1210 can be configured to generate random numbers used to determine the outcome to a wager-based game. In one embodiment, a Mersenne twister random number generator (RNG) algorithm, which generates integers in the range [0, 2^k−1] for k-bit word length with a period of (2^19937)−1 can be used. It has a longer period and a higher order of equi-distribution than other pseudo-random number generators. The Mersenne Twister is also very fast computationally as it uses no division or multiplication operations in its generation process. It can work well with cache memory and pipeline processing.

In particular embodiments, the RNG cycles at seventy RNG cycles/second or above, such as equal to or above one hundred RNG cycles/second. This speed has been determined by engineers at the Nevada Gaming Control Board to be fast enough that it cannot be timed by the player. The tests showed that above seventy RNG cycles/second successfully hitting a specific outcome became sporadic, and the results were completely unpredictable at one hundred RNG cycles/second. An evaluation showed the variance in the contact mechanism of mechanical switches and the inherent variance in the "button press" detection circuitry, combined with the inability of a person to repeat a movement, provided enough ambiguity in the final registration of the button press to eliminate a player's ability to affect the payback characteristics of the game.

The RNG can be seeded using a plurality of variables. In particular embodiments, the RNG can be seeded by four variables that eliminate the same seed sequence from being used in more than one device, such as two gaming machines using the same RNG seed. The variables can be 1) absolute time, 2) time since the machine powered up, 3) machine number and 4) a random number from the kernel base RNG "/dev/urandom." The random number from the kernel can be associated with the Linux Kernel. This RNG "/dev/urandom" can be based on random occurrences, such as times between keystrokes, mouse movements, timing between interrupts, and hardware occurrences. These occurrences can be used to build and maintain an entropy pool.

The system protects against the same sequence in several ways. First, even if two games are powered on at exactly the same time, there is enough variability in the exact time that the time since power up should prevent any two games from having the same number returned from this function. Also, the "urandom" RNG is entropy based, and is self-seeded from environmental noise contained in the kernel, which makes it unlikely that two machines would ever have the same seed. Finally, the machine number (EPS number) is used as part of the seed. Because this number is used to uniquely identify the gaming machine on the floor, it should always be different from any other machine.

The communications software 1212 can be used to provide communications via the various communication interfaces and using various communication protocols. For example, the communications software 1212 can support the SAS protocol over wired or wireless communication interfaces. In another example, the communication software may allow the gaming machine to communicate with a mobile device via a wireless communication interface using a Bluetooth™ protocol.

The player tracking software 1214 may allow the GMC to communicate with a player tracking device installed on the gaming machine and/or directly with a remote server which provides player tracking services. For example, a player tracking device can be configured to communicate a GMC to transfer credits to and from the gaming machine. In another embodiment, the GMC can be configured to receive player tracking information from a card inserted in a card reader (e.g., see 1028 in FIG. 1A) or via wireless communications with a player's mobile device. Then, GMC can communicate with a remote server to receive information associated with a player and send information associated with the player's game play on the gaming machine.

The devices software 1216 may be used to allow the GMC to communicate with various devices coupled to the gaming machine, such as I/O devices coupled to gaming machine. For example, the devices software may allow the GMC to communicate with a bill acceptor (e.g., see bill acceptor 1024 in FIG. 1) and in response add credits to the gaming machine. In another example, devices software may allow the GMC to communicate with a printer (e.g., see printer 1022 in FIG. 1) and in response cash out credits from the gaming machine in the form of printed ticket.

The power hit software 1218 can allow GMC to respond to power hits. For example, the power hit software can monitor the power supply and in response to a detection of power fluctuations update the PHTM with crucial data. In another example, when the gaming machine is power-up from a power hit, the power hit software 1218 can determine the power hit occurred during game play and initiate a restoration of the gaming machine to its state when the power hit occurred.

The tilt software 1220 can be configured to monitor sensors and gaming devices for tilt conditions. In response to the detection of a tilt condition, the tilt software 1220 can cause the gaming machine to enter a tilt state. Further, the tilt software 1220 can record tilt information to the PHTM.

For example, when a machine door open is detected, the game can tilt with a hard tilt that prevents play and disables the game. If the gaming machine includes a tower light, the tower light can flash to indicate that a door is open. Further, a "DOOR OPEN" indication can be displayed on the main display screen. Upon a detection of the door closing, the tower light can stop flashing and the "DOOR OPEN TILT" can be replaced with a "DOOR CLOSED SOFT TILT."

The door open tilt condition can be the behavior for all the machine doors, such as door 1014 in FIG. 1 or a CPU enclosure door (not shown). Additionally, the behavior may not change for multiple doors that are open. Thus, the "DOOR OPEN" indication can remain on, and the machine will be disabled until all the doors are closed. After the final door is closed, the tower light can go off, the game can become playable and the "DOOR OPEN" indication can be written over by a "DOOR CLOSED" indication which will remain until the end of the next game cycle.

A number of tilts can be generated that must be cleared by an attendant. These tilts may include clearing the condition with a key switch or, for tilts such as "PAPER OUT," the tilt may clear automatically after the attendant has remedied the malfunction. A low battery for a PHTM (e.g., see NVRAM 1122 in FIG. 8 or 1204 in FIG. 9) can be indicated by a "RAM BATTERY" tilt.

A "PRINT FAILURE" tilt can occur when there is a failure to print a ticket. In response, a printer hard tilt error can be issued and the description will indicate that the printer is offline. The tilt can be cleared when the printer is brought back online.

A "PRINT MECHANISM/PAPER JAM" tilt can occur for a paper jam. The game can indicate the paper jam has occurred and the printer is off-line (e.g., see printer 1022 in FIG. 1). This tilt can be cleared by clearing the jam and reinserting the paper into the printer.

A "PAPER OUT" tilt can occur when the printer runs out of tickets (e.g., see printer 1022 in FIG. 1). In response to detecting no remaining tickets, the game can display information indicating no paper is available and the game can be disabled. This tilt can be cleared when new printer stock is fed into the printer.

A defective storage media tilt can occur when an error is detected in a critical memory device, such as the memory storing the game software (e.g., see 1130 in FIG. 8), the memory storing the BIOS (e.g., see BIOS 1126 in FIG. 7) or the PHTM storing crucial data (e.g., see NVRAM 1122 in FIG. 8). A message indicating the validation error can be displayed. This tilt may require a "RAM CLEAR" to remedy the tilt condition. A "RAM CLEAR" can erase all meter, recall and other critical memory.

As described above, multiple copies of crucial data can be stored in the PHTM (e.g., see NVRAM 1122 in FIG. 8) and the GMC (e.g., see GMC 1160 in FIG. 8) can be configured to detect and correct copies of faulty data. When uncorrectable memory is detected in the PHTM or another device, it can result in a "CRITICAL MEMORY ERROR" tilt. Again, this tilt can require a "RAM CLEAR" to remedy the condition. Again, the "RAM CLEAR" can erase all meter, recall and other critical memory.

A "BILL JAM" can occur when the bill acceptor detects a bill jam (e.g., see bill acceptor 1024 in FIG. 1). The tilt condition can be displayed on the display, such as main display 1018 in FIG. 1A. This is a hard tilt which disables the game until an operator clears the bill jam condition.

When a stacker is full, the game can displays a soft tilt error on the main screen. A "stacker full" may be displayed as a security measure. The stacker can be coupled to a bill acceptor and located in the main cabinet of a gaming machine (e.g., see bill acceptor 1024 in FIG. 1). The game can remain playable but will not accept any further currency or tickets. This tilt is automatically cleared once the stacker is emptied or replaced. When the stacker is removed, the game will be disabled and display a "STACKER OPEN" message. This tilt can be cleared when the stacker is reinserted.

The software validation software 1222 can be executed by the CPU to validate the various software components on the gaming machine. For example, hashes of memory blocks can be performed and compared to stored hash values (e.g., stored in encrypted form in a secure encrypted database server). This software can differ from the validation logic which is executed separately by the BIOS to perform validation functions.

The metering software 1224 can be used to update the hard meters and generate and update the soft meters. The metering software 1224 can be configured to store metering information to the PHTM (e.g., see NVRAM 1122 in FIG. 8). Examples of the meters which can be maintained are described above with respect to meters 1144 in FIG. 8.

FIG. 6 illustrates a block diagram of one embodiment of a power hit tolerant memory (PHTM) (Additional details of PHTMs are described with respect to NVRAM 1122 in FIG. 9 and PHTM 1204 in FIG. 9). Crucial information associated with the current game can be stored in 1302. Some examples of crucial information include but are not limited to a wager amount, a game outcome, one or more random numbers to determine the game outcome, information about game states and sub-states including the current game state, an amount won, initial credits and frame captures associated with one or more states. As described above, this information can be used to return the game to a current state after a power-hit. The one or more random numbers can be used to regenerate a particular game outcome associated with the random numbers and the wager amount.

After a game is completed, it can be moved to a game history partition 1304. The game history partition can store crucial data associated with a plurality of previously played games. For example, in one embodiment, the PHTM 1300 can be configured to store crucial data associated with the current game and nine past games. In another embodiment, the PHTM 1300 can store information associated with up to one hundred past games.

When the maximum number of games in the game history partition is reached, the software which manages the PHTM 1300 can be configured to delete the oldest game. This process can occur prior to starting the next game. For example, if a maximum of ten games are stored in the game history 1304, then prior to the play of the eleventh game, the oldest game can be cleared from the memory. In one embodiment, prior to the deletion of the crucial data associated with the oldest game, it can be copied to a secondary persistent memory.

In 1306, accounting information can be stored. The accounting information can include the metering information previously described above. In some embodiments, this information can be recalled in the event of a power failure.

In 1308, machine configuration information can be stored. Some example of machine configuration information can include but is not limited to Manufacturer ID, date of manufacturing, machine ID, operating system version, number of screens, cabinet type, hard disk capacity, PHTM capacity, number of PHTM banks, printer model information, touch screen model information, card reader model information, bill acceptor model information, display model information, jurisdiction information, casino name and other information, sales order #, manufacture information, logo's, etc. In one embodiment, the public key used in the code validation process can be stored here.

In game configuration 1310, game configuration information can be stored. The game configuration information can include paytable selection, game features selections, bonus selections, jackpot contribution setting, denominations, max number of paylines, number of game titles and game versions. A gaming machine can have many paytables with different holding percentages which can be selected by the casino. Similarly, selectable game features and bonus features can be provided.

In security 1312, security information can be stored. Security information can include information that lead to a tilt condition and the associated tilt condition. For example, if a door is opened, the security information can include when the door was opened, when game play was disabled, when the door was closed, when the tilt condition was cleared and when game play was subsequently enabled.

Figure 10:
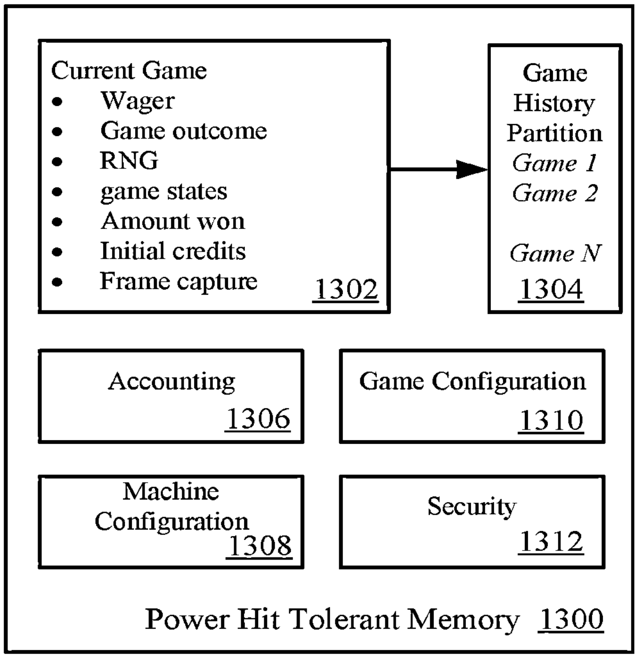
FIG. 10 illustrates a block diagram of power hit tolerant memory in accordance with the present disclosure.

FIG. 10 illustrates a machine-implemented automated method 1400 for responding to a power interruption on a gaming machine. In 1402, the gaming machine can begin a power-up process 1425. The power-up process can begin when a power switch in the interior of the gaming machine is turned on or when power is restored after a power interruption. In response to detecting external power is available, a signal can be generated which initiates a software integrity check on in 1404.

In 1404, the software integrity on the gaming machine can be checked. In particular embodiments, a public key/private key method and a "ladder of trust" can be used to verify control programs executed by the game controller. The initial rung of the ladder of trust can be the BIOS EPROM (see 1126 in FIG. 5), which may be a conventional ROM device. This conventional ROM device can load and can verify the initial code which continues the "verify then load" ladder of trust until the entire operating system and the game is loaded. This process was described above in detail with respect to FIG. 8.

In 1406, the power-off security device (see 1138 in FIG. 8) can be checked. The power-off security can monitor all the doors in the EGM. For example, the doors can use optical emitter/sensor pairs, but some might also use Hall-effect sensors. The system can be a standalone device with a CPU, RAM, NVRAM, sensors I/O board, and battery. The battery can be configured to last at least 30 days. It can be configured to record all critical events, such as power brown out, power black-out, main door open, logic (CPU) door open, bill acceptor door open, printer door open, top box door open and player tracking door open. These critical events may have occurred while the GMC was shut down and hence not monitoring the gaming machine for critical events.

In 1408, the machine integrity can be checked. For example, the security sensors on the gaming machine can be checked to verify all the doors are closed. Further, gaming devices, such as the printer and the bill acceptor, can be checked to determine the devices are operating properly (e.g., see printer 1022 and bill acceptor 1024 in FIG. 1).

In 1410, critical memory on the gaming machine can be checked. For example, the PHTM can be checked to make sure the stored information matches associated hash values. As described, a hash value can be generated for crucial data stored in the PHTM. The hash values can be stored with the crucial data. When the PHTM integrity is checked, new hash values can be generated and compared to the stored hash values.

In 1412, the GMC can determine whether all the checks were successful. If one or more of the checks are not successful, in 1414, the gaming machine can enter a tilt state and game play on the gaming machine can be disabled. Information about the tilt state can be output to a display, such as the main display on which a gaming presentation for a wager-based game is output.

In 1416, when all the checks are successful, event information associated with the successful power-up process can be stored to the PHTM. For example, the time that the gaming machine was enabled for game play can be stored to the PHTM. In one embodiment, as described above, this information can be used to generate a seed for a random number generator used on the gaming machine.

In 1418, the gaming machine can enter game play mode. Thus, the gaming machine is enabled to accept bills and tickets that are redeemed for credits on the gaming machine. After credits are deposited, the gaming machine can be used to make wagers on the game(s) available for play on the gaming machine. In 1420, the GMC can generate wager-based game play on the gaming machine and store crucial game play data to the PHTM.

FIG. 12 illustrates a method 1500 powering up a gaming machine. In 1502, a wager can be placed and a game can be initiated. In 1504, initial state information associated with the game can be stored to the PHTM. In 1506, game states associated with the game can be generated. In 1508, crucial data associated with the game states can be stored to the PHTM.

In 1510, a power-interruption can be detected. For example, the GMC can receive a signal from the power supply which indicates a power spike associated with a power shutdown has occurred. In 1512, the event can be logged to the PHTM. In addition, current game state information can be logged to the PHTM prior to the power failure. After power is lost, the GMC may no longer operate unless an uninterruptable power supply is available.

In 1425, the power-up process in FIG. 11 can be performed. In 1514, this event can be logged to the PHTM. In 1516, whether the power-up process is successful can be checked. In 1518, if the check is not successful, the gaming machine can be placed in a tilt state and information about the tilt state can be output.

In 1520, a check can be performed to determine whether the power-hit occurred during the play of a game and prior to completion of the game. This information can be stored in the PHTM. In 1524, when the power-hit occurred during the play of a game, data associated with the game including the current game state can be retrieved from the PHTM. In 1526, the game can be regenerated up to the current game state just prior to the power hit. In some embodiments, the gaming machine can be configured in the current game state without showing any information leading up to the current game state. In other embodiments, one or more game states prior to the current game state can be regenerated and output to the display.

In 1528, the current game can be completed. In 1522, the game can be enabled for game play. In 1520, when the power-hit didn't occur during play of a game, the gaming machine can be powered-up and enabled for game play in 1522.

Figure 13:
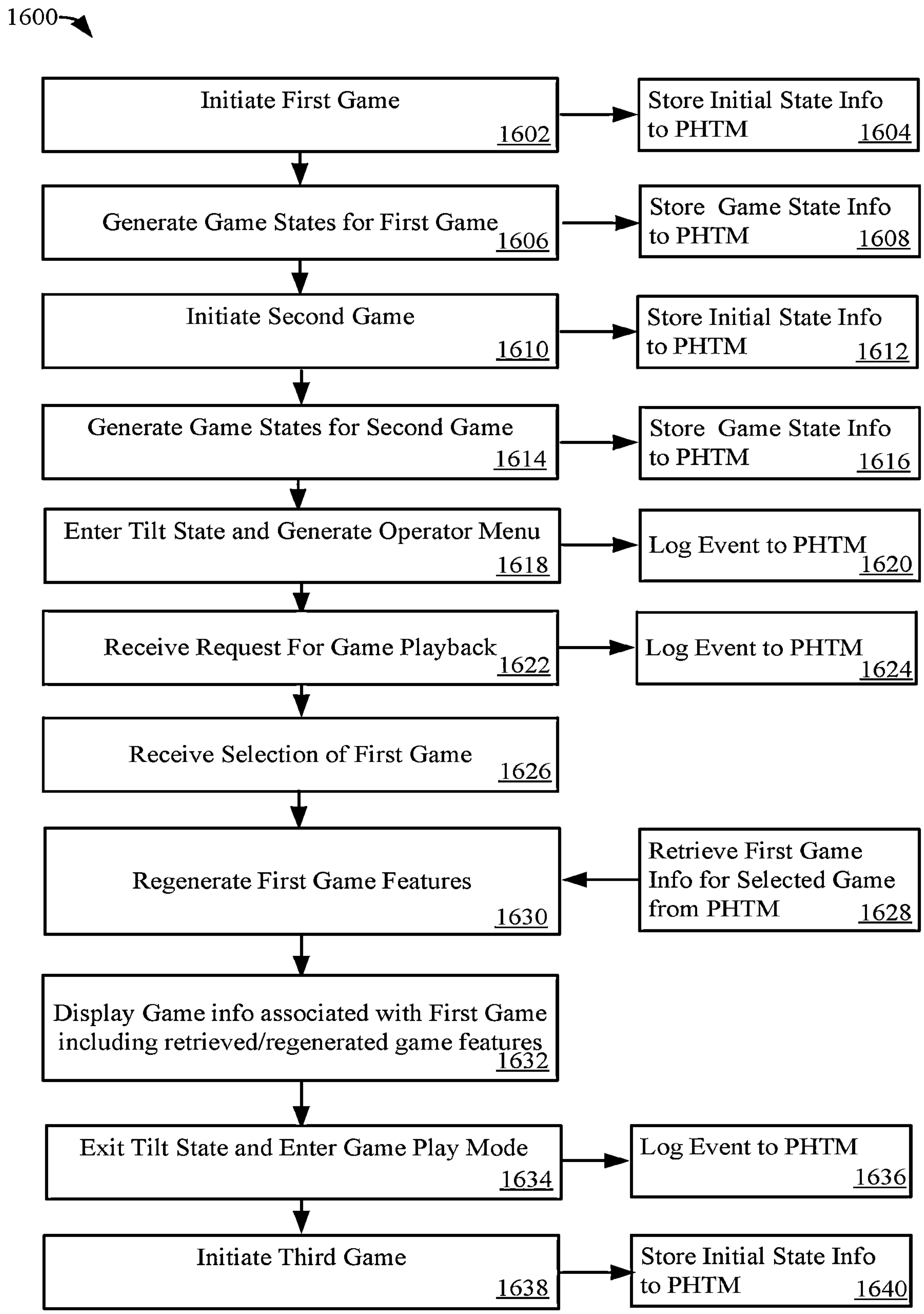
FIG. 13 illustrates a method of playing back a game previously played on a gaming machine in accordance with the present disclosure.

FIG. 13 illustrates a method 1600 playing back a game previously played on a gaming machine. In 1602, a first game can be initiated on the gaming machine. In 1604, initial state information about the first game can be stored to the PHTM. In 1606, game states for the first game can be generated. In 1608, the game states can be stored to the PHTM. As described, in the event of a power-hit during play of the first game, the GMC (e.g., see GMC 1160 in FIG. 8) can be configured to restore the game and the gaming machine to a game state just prior to the power hit using information retrieved from the PHTM (e.g., see NVRAM 1122 in FIG. 8).

After the completion of the first game, in 1610, a second game can be initiated. The initial state information for the second game can be stored to the PHTM (e.g., see NVRAM 1122 in FIG. 8). In 1614, the game states for the second game can be generated and the second can be brought to completion. In 1616, the game state information for the second game can be stored to the PHTM.

In 1618, the gaming machine can enter a tilt state. In one embodiment, the tilt state can be initiated in response to the operator inserting and turning a key in a locking mechanism on the outside of the gaming machine cabinet. Then, an operator menu can be generated and output to a display on the gaming machine. In 1620, the tilt state event can be logged in the PHTM.

In the 1622, the gaming machine using an input device, such as a touch screen, can receive a request for a game playback. The game playback can involve displaying information about a game previously played on the gaming machine. In 1624, this event can be logged to the PHTM. In 1626, a particular previously played game can be selected from among a plurality of games with game information stored in the PHTM. In this example, the first game played is selected.

In 1628, game information associated with the first game is retrieved from the PHTM. Some examples of game information which can be retrieved includes but are not limited one or more of random numbers used to generate the first game, screen shots, award information, bet information, credit information and screen shots from one or more game states.

In 1630, first game features can be regenerated. These game features can include animations of the play of the game, which represent one or more game states, or static images representing different game states. The animations of the play of the game can be regenerated using random numbers associated with the original play of the first game.

In 1632, game information associated with the first game, including the retrieved screen shots, regenerated static images and regenerated animations, can be output to a display on the gaming machine. In one embodiment, the display can be the display where the game presentation for the wager-based game is output (e.g., see display 1018 in FIG. 1). In 1634, the gaming machine can exit the tilt state and enter game play mode. For example, to initiate this process an operator can turn a key in the locking mechanism and remove it from the locking mechanism.

In 1636, initiation of game play can be logged as an event to the PHTM. In 1638, a third game on the gaming machine can be initiated. In 1640, the initial state information associated with the third game can be stored to the PHTM.

Because such information and program instructions may be employed to implement the systems/methods described herein, the present disclosure of invention relates to tangible (non-transitory) machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 14A:
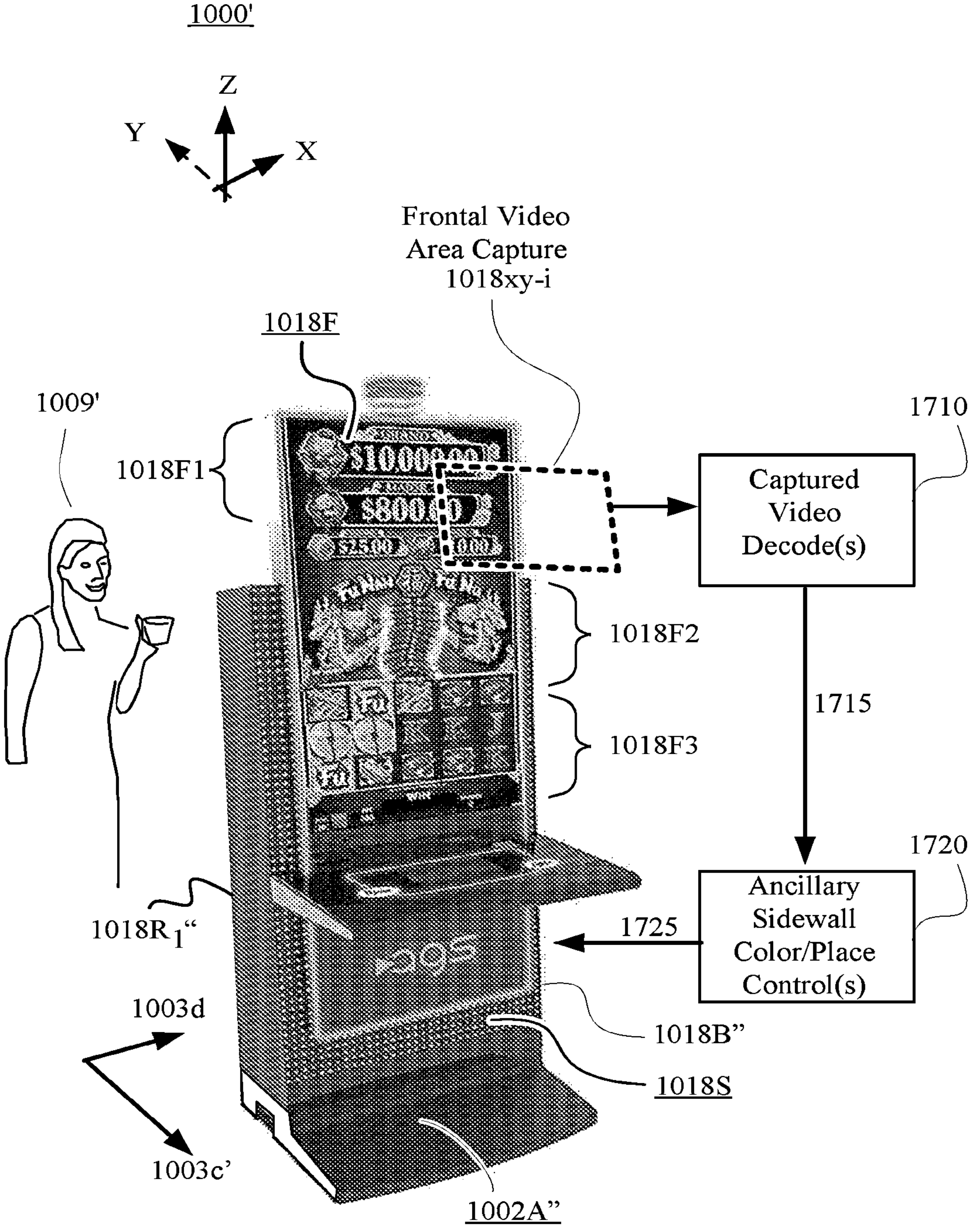
FIG. 14A illustrates a method of using a frontal video signal to drive color selection and/or placement for one or more cabinet sidewall displays.

Referring to FIG. 14A, in accordance with a further aspect of the present disclosure one or more of the cabinet sidewall displays (e.g., 1018B", 1018$R_1$", 1018S) may be driven in synchronization with video effects provided on a main frontal screen (e.g., 1018F) of the gaming machine (e.g., 1002A") so that players and/or bystanders will perceive extensions and/or other optical effects related to frontal video effects where the extensions and/or other effects appear on one or more of the cabinet sidewall displays proximate to those frontal displays.

More specifically, large and high resolution digital displays (e.g., 4K displays) may be provided as the main frontal displays 1018F for the slot machines, thus allowing game designers to render a plurality of different kinds of high definition (HD) informational images within designer-chosen sub-areas of the overall frontal display. The choice of where and how to arrange these images can vary from game to game (and/or machine to machine). Typically, a crowd-attracting large image is provided near the top of the frontal display, for example in sub-area 1018F1 for advertising current jackpot pool amounts and the like to bystanders who are situated substantially farther away from the machine than the primary players. A game identifying logo may be displayed below the crowd attracting large image, for example in sub-area 1018F2. Details of the currently played game on the specific machine may appear below that, for example in sub-area 1018F3. The game details are meant to be seen by the primary player but not necessarily by farther away bystanders. The imagery in each of these subareas (e.g., 1018F1, 1018F2, 1018F3, . . . , there can be more) may flash or animate or otherwise change in accordance with a respective one of different and often non-synchronized display area driving programs. The outputs of these display area driving programs are rendered and stored into a composite-image forming memory region (not shown) for defining the overall composite image shown on the frontal display 1018F. The stored overall composite image data of the composite-forming memory region is typically converted into a rasterized video signal that is transmitted to the frontal display 1018F for rendering on that frontal display has interlaced or non-interlaced horizontal video lines and for output as a composite optical image.

In accordance with one embodiment, video sub-area selection controls are provided for selectively picking off (capturing) a part of the rasterized video drive signal corresponding to a desired subarea 1018$xy$-$i$ of the output image. The captured part of the video drive signal is supplied to a video portion decoder 1710 configured for converting the data of the captured video signal portion into a corresponding colors selection and placement coordinating signal 1715. The colors selection and placement coordinating signal 1715 is then applied to an ancillary sidewall color controls circuit 1720 for driving a specific one or more of specified cabinet sidewall displays, or more specifically in one embodiment, to respective optic outputting tiles of the specified cabinet sidewall display.

It is within the contemplation of the present disclosure to have plural copies of the frontal video area capture controls (e.g., 1018$xy$-1, 1018$xy$-2, . . . 1018$xy$-$n$, where i=1, 2, 3, . . . , n) each dedicated to capturing a programmably specified subarea of the main frontal display 1018F and applying it to a respective and programmably configurable video capture and decode circuit (e.g., 1710) where the output of the respective capture and decode circuit is forwarded to a corresponding sidewall coloring and placement circuit (e.g., 1720) for controlling current coloring and placement of lit LEDs (e.g., smoky glass covered LEDs) of a respective cabinet sidewall display (e.g., 1018B", 1018$R_1$", 1018S). The value of the plurality number, n may vary from design to design. In one embodiment, the plurality number, n is at least three so as to allow for selective capture from respective subareas such as the above described subareas 1018F1, 1018F2 and 1018F3.

In one embodiment a frontal cabinet sidewall display 1018S is a so-called StarWall lights display (SWLD) composed of high intensity color LEDs. The frontal cabinet sidewall display 1018S may be a non-reflective one similar to those described above. The specific sidewall control signals 1725 sent to the SWLD 1018S determines what colors will be predominately displayed, when and where on the surface of the SWLD 1018S. Game designers may programmably determine the location(s) 1018$xy$-$i$ (for i=1, 2, 3, . . . ) on the main frontal display 1018F of the original video that will be used for driving corresponding effects on the SWLD 1018S (and/or on another cabinet sidewall display). Game designers may also programmably determine what transformative decoding (e.g., 1710) will be applied to the captured video portion 1018$xy$-$i$ for controlling color selection and star point lighting positions on the SWLD 1018S (and/or on another cabinet sidewall display). In one embodiment, lower resolution bits of the captured high definition video signal (e.g., 8-bits Red, 8-bits Blue, 8-bits Green) are dropped and/or individual pixels of the original high definition image portion are clustered (e.g., grouped into 3×3 pixel arrays) and averaged so as to reduce the amount of information that the transformative image decoders process. The transformative image decoding may include one or both of time-based transformation circuits (e.g., Fast Fourier Transform (FFT) analysis circuits) and spatial transformation circuits (e.g., resamplers, image sharpeners, object recognizers, object simplifiers and/or deformers) as well as others for generating one or more cabinet sidewall display drive signals that is/are synchronized with and/or represents a general aspect of the respective captured original high definition image portions 1018*xy-i* (where i=1, 2, 3, . . . , n).

The utilized general aspect of the captured original high definition image portion 1018*xy-i* may vary depending on the intended audience for the corresponding visual effect presented on the targeted cabinet sidewall display (e.g., 1018B", 1018$R_1$", 1018S). More specifically if the targeted display is the front facing SWLD 1018S, then the captured HD video portion 1018*xy-i* may be in a subarea (e.g., 1018F3) that the primary game player (not shown, see 1007 of FIG. 1A) is generally focusing on so that the peripheral vision areas (non-foveal areas) of the primary player may for example perceive the flashing, coloration and/or animation on the SWLD 1018S as being coordinated with and reinforcing what is perceived in the general area of focus (e.g., 1018F3) of the player. Yet more specifically, if the spinning virtual reels in game detail subarea 1018F3 reveal a final payline with three red cherries, the corresponding ancillary affects displayed on the SWLD 1018S may appear as red circular areas moving radially inward or outward to the detailed area of focus (e.g., 1018F3) where the actual red cherries appear. In this way, the visual experience for the primary player may be enhanced because the peripheral effects match with and/or reinforce those of the detailed focal effects (e.g., of subarea 1018F3).

On the other hand, if the targeted display is a left or right side cabinet sidewall display (e.g., 1018B"), then the intended recipient of visual effects presented on that left or right side CSD (e.g., 1018B") may be a passerby (e.g., 1009') located in a pathway area (e.g., 1003*c*') adjacent to the side of the respective gaming machine. That passerbyer might want to know what type of game is being played on the machine or corresponding row of machines. In such a case, the high definition imagery of game identifying area 1018F2 may be used as the captured HD video portion 1018*xy-i*. An appropriate decoding transform (e.g., 1710) may be used for intuitively informing the passerbyer about the nature of the game. More specifically and for example, if the name of the game involves dragons or cats then the sidewall display may respectively be that of a low-resolution symbol for a dragon or cat that is animated and colored to correspond with what is shown in the high definition game identifying area 1018F2. It is to be understood that the images projected from the cabinet sidewall displays are not limited to the transformations derived from the captured video portions 1018*xy-i*. In one embodiment, a computer controlled switching circuit (not shown) determines which of one or more CSD drive signals will be used for driving the respective cabinet sidewall displays (e.g., 1018B", 1018$R_1$", 1018S). More specifically, in one embodiment the computer controlled switching circuit merges together two or more CSD drive signals on a time multiplexing basis. In one embodiment, the transformed version of the captured video is output at a rate of approximately 30 frames per second. An alternate background or other image may be alternatively filled into secondary frames of an output drive signal operating at 60 frames per second.

As yet another example, if the targeted display is a rear cabinet sidewall display (e.g., 1018$R_1$"), then the intended recipient of visual effects presented on that rear CSD may be a lingerer (e.g., 1009') located in a pathway area (e.g., 1003*d*') outside the cluster of machines. It may be desirable to lure that lingerer into the cluster of gaming machines by advertising the current jackpot pool amount now available within the cluster of machines. In such a case, the high definition imagery of advertising area 1018F1 may be used as the captured HD video portion 1018*xy-i*. An appropriate decoding transform (e.g., 1710) may be used for intuitively informing the lingerer about the nature or actual amount of the current jackpot.

Figure 15A:
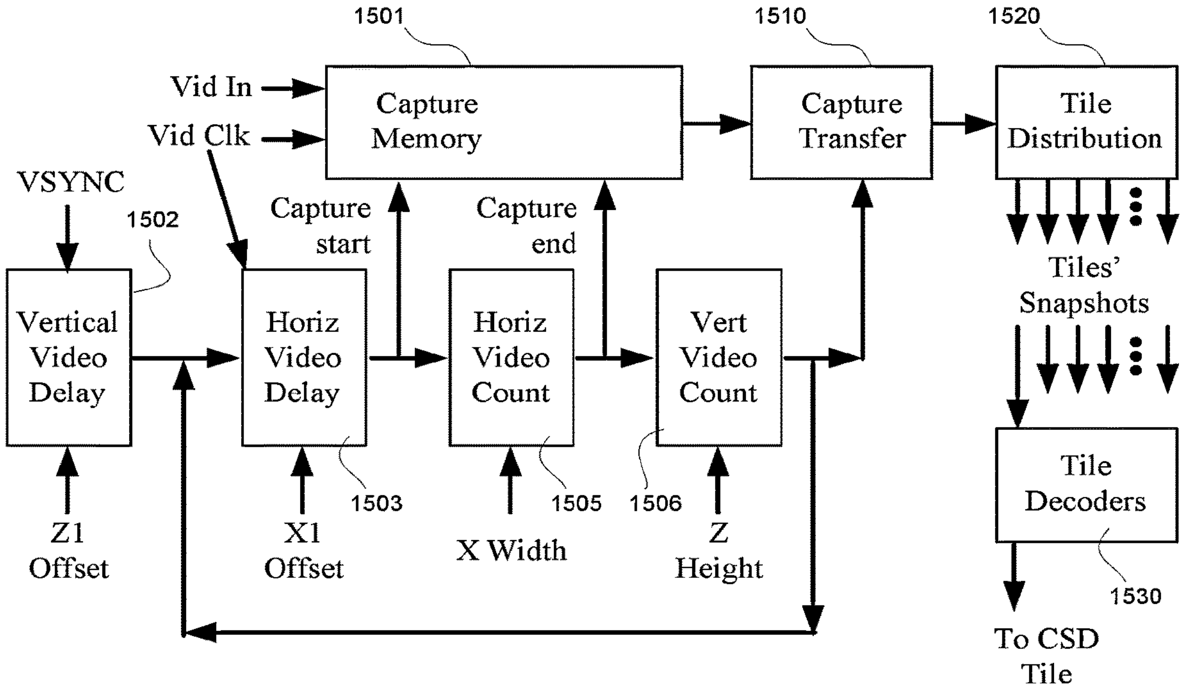
FIG. 15A illustrates a video capture and transfer circuit in accordance with one embodiment of the present disclosure.

Referring to FIG. 15A, shown is an example circuit that may be used for performing video portion capture, decoding and optical drive signal distribution in accordance with one embodiment of the present disclosure. Decoding and signal distribution need not occur in the illustrated sequence or as unitary operations. In alternate embodiments, a first level of transformative decoding may occur for the entire captured image portion 1018*xy-i*, then portions of that first level transformed signal is split up (for distribution) and a second level of transformative decoding then occurs on each of the split up signals. Thereafter, further splitting, distribution and/or transformative decoding may occur before the ultimate drive signals are delivered to the respectively driven optical output tiles.

In the embodiment of FIG. 15A, a digitized video input signal (VID IN) is applied to a FIFO style capture memory 1501 in synchronization with a supplied video clock signal (VID CLK). Signal capture by the capture memory 1501 does not begin until a capture start signal is received from a first control circuit 1503 and it temporarily or permanently stops when a capture and signal is received from a second control circuit 1505. Operation for a given frame (or field) of the video input signal (VID IN) begins with receipt of a corresponding vertical synchronization signal (VSYNC) by vertical video delay circuit 1502. Although not shown so as to avoid excessive clutter, the vertical video delay circuit 1502 may be clocked by horizontal line synchronization signals (H1's, not shown). The vertical video delay circuit 1502 also receives a programmably established Z1 offset signal which tells it how many horizontal video lines to skip past before activating the first control circuit 1503 (also referred to as the horizontal video delay circuit 1503). In one embodiment, the vertical video delay circuit 1502 may be a down counter which has its count initialized to the Z1 offset value and has its down counting operation triggered by receipt of the vertical synchronization signal (VSYNC) while the rate of down counting is controlled by the horizontal line synchronization signals (H1's, not shown).

The horizontal video delay circuit 1503 performs a similar delay function, but along each horizontal video line rather than down the vertical axis of the image represented by rasterized video input signal (VID IN). The horizontal video delay circuit 1503 is clocked by the supplied video clock signal (VID CLK) and after each count down to zero is reinitialized by a count value supplied by a programmably established X1 offset signal. In some embodiments, the X1 offset signal may represent a value that is fixed at least over a predetermined time stretch such as five minutes and then optionally changes to a different value. The start of countdown by the horizontal video delay circuit 1503 is triggered by receipt of a start signal from one or the other of the vertical video delay circuit 1502 and eight vertical height determining circuit 1506. When the horizontal video delay circuit 1503 counts down to zero it sends the capture start signal to the FIFO style capture memory 1501. The capture memory 1501 then begin storing a corresponding portion of the digitized video signal (VID IN) at that time.

Simultaneously, the capture start signal is applied to a horizontal video counter circuit 1505 that has been pre-loaded with a programmably selectable X Width value. Like the horizontal video delay circuit 1503, the horizontal video counter circuit 1505 is clocked by the supplied video clock signal (VID CLK) and after each count down to zero it is reinitialized by a count value supplied by the programmably established X Width signal. In some embodiments, the X Width signal may represent a value that is fixed at least over a predetermined time stretch such as five minutes and then optionally changes to a different value. On counting down to the zero value, the horizontal video counter circuit 1505 outputs the capture end pulse to the capture memory 1501, thus ending the recording of a respective segment of the current horizontal video line.

The capture and signal is simultaneously applied to a vertical counter circuit 1506. The vertical counter circuit 1506 is clocked by the horizontal line synchronization signals (H1's, not shown) and sends a restart pulse signal to the horizontal video delay circuit 1503 in synchronization with each H1 pulse. At the same time the vertical counter circuit 1506 decrements a programmably initialized count value, Z Height until it counts down to zero. At that point, it activates a capture transfer circuit 1510 which unloads the horizontal video segments that have been captured thus far by the FIFO style capture memory 1501. Thereafter during the rest of the video frame and the video blanking period, the capture transfer circuit 1510 transfers its contents to a tile distribution circuit 1520. In some embodiments, the Z Height signal may represent a value that is fixed at least over a predetermined time stretch such as five minutes and then optionally changes to a different value.

The tile distribution circuit 1520 subdivides the horizontal video segments that have been unloaded from the FIFO style capture memory 1501 (thus freeing space in the FIFO memory 1501 for capturing a next rectangular video portion) and outputs the subdivided video segments (which could be subdivided vertically and/or horizontally according to predetermined programming instructions) has respective tile snapshots to respective tile signal decoder circuits 1530. Only one such signal decoder circuit 1530 is shown to avoid illustrative clutter. Each respective tile decoder circuit 1530 applies corresponding time domain (e.g., FFT) and/or spatial domain (e.g., affine transformation) transformations to its respective tile snapshot. In one embodiment, each decoder circuit (e.g., 1530) includes one or more digital signal processing chips (DSP's) that are respectively programmed to carry out desired transformations on the captured snapshots. In an alternate embodiment, digital image transformation is first performed on the entirety of the captured image held in the capture transfer storage 1510 and then the transformed snapshots are distributed to the respective tiles with or without subsequent further transformation. The transformed signals are then applied to drive the corresponding cabinet sidewall display (CSD) tiles.

Figure 15B:
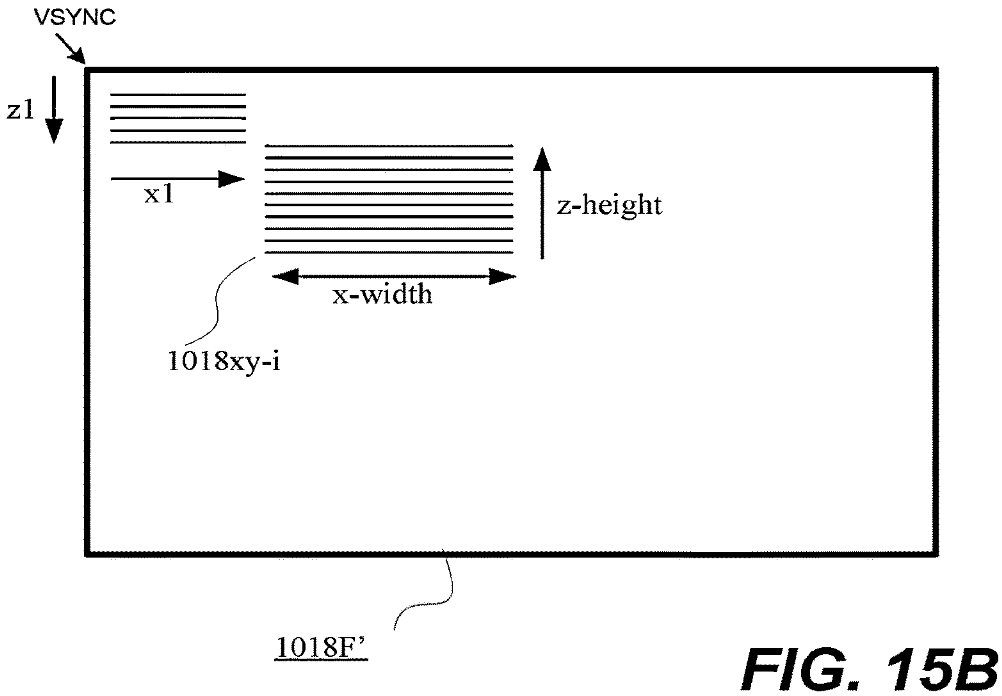
FIG. 15B illustrates an example of a video capture process in accordance with the present disclosure.

FIG. 15B schematically illustrates how the circuit of FIG. 15A (or equivalents thereof) may operate. Receipt of the VSYNC signal indicates the timing for the top left corner of a given frame or field of the rasterized video input signal (VID IN). The Z1 signal then delays down a corresponding first group of horizontal video lines. After the Z1 delay, the X1 offset indicates where FIFO recording should begin for respective segments of a next group of horizontal video lines identified by the Z-Height signal. The X-width signal indicates the length of each recorded horizontal line segment. Thus the indicated portion 1018*xy-i* of frontal video image 1018F' is captured.

Figure 14B:
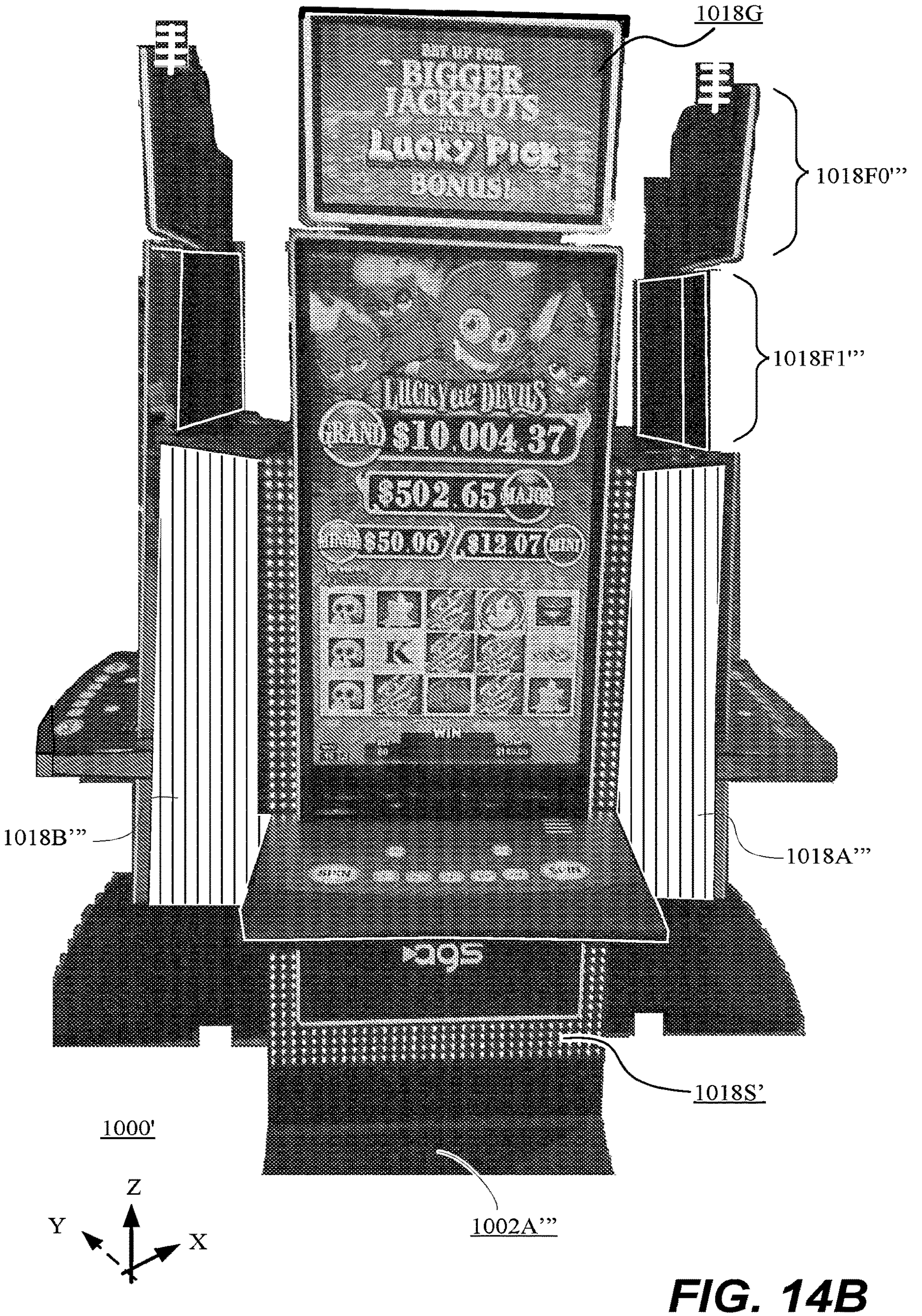
FIG. 14B illustrates a square kiosk configuration in which the method of using a frontal video signal drive is applicable to left and right cabinet sidewall displays of adjacent second and third gaming machines whose cabinet sidewall displays face the player of the first gaming machine.

Referring to FIG. 14B shown is another embodiment organized as a square kiosk configuration. While only three identical gaming machines are seen in orthogonal edge to edge abutting relationship, it is to be understood that a fourth identical gaming machine closes the interior square to thereby provide a secured area that players cannot easily enter into. In one embodiment, agent call lights that are used to call over casino floor agents when needed are placed to face the closed interior square. Security cameras mounted on the ceiling detect the optical signaling from the agent call lights.

In the embodiment of FIG. 14B, each gaming machine (e.g., 1002A") not only has a ninety degree oriented main HD display (with long edge running vertically) extending from the play desk level to above the security cabinet (e.g., where portion 1018F1" is an example of such extension above the security cabinet) but also a top box display 1018G mounted above the main HD display. The play desk has user-actuatable buttons and/or touch areas by way of which the user may engage with the gaming action. In one embodiment, the user-actuatable buttons and/or touch areas include computer driven light sources. Part of the StarWall lights display (SWLD) 1018S' is disposed below play desk and a further spaced apart portion is disposed above the play desk and bracketing the main HD display. In accordance with one aspect of the present disclosure, coloring and light placement on the SWLD 1018S' is driven in response to selected subareas of the main HD display and/or of the top box display 1018G. To allow for responsiveness to selected subareas of plural monitors (e.g., 1018F and 1018G), the circuit in FIG. 15A is slightly modified to include video input select switches (not shown) and subarea selection switches (not shown) that under computer control respectively select where the video input signals (e.g., Vid In, Vid Clk, VSYNC) come from and what subarea is chosen, for example from the video drive for the main HD display (1018F) and a subarea thereof (e.g., in a region similar to that of 1018F1") or from the video drive for the top box display (1018G) and a subarea thereof (e.g., in a region similar to that of 1018F0").

In one embodiment, the left side cabinet sidewall display 1018A" of the gaming machine on the right is visible to the player of the facing machine and/or the right side cabinet sidewall display 1018B" of the gaming machine on the left is visible to the player of the facing machine. One or both of these player facing cabinet sidewall displays, 1018A" and 1018B", is made responsive to video content in programmably selected subareas of the main HD display (1018F) and/or of the top box display (1018G) of the player facing machine. Accordingly, when a video effect takes place on the main HD display (1018F) and/or on the top box display (1018G) of the player facing machine, that video effect may be enhanced by further and synchronized optical effects that appear on one or both of the player facing cabinet sidewall displays, 1018A" and 1018B'" of the adjacent gaming machines of the kiosk configuration.

Although the above discusses synchronizing the optical effects that appear on one or both of the player facing cabinet sidewall displays, 1018A" and 1018B" of the adjacent gaming machines in response to video content presented in programmably selected subareas of the main HD display (1018F) and/or of the top box display (1018G) of the player facing machine, it is within the contemplation of the present disclosure to additionally and/or in alternate time periods cause the optical effects that appear on one or more of cabinet sidewall displays (e.g., 1018A" and 1018B") to be responsive to and synchronized with sound effects emanating from a corresponding gaming machine and/or from other audio sources (e.g., a casino floor speaker system).

Figure 16:
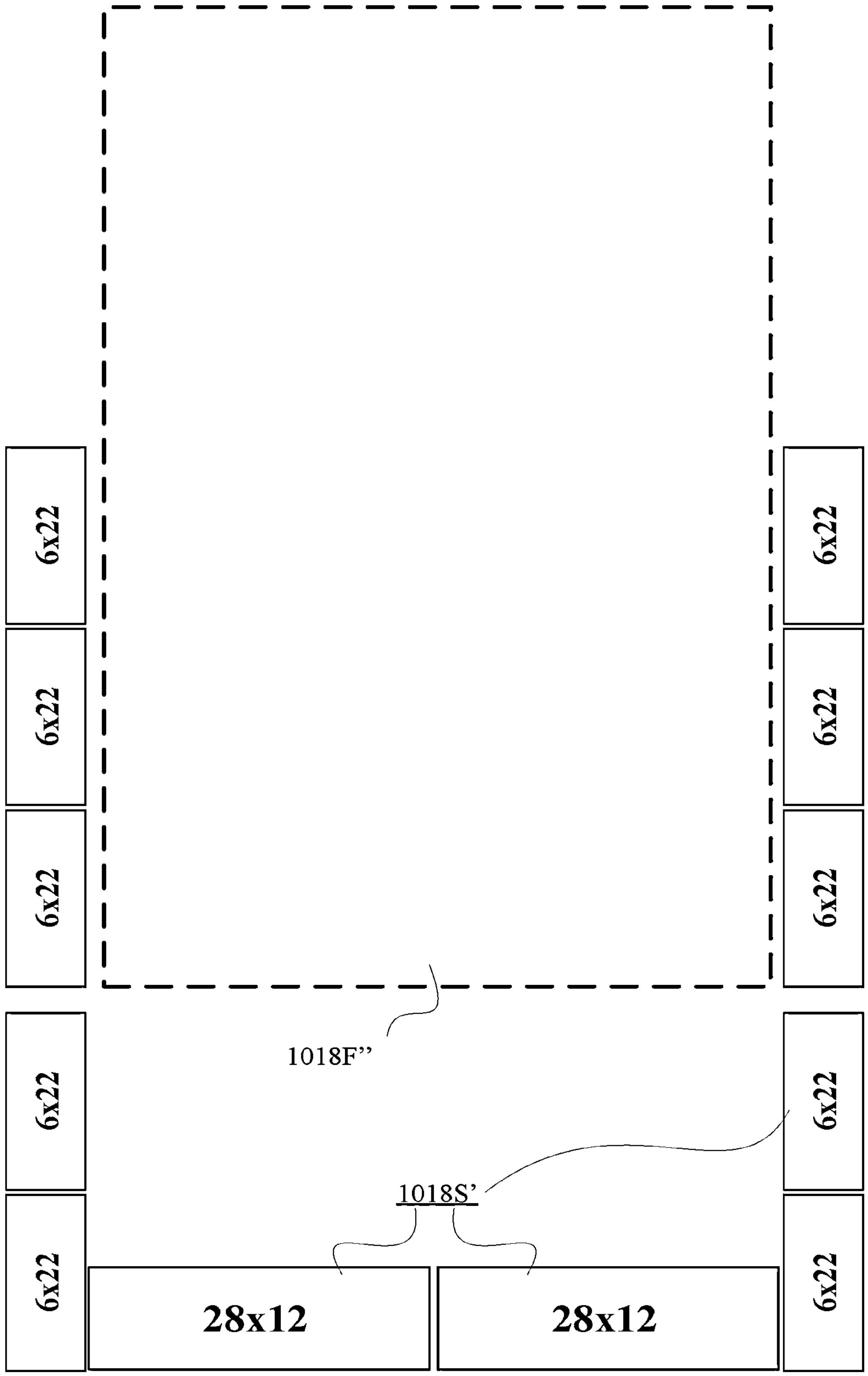
FIG. 16 illustrates an example of a LEDs tile placement arrangement in accordance with one embodiment of the present disclosure.

FIG. 16 schematically illustrates an exemplary arrangement of colored pixel tiles 1018S' about a bottom portion of an HD frontal display 1018F" in accordance with one embodiment. Each tile is organized as a rectangular matrix of colored high intensity pixels (e.g., LEDs) in accordance with the in block designation of that tile. More specifically, the 6×22 designation indicates six columns by twenty-two rows of high intensity pixels (e.g., LEDs) each capable of outputting white light or spectrally selected portions in the visible range (e.g., weighted combinations of the R, G, B colors or of other alternate primary colors). The 28×12 designation indicates twenty-eight columns by twelve rows of high intensity pixels similarly each capable of outputting white light or spectrally selected portions in the visible range. Optical effects generated with these tiles may be referred to as StarWall effects. Optical outputs from the front cabinet sidewall are not limited to such tiled configurations. In one embodiment, a low resolution color display monitor (e.g., 600 by 800 pixels) may be added in the space between the bottom of the high-resolution frontal display 1018F' and the bottom row of the 28×12 high intensity tiles.

Figure 17:
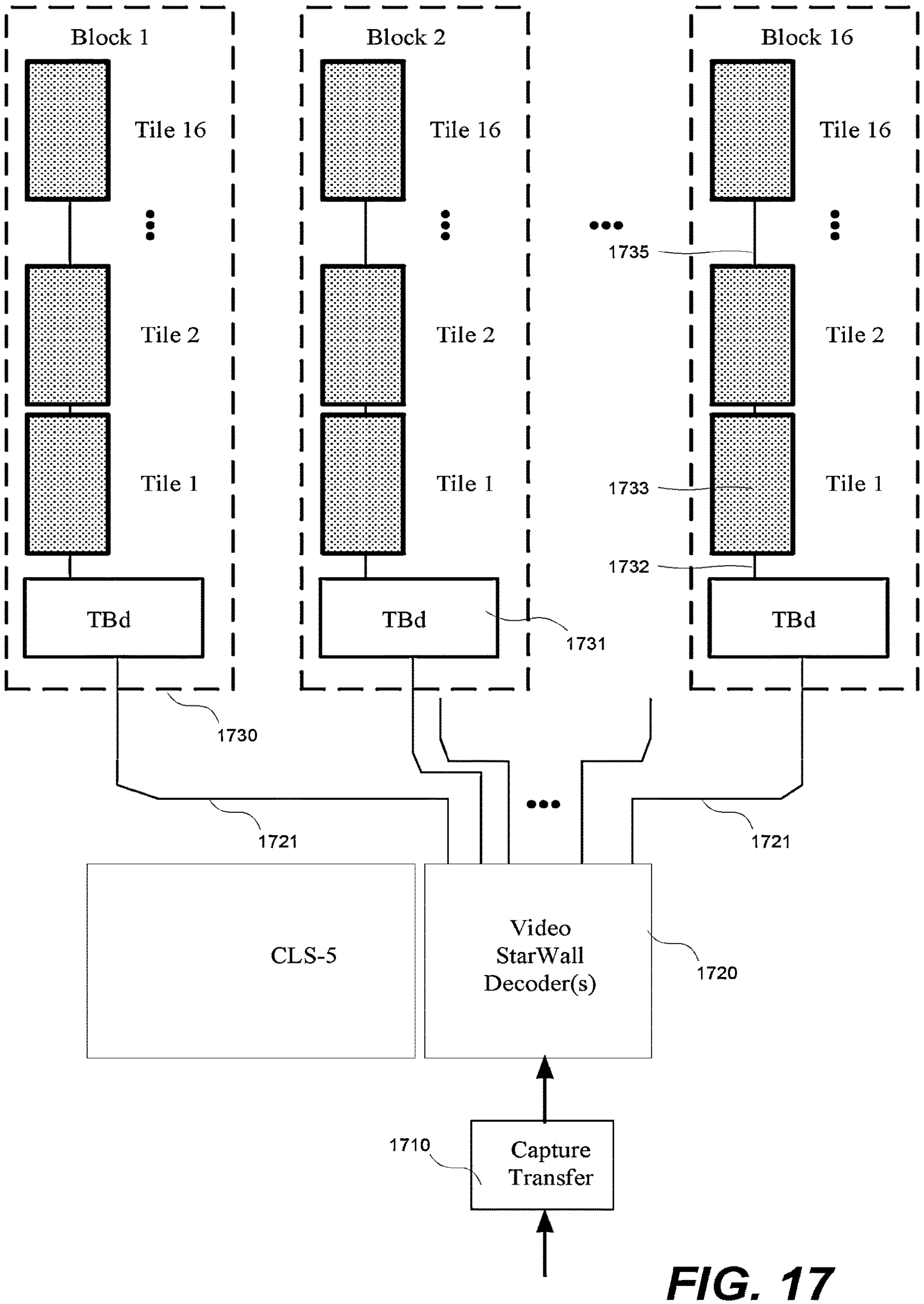
FIG. 17 illustrates an example of a captured video distribution system for a plurality of sidewall blocks containing respective LED tiles.

FIG. 17 schematically illustrates an exemplary arrangement for respective blocks of tiles (e.g., 1730) and for the distribution of transformed tile snapshots to and through the respective blocks. In this embodiment, each tile may be assigned a unique address. Some tiles may share a common address. In one embodiment the respective tile addresses are established by use of adjacent DIP switches and/or adjacent optically encoded detector circuits. The captured high definition video portion is first stored in the storage of a capture transfer circuit 1710. The captured high definition video words may be simplified to lower resolution versions, for example by value rounding or dropping of lower resolution bits per pixel and/or by averaging of pixel groups of predetermined size (e.g., 3×3 array of pixels per group). In one embodiment, imagery sampling is performed prior to reduction of resolution. In one embodiment a per pixel resolution of 24 bits per pixel (e.g., 8R, 8G, 8B) is reduced to 18 bits per pixel (e.g., 6R, 6G, 6B). This is done to reduce bandwidth requirements on the subsequent one or more video decoder circuits 1720 (e.g., on the one or more DSP chips included therein).

In one embodiment, the transformation process (e.g., inside decoder's 1720) includes attaching destination addresses to portions of the transformed image signals. The attached destination addresses may include unique block numbers and/or unique tile numbers. In one embodiment, each block may have a unique block address assigned to it by way of an internal DIP switch and/or optical encoding detector circuit. The transformed and addressed tagged image signals are first subdivided according to block address and transferred to respective transition boards (TBd's 1731) in the respective blocks 1730. In one embodiment, during initialization, the respective transition boards 1731 report on their assigned block addresses and placement locations to the decoder(s) circuit 1720. Serial signal generating circuits (not shown) within the decoder(s) circuit 1720 then attach the reported block address signals to respective ones of subdivided image portion signals according to the reported placement locations so as to have the signals routed to the desired placement locations for optical output therefrom. The address-tagged and subdivided serial signals may be respectively output along respective serial transmission cables 1721 to the respective blocks 1730.

The transition boards (TBd's 1731) receive their respective ones of the subdivided serial signals, strip off the block addresses and optionally rearrange the temporal locations of the portions directed to the individual tiles 1733 so that the earliest timed portion is directed to the farthest away tile (e.g., Tile 16) and the latest timed portion is directed to the tile (e.g., Tile 1) closest to the transition board 1731. In one embodiment, each transition board 1731 outputs a daisy-chain style serial signal 1732 to a corresponding chain of optical output tiles such as that the closest tile (e.g., Tile 1) captures only its portion of the serial signal and forwards the remainder to the next highest tile (e.g., Tile 2) and so on. The serial signal 1735 received by the last tile on the chain (e.g., Tile 16) consists of just the serial signals for that last tile. As each tile captures its respective portion of the daisy-chain transferred signal, the respective tile de-serializes that portion and transfers the de-serialized portions to respective registers of corresponding pixels in the tile. In one embodiment, the pixels are not driven by the registered signals until all tiles have registered their respective pixel signals. Since the uppermost tile in the chain (e.g., Tile 16) is last to receive its signal portion and to begin de-serializing it, that last tile is further tasked with sending a completion signal to its corresponding transition board (TBd 1731) indicating that it has finished de-serializing and registering its received signals. The respective transition boards (TBd's 1731) then forward their respective completion signals back to the centralized decoder circuit 1720. When the centralized decoder circuit 1720 receives an indication that all blocks have the de-serialized and registered their respective pixel drive signals, the decoder circuit 1720 outputs a parallel update pulse to all the tiles (update line not shown) signaling them to then drive their respective pixels with their respectively registered pixel drive signals. In this way all the pixels of the respective tiles and blocks switch state simultaneously. In one embodiment, the update pulse is output thirty times per second thus creating a display rate of 30 frames per second. Slower frame rates may be called for in certain embodiments where image transformation and signal distribution consumes a greater amount of time than allowed for a display rate of 30 frames per second.

Figure 18:
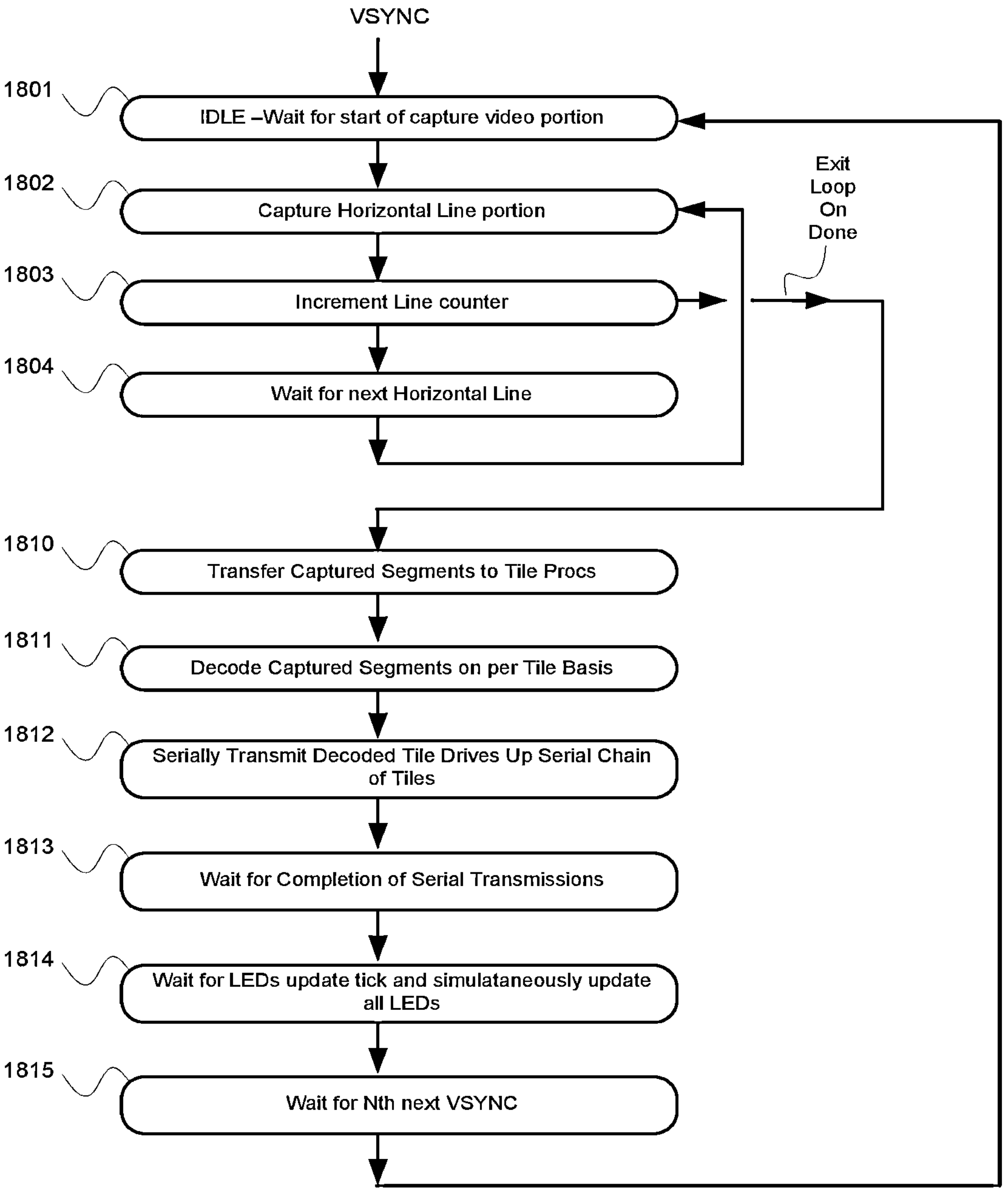
FIG. 18 is a flow chart of a process in accordance with one embodiment of the present disclosure which includes steps relating to video capture, data decode and optical drive distribution.

Referring to FIG. 18, shown is a flow chart for the process of capturing a desired portion (e.g., 1018$xy$-$i$) of the frontal display image 1018F, transforming it and distributing portions of the transformed signal two respectively located tiles and their respective pixels.

Step 1801 waits for arrival of the vertical synchronization signal (VSYNC) and then it idles for the Z1 offset time (see 1502 of FIG. 15A).

Step 1802 responds to the horizontal segment capture begin and capture and signals (see 1503, 1505 of FIG. 15A) by transferring the video input signal of that horizontal line segment to the FIFO buffer (see 1501 of FIG. 15A).

Step 1803 decrements the line counter (see 1505 of FIG. 15A) and tests for the last line of the established Z height value. If the countdown has reached zero, step 1803 transfers control to step 1810. If not, control continues down to step 1804 where the process waits for the next horizontal line (e.g., the next H1 pulse) and then loops back to step 1802 for capturing the next horizontal line segment of the programmably identified video portion (e.g., 1018$xy$-$i$) of the frontal display image 1018F.

At step 1810, the data of the captured horizontal line segments is transferred out of the FIFO and into the capture transfer storage (see 1510 of FIG. 15A) for subsequent transformation and distribution.

In step 1811, the captured and transferred horizontal line segments are transformed (e.g., on a temporal and/or spatial transformation basis) by respective image transformation processors (e.g., DSP's). A common transformation may be performed on the entirety of the captured and transferred image and/or respective block level and/or tile level transformations may be performed on portions of the captured and transferred image that are destined for respective blocks and tiles.

Step 1812 represents the serial distribution of the transformed signals up of the respective serial chains of tiles. Step 1813 corresponds to the waiting for the completion of the serial signal distributions and registrations of the deserialized pixel drive signals for all the pixels of the given display. Subsequent step 1814 corresponds to the wait for the parallel update tick which causes simultaneous updating of all the high intensity pixels (e.g., all the LED's).

Step 1815 waits for arrival of the Nth next vertical synchronization signal (VSYNC). Depending on the time consumed by steps 1801-1814, the Nth next VSYNC signal may be one that arrives after having missed an intervening one or after having missed two or more intervening ones. If the input video signal (VID IN) operates at a display rate of 60 frames or fields per second, then the video-responsive StarWall display (VSWD) will operate at a slightly slower rate of say 30 frames or fields per second; or slower if processing time takes longer. When the Nth next VSYNC signal arrives, step 1815 returns control to step 1801 (IDLE) from which the process repeats again.

Although many of the components and processes are described above in the singular for convenience, it will be appreciated by one of skill in the art that multiple components and repeated processes can also be used to practice the techniques of the present disclosure. As used herein, the term "and/or" implies all possible combinations. In other words, A and/or B covers, A alone, B alone, and A and B together.

While the present disclosure of invention has been particularly shown and described with reference to specific embodiments thereof, it will be understood by those skilled in the art that changes in the form and details of the disclosed embodiments may be made without departing from the spirit or scope of the present teachings. It is therefore intended that the disclosure be interpreted to include all variations and equivalents that fall within the true spirit and scope of the present teachings.

What is claimed is:

1. An electronic gaming machine (EGM) comprising:

a secured cabinet having front, rear, left and right sidewalls and an interior;

a regulated power supply, disposed within the interior of the cabinet, receiving power from an external power source;

a gaming machine controller, including a processor and a memory, disposed within the interior of the cabinet, coupled to the regulated power supply;

a frontal display, mounted as part of the front sidewall of the cabinet, coupled to the regulated power supply and communicatively coupled to the gaming machine controller to display primary imagery comprising primary gaming action content associated with a play of a game at the EGM; and at least one cabinet sidewall display mounted as an integral exterior portion of at least one of the front, rear, left and right sidewalls of the cabinet, coupled to the regulated power supply and communicatively coupled to the gaming machine controller to output secondary imagery comprising secondary action content in synchronism with the primary gaming action content displayed by the frontal display;

wherein the at least one cabinet sidewall display comprises a semi-transparent exterior having light-absorbing particles distributed and configured to reflect no more than 25% of exterior light.

2. The gaming machine of claim 1 wherein:

density of the light-absorbing particles is such that light rays incoming from outside the at least one cabinet sidewall display are absorbed so as to provide the at least one cabinet sidewall display with its respective appearance as a blackened or otherwise darkened light-absorbing surface; and the at least one cabinet sidewall display further includes a respective optical image generator capable of producing optical images of sufficient intensity so as to be perceived by the one or more respective persons within viewing distance as suspended on the perceived blackened or otherwise darkened light-absorbing surface of the at least one cabinet sidewall display and as coming out of the respective semi-transparent exterior of the at least one cabinet sidewall display.

3. The gaming machine of claim 1 wherein an inward part of the respective semi-transparent exterior is structured to disperse light rays incoming from outside the at least one cabinet sidewall display.

4. The gaming machine of claim 3 wherein the inward part of the respective semi-transparent exterior is structured to pass through to a front part of the respective semi-transparent exterior, light rays originating from behind the inward part of the respective semi-transparent exterior.

5. The gaming machine of claim 4 wherein the at least one cabinet sidewall display further includes a respective optical image generator disposed behind the respective semi-transparent exterior and configured to produce optical images that can be perceived as coming out of the respective semi-transparent exterior.

6. The gaming machine of claim 5 wherein the at least one cabinet sidewall display is structured to include a respective cooling fluid passageway configured to pass a clean thermal transfer gas from a bottom portion of the respective optical image generator to a top portion thereof.

7. The gaming machine of claim 6 wherein the clean thermal transfer gas is one circulating in a sealed gas circulating loop that passes through a multi-flow heat exchanger disposed at an upper portion of the cabinet above where the bottom portion of the respective optical image generator is located.

8. The gaming machine of claim 1 wherein the semi-transparent exterior has a light transmissivity of no more than 50% but not less than 5%.

9. The gaming machine of claim 1 wherein the semi-transparent exterior has a light transmissivity of no more than 33% but not less than 3%.

10. The gaming machine of claim 1 wherein the semi-transparent exterior has a graduated refractive index the same as air at a most exterior portion thereof and then increases with depth toward an inward portion thereof.

11. The gaming machine of claim 1 wherein said at least one cabinet sidewall display is configured to that respective persons within viewing distance of the at least one cabinet sidewall display perceive the respective exterior of that cabinet sidewall display as being a blackened or otherwise darkened light-absorbing surface when the respective cabinet sidewall display is not outputting imagery and such that the one or more respective persons within viewing distance of the at least one cabinet sidewall display perceive said secondary imagery output by that cabinet sidewall display as imagery presented on a blackened or otherwise darkened light-absorbing surface when the at least one cabinet sidewall display is displaying said secondary imagery.

12. A gaming machine comprising:

a cabinet having front, rear, left and right walls and an interior;

a regulated power supply, disposed within the interior of the cabinet, receiving power from an external power source;

a gaming machine controller, including a processor and a memory, disposed within the interior of the cabinet, coupled to the regulated power supply;

a frontal display, formed as an integral part of the cabinet front wall, coupled to the regulated power supply and communicatively coupled to the gaming machine controller to display dynamic gaming action content associated with a play of a game at said gaming machine; and at least one cabinet sidewall display formed as an integral part of a respective one of cabinet walls, coupled to the regulated power supply and communicatively coupled to the gaming machine controller to display dynamic content synchronized with at least part of the dynamic gaming action content displayed by the frontal display;

wherein the at least one cabinet sidewall display comprises a semi-transparent exterior having light-absorbing particles distributed therein.

13. The gaming machine of claim 12, further comprising one or more audio output devices associated with and operatively coordinated with the at least one cabinet sidewall displays so as to provide audio output corresponding to the displayed dynamic content of the associated at least one cabinet sidewall display.

14. The gaming machine of claim 12 wherein the frontal display has a first image defining resolution and the at least one cabinet sidewall display has a lower second image defining resolution.

15. The gaming machine of claim 14 wherein the first image defining resolution of the frontal display is 1K or higher and the lower second image defining resolution is less than 1K.

16. The gaming machine of claim 12 and further comprising:

one or more video subarea capturing circuits each coupled to receive a video input signal driving the frontal display and to respectively capture respectively selected subportions of the video input signal.

17. The gaming machine of claim 16, further comprising one or more image transformation circuits configured to transform represented imagery of a selected part or all of a respective one of the captured selected subportions and output the same as transformed imagery representing signals.

18. The gaming machine of claim 17, further comprising one or more signal distribution circuits configured to distribute selected portions of the transformed imagery representing signals to respective parts of the at least one cabinet sidewall display.

19. The gaming machine of claim 12, wherein the semi-transparent exterior has a light transmissivity of no more than 50% but not less than 5%.

20. The gaming machine of claim 12 wherein the semi-transparent exterior has a light transmissivity of no more than 33% but not less than 3%.

* * * * *